United States Patent [19]

Suzuki et al.

[11] Patent Number: 5,428,419

[45] Date of Patent: * Jun. 27, 1995

[54] IMAGE MAGNIFICATION CONTROL DEVICE FOR A CAMERA

[75] Inventors: Noboru Suzuki; Shigeo Toji, both of Tokyo; Masahiro Kawasaki, Saitama, all of Japan

[73] Assignee: Asahi Kogaku Kogyo Kabushiki Kaisha, Tokyo, Japan

[ * ] Notice: The portion of the term of this patent subsequent to Feb. 1, 2011 has been disclaimed.

[21] Appl. No.: 149,226

[22] Filed: Nov. 2, 1993

Related U.S. Application Data

[63] Continuation of Ser. No. 881,785, May 11, 1992, Pat. No. 5,283,607, which is a continuation of Ser. No. 652,038, Feb. 4, 1991, Pat. No. 5,159,377, which is a continuation of Ser. No. 410,880, Sep. 22, 1989, Pat. No. 5,093,680.

[30] Foreign Application Priority Data

Sep. 22, 1988 [JP] Japan ................. 63-237570
Sep. 22, 1988 [JP] Japan ................. 63-237571
Sep. 22, 1988 [JP] Japan ................. 63-237572
Sep. 22, 1988 [JP] Japan ................. 63-237573
Sep. 22, 1988 [JP] Japan ................. 63-237574
Sep. 22, 1988 [JP] Japan ................. 63-237575

[51] Int. Cl.[6] ............................. G03B 13/00
[52] U.S. Cl. ............................. 354/400
[58] Field of Search ............... 354/400–409, 354/195.1–195.12

[56] References Cited

U.S. PATENT DOCUMENTS

4,145,732  3/1979  Pandres, Jr. .
4,156,933  5/1979  Pandres, Jr. .
4,446,526  5/1984  Iwande .
4,500,778  2/1985  Kusaka et al. .
4,508,443  4/1985  Matsuzaki et al. .
4,509,842  4/1985  Taniguchi et al. .
4,560,267 12/1985  Nakai et al. .
4,623,238 11/1986  Taniguchi et al. .
4,717,933  1/1988  Ando et al. .
4,908,643  3/1990  Tamada et al. .
4,935,763  6/1990  Itoh et al. .
4,951,075  8/1990  Tokumaru et al. .
4,962,400 10/1990  Otani et al. .
5,063,402 11/1991  Shimada et al. .
5,093,680  3/1992  Suzuki et al. .
5,113,209  5/1992  Ueyama et al. .
5,159,377 10/1992  Suzuki et al. .
5,227,829  7/1993  Imanari et al. ............. 354/400
5,325,146  6/1994  Toji ............................ 354/402

FOREIGN PATENT DOCUMENTS

53-113527 10/1978 Japan .
54-25819   2/1979 Japan .
57-165806 10/1982 Japan .
58-103273  6/1983 Japan .
59-64816   4/1984 Japan .

(List continued on next page.)

OTHER PUBLICATIONS

Patent Abstracts of Japan, vol. 13, No. 12 (P-812) [3360], Dec. 1, 1989.
English language Abstract of JP-A-60 001602.

(List continued on next page.)

*Primary Examiner*—David M. Gray
*Attorney, Agent, or Firm*—Sandler Greenbaum & Bernstein

[57] ABSTRACT

An image magnification control device for a camera. Control focal length required to maintain an image magnification constant is computed based upon defocus infomation detected by using a light having passed through a photographic lens.

In case focal length of the photographic lens comes out of a range wherein the set image magnification can be obtained, various operations such as shutter-release lock operation are executed depending upon designs.

9 Claims, 42 Drawing Sheets

FOREIGN PATENT DOCUMENTS

| | | |
|---|---|---|
| 60-1602 | 1/1985 | Japan . |
| 61-26015 | 2/1986 | Japan . |
| 61-38917 | 2/1986 | Japan . |
| 61-230111 | 10/1986 | Japan . |
| 62-118328 | 5/1987 | Japan . |
| 62-133430 | 6/1987 | Japan . |
| 62-133431 | 6/1987 | Japan . |
| 62-200340 | 9/1987 | Japan . |
| 63-5331 | 1/1988 | Japan . |
| 63-131112 | 6/1988 | Japan . |
| 63-189817 | 8/1988 | Japan . |
| 63-220118 | 9/1988 | Japan . |
| 64-44428 | 2/1989 | Japan . |
| 64-44429 | 2/1989 | Japan . |
| 64-56406 | 3/1989 | Japan . |
| 64-62608 | 3/1989 | Japan . |
| 64-79713 | 3/1989 | Japan . |
| 1-99011 | 4/1989 | Japan . |
| 1-99012 | 4/1989 | Japan . |
| 1123026 | 5/1989 | Japan . |
| 1131509 | 5/1989 | Japan . |
| 1179113 | 7/1989 | Japan . |
| 1232311 | 9/1989 | Japan . |
| 1307711 | 12/1989 | Japan . |
| 2-12116 | 1/1990 | Japan . |

OTHER PUBLICATIONS

English Language Abstract JP 1-131509.
English Language Abstract of JP 1-123026.
English Language Abstract of JP 1-99012.
English Language Abstract of JP 1-99011.
English Language Abstract of JP 64-79713.
English Language Abstract of JP 64-62608.
English Language Abstract of JP 64-56406.
English Language Abstract of JP 64-44429.
English Language Abstract of JP 64-44428.
English Language Abstract of JP 63-220118.
English Language Abstract of JP 63-5331.
English Language Abstract of JP 63-200340.
English Language Abstract of JP 62-133431.
English Language Abstract of JP 62-133430.
English Language Abstract of JP 62-118328.
English Language Abstract of JP 61-230111.
English Language Abstract of JP 61-38917.
English Language Abstract of JP 61-26015.
English Language Abstract of JP 53-113527.
Infinity Super Zoom 300 Camera Instruction Manual, p. 67, published Jul. 1988.

FIG. 43
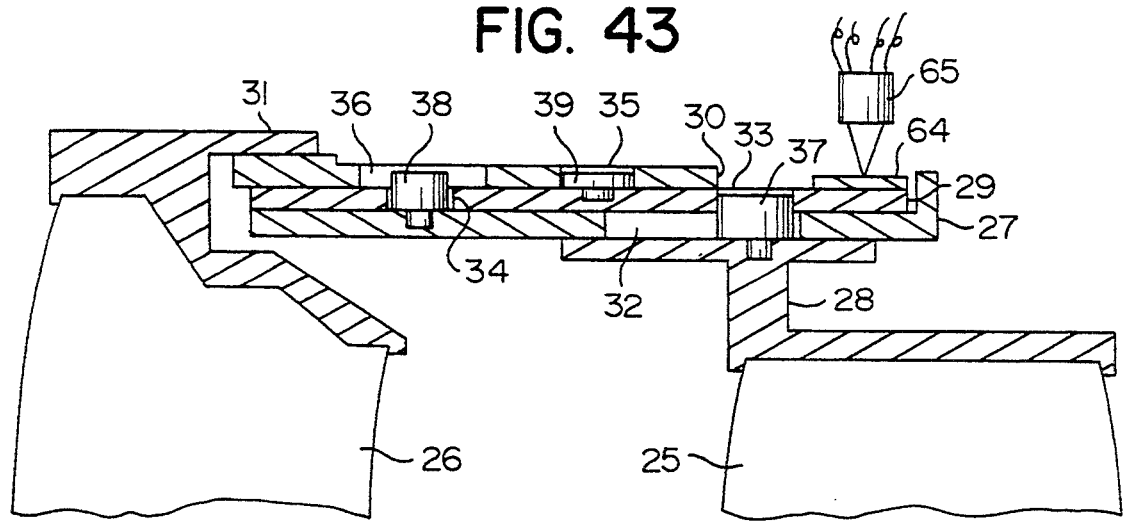
FIG. 44(A)
FIG. 44(B)

IMAGE MAGNIFICATION CONTROL DEVICE FOR A CAMERA

This application is a continuation of application Ser. No. 07/881,785, filed May 11, 1992, which issued as U.S. Pat. No. 5,283,607 on Feb. 1, 1994 which is a continuation of application Ser. No. 07/652,038, filed Feb. 4, 1991, which issued as U.S. Pat. No. 5,159,377 on Oct. 27, 1992 which is a continuation of application Ser. No. 07/410,880, filed Sep. 22, 1989, which issued as U.S. Pat. No. 5,093,680 on Mar. 3, 1992.

BACKGROUND OF THE INVENTION

This invention relates to an image magnification control device for a camera, wherein a photographic lens for a camera including single lens reflex cameras and video still cameras is driven and controlled by a zoom drive means so as to automatically control an image magnification of the photographic lens to a predetermined magnification.

A desireable feature for a power zoom camera is to be able to maintain a constant image magnification of an object as the distance between the object and the camera varies. For instance, when taking a series of continuous photographs, of for instance, a baseball player running to catch a ball, the photohgrapher may wish that the baseball player occupies the same area of the film frame as the player moves. This can be accomplished by varying the focal length of the lens the player moves. Unfortunately, as individual can not change the magnification value (by changing the focal length of the lens) fast enough and accurately enough to achieve the desired result.

Over the years camerat manufacturers have developed power zoom lens for lens shutter cameras. This enable a photographer to quickly and smoothly change the focal length of the camera lens. Lens shutter caneras typically employ a triangulation technique to determine the distance of an object to be photographed from the camera. In the triangulation technique, a source of light, such as infared or ultrasonic, is emitted by the camera. The light source is bounced off of an object to photographed and returned to the camera. By utilizing the triangulation technique, the distance, "a" of the object can be determined.

The magnification value of a lens shutter camera is determined by the equation m=f/a, where "m" equals the magnfication value, "f" equals the focal length of the lens and "a" equals the distance of the objects from the camera. If a constant picture image size is to be maintained, the lens shutter camera must merely determine the distance of the object from the camera and change the focal lenght of the lens according to the above equation, so that the magnification value, "m", remains constant. This is easily accomplished with a power zoom, auto-focus, lens shutter camera.

Many individuals prefer using interchangeable lens camera, such as SLR cameras, because a plurality of different lenses can be easily attached to a camera body. It would be disireable to enable an interchangealbe lens camera to also be able to maintain a constant picture image size as the object to be photographed moves relative to the camera. However, constant image magnification techniques that are applicable to lens shutter cameras are not applicable to interchangealbe lens cameras.

In an interchangeable lens camera, triangulation techniques are generally not used for focusing purposes because of inherent inaccuracies. Such inaccuracies are acceptable when a small size lens (ie. 70 mm) is used, but is naccceptable when a large size lens (ie. 200 mm) is employed. Due to the intrinsic errors of the triangulation technique, manufacturers developed a thchnique for focusing an object based on the amount of defocus of the object to be photographed. Two defocus techniques are phase difference detection (PDD) method and contrast defference (CD) method.

A camera employing the defocus technique for focusing does not determined the distance, "a" of an object from the camera. Thus it is pot possible to maintain a constant imge magnification value, "m" as the distance, "a" of an object changes, using the techniques developed for lens shutter cameras (ie., m=f/a), because the typical interchangeable lens camera is to be able to maintain a constant image magnification value as the distance of an object from the camera moves, distance of an object to be photographed from the camera moves.

Two methods exist for making an image on a film frame occupy the same amount of space, even though the distance between the object to be photographed and the camera varies. In the furst method, the photographer perliminarily sets the size of the image before taking a picture. For instance, the photographer can select a portrait mode of operation, after which all pictures that are taken will be of teh portrait type. In the second method, the camera photographer likes the size of, the image (as shown in the viewfinder), the operator "fixes" the size. Thereafter, even if the object moves or the lens zooms. the image size of the object will be fixed. The present invention embodies both methods for making the image constant.

An image magnification control device for a camera, using a linking mechanism for a zoom lens device is disclosed, for example, in Japanese Patent Publication No. SH060-1602. In this prior art, a cam mechanism provided in a zoom lens controls the amount of zooming of the zoom lens so as to keep the ratio of a real subject length and a real focal length constant. Moreover, In this cam mechanism, a cam surface provided in a lens barrel is formed in a shape of a logarithmic curve. By touching a linked roller which travels in the forward and backward directions in parallel with the lens axis to the cam surface using a spring, as the lens barrel rotates, the linked roller follows the cam surface. In addition, a variable resistor is linked with the linked roller so as to control the amount of zooming by means of such a variable resistor.

However, it is preferred that the position where the linked roller touches the cam surface be at the intersection of a plane including the center line of the linked roller and the lens axis and of the cam surface.

However, there is a limit to decrease the radius of the linked roller. Since the cam surface is in the shape of a logarithmic curve rather than a linear shape, the position where the linked roller touches the cam surface deviates from the intersection described above due to a change of slope of the cam surface. Thus, there is a tendency where the amount of deviation depends on the degree of the slope of the cam surface. Such a deviation is undesirable for a precise zooming control.

In addition, it is very difficult to accurately machine a cam surface in the shape of a logarithmic curve with a high precision.

Further, a camera which is equipped with a CPU used for conducting an autofocus control and process control has been developed. For such type camera, motors therein may drive a zoom lens and conduct said image magnification.

When a release process is performed while a subject is out of the range where the image magnification can be controlled, a photograph is taken in the condition where a predetermined image magnification is not obtained resulting in undesirable situation.

In this case, when a subject is moved out of a range where the image magnification can be controlled, the image magnification control is temporarily-stopped When the subject is moved into the allowable range of the image magnification control, it is desirable to resume the image magnification control. In addition, it is preferred that this operation be conducted simply.

Moreover, there has been a camera which is equipped with an interchangeable lens. For such type camera, motors therein may drive a zoom lens and conduct said image magnification.

In the meantime, when such an image magnification control is performed in the sequence shot mode, if a subject is moved after it has been focused until the next release process is conducted, the next shots would be unfocused.

Further, new types of electronically controlled cameras have been developed such as autofocus control and program control. Conventionally, a camera has been known wherein a focus lock takes place when a subject is focused and a light metering operation is started by turning on a light metering switch in an auto and in-focus priority mode. As another prior art, a camera has been devised wherein pressing an image magnification mode setting switch allows an autofocus operation and power zoom operation to take place regardless of a distance to a subject so as to automatically control an image magnification of a photographic lens. By combining such functions, although it can be considered to enhance the performance of cameras, it is desirable to fully bring both the functions to the cameras.

SUMMARY OF THE INVENTION

Accordingly, an object of the presnt invention is to provide a technique for maintiaining a constant image magnification value of an object that moves relative to the camera by varying the focal length of the lens secured to the camera.

An advantage of the present invention is its applicability to all types of cameras, such as lens shutter cameras, SLR cameras, electronic video cameras and electronic still cameras.

Another advantage of the present invention is the ability to provide an image magnification control device which can automatically control an image magnification to a predetermined value without using a cam mechanism.

Another object of the present invention is to provide an image magnification control device which prohibits a user from taking a photograph when a subject is not in the allowable range of the image magnification control until the subject is in the allowable range so as to prevent wasteful photographs.

Further object of the present invention is to provide an image magnification control device for lens interchangeable cameras so as to easily set an image magnification from the outside.

Still further object of the present invention is to provide an image magnification control device for a camera wherein after a subject is focused and a shutter is released in the sequence shot mode, the subject is focused again, thereby photographs in focus can be taken even if the subject which has been focused moves between shutter release operations.

Other object of the present invention is to provide an image magnification control device of a camera which satisfies both the focus lock function and image magnification function in the manner that when the image magnification control signal is output from said image magnification setting means in the in-focus priority mode of the priority mode selection switch, the light metering switch is turned on and a subject is focused, so that the image magnification control takes place rather than the focus lock.

For the above purposes, according to the present invention, there is provided an image magnification control device for a camera, which controls the image magnification to be a set magnification, said device comprising:

defocus information detection means for detecting a defocus information by using a light having passed through the photographic lens;

computation means for computing a control focal length, which is required to maintain the image magnification at the set magnification, based upon the defocus information detected by said detecting means; and focal length of control means for changing a focal length of the photographic lens so as to meet said control focal length.

Optionally, the image magnification setting means may comprise an external setting means to set the image magnification from outside the camera.

The term "defocus information" represents an amount and a direction of defocusing of a photographic lens with respect to an ideal focal plane. The term "defocus amount dx" used hereinafter corresponds to the above "defocus information" and accordingly "defocus amount dx" can be either of positive or negative values.

According to another aspect of the invention, there is provided an image magnification control device for a camera comprising:

distance detection means for detecting a distance "$X_0$" between a rear focal point of a photographic lens and an in-focus position from the delivery-amount of a focusing lens;

defocus information detection means for detecting a defocus information "dx" of photographic lens by using a light having passed through the photographic lens;

focal length detection means for detecting a focal length "$f_0$ of the photographic lens;

image magnification setting means for setting an image magnification "$m_0$" for taking a photogtraph;

computation means for computing a control focal length "$f_1$" in accordance with an equation:

$$f_1 = \frac{f_0^2 * m_0}{x_0 + dx}$$

using said $x_0$, $d_x$, $f_0$ and $m_0$; and focal length control means for changing focal length of the photographic lens so as to meet said control focal length.

In other aspect of the invention, there is provided an image magnification control device for a camera comprising:

image magnification setting means for setting an image magnification to a certain magnification;

focal length detection means for detecting a focal length of a photographic lens;

focal length control means for controlling the focal length of said photographic lens so as to maintain the image magnification set by said image magnification setting means; and determining means for determining whether the set image magnification is in a controllable range with the present focal length detected by said detection means.

Optionally, the above device further comprises inhibit means for inhibiting a shutter-release operation until said focal length comes into a range whereby said set image magnification can be obtained when it is determined by said determining means that said image magnification is out of said controllable range.

Further optionally, the above device further comprises inhibit means for inhibiting the image magnification control by disabling said focal length control means until said focal length comes into a range wherein said set image magnification can be obtained, when it is determined by said determining means that said image magnification is out of said controllable range.

Moreover, the above device may optionally comprise indication means for indication of warning, when it is determined by said determining means that said image magnification is out of said controllable range.

According to further aspect of the invention, there is probvided an image magnification control device for a camera, comprising:

focus-driving means for driving a phtographic lens for focusing;

zoom-driving means for driving said photographic lens for zooming;

image magnification setting means for setting an image magnification to a certain magnification;

focal length detection means for detecting a focal length of the photographic lens:

determining means for determining whether the image magnification set by said image magnification is in a cotrollable range with the present focal length detected by said detection means; and control means for controlling said zoom-driving means to maintain the image magnification set by said image magnification setting means, wherein said control means disables at least one of said zoom-driving means and said focus-driving means when it is determined by said determining means that said image magnification is out of said controllable range until it is determined by said determining means that the focal length comes back in a range wherein said set image magnification can be obtained, In still further aspect of the invention, there is provided an image magnification control device for a camera wherein either a single-shot photographing mode or a sequential-shots photographing mode can be is selected, said device comprises:

image magnification setting means for setting image magnification to a certain magnification; and control means for driving a photographic lens so as to maintain the image magnification set by said image magnification setting means, wherein said control means drives said photographic lens, in case the sequential-shots made is selected, in such a fashion that once a subject is focused at the image magnification set by said image magnification setting means in the sequential-shots photographing mode, focusing operation is sequentially performed at the set image magnification as the subject moves.

Other aspect of the invention provides an image magnification control device for a camera wherein either a focus-priority mode or a shutter-release priority mode can be selected, said device comprises:

image magnification setting means for setting image magnification to a certain magnification; and control means for driving a photographic lens so as to maintain the image magnification set by said image magnification setting means, wherein said control means executes focus-lock operation when a subject is focused in the focus-priority mode while the image magnification has not been set, and wherein said control means executes image magnification control without-exeuting focus-lock operation when a subject is focused in the focus-priority mode while the image magnification has been set by said image magnification setting means.

DESCRIPTION OF THE ACCOMPANYING DRAWINGS

FIG. 8 (b) is a descriptive diagram which describes the meaning of the coordinates shown in FIG. 8 (a);

FIG. 9 (b) is a descriptive diagram which describes the meaning of the coordinates shown in FIG. 9 (a);

Figure 14:
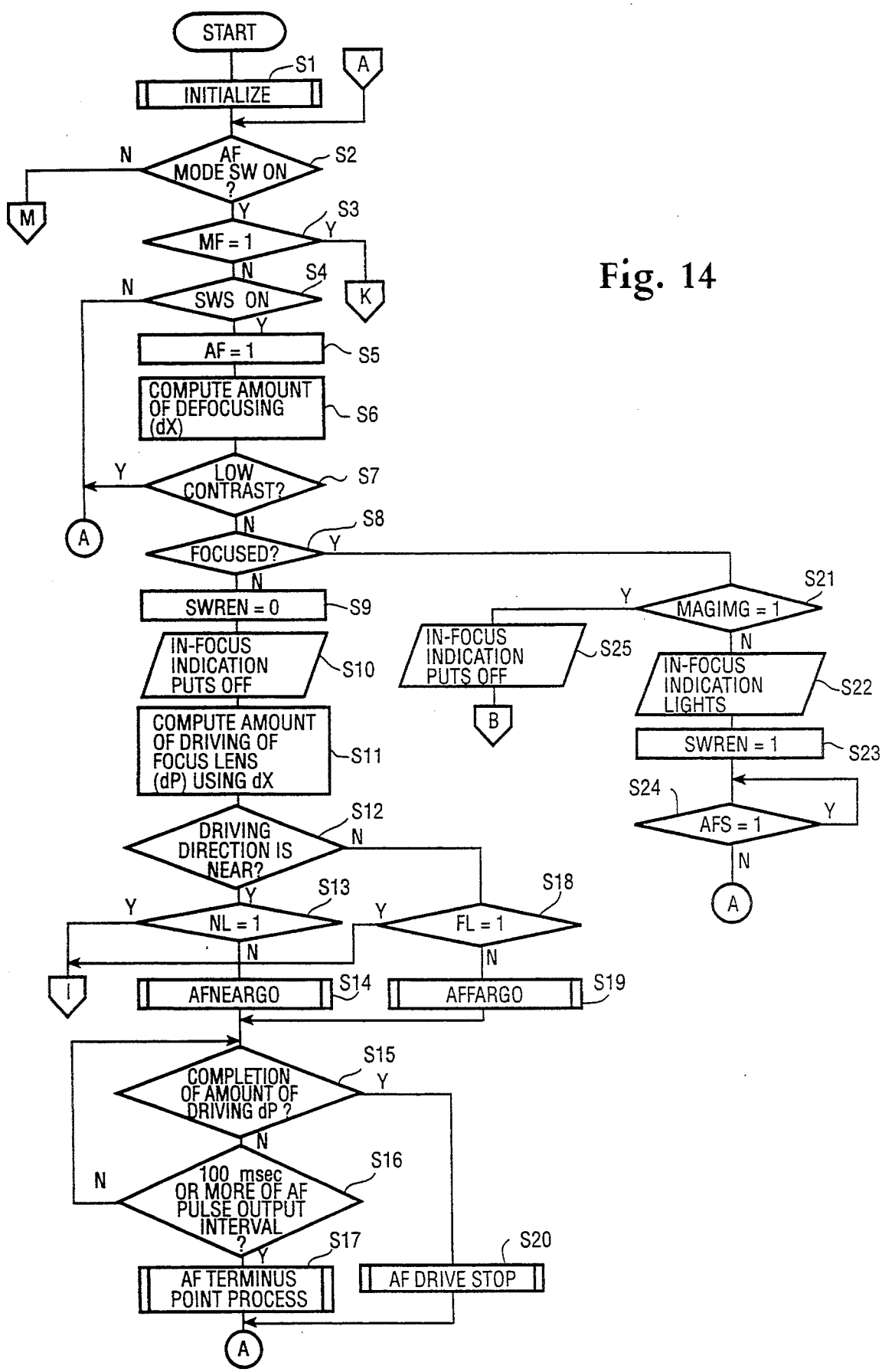
FIGS. 14 to 42 are flow charts describing the operations of the image magnification control device of the camera in accordance with the present invention.
Figure 14A:
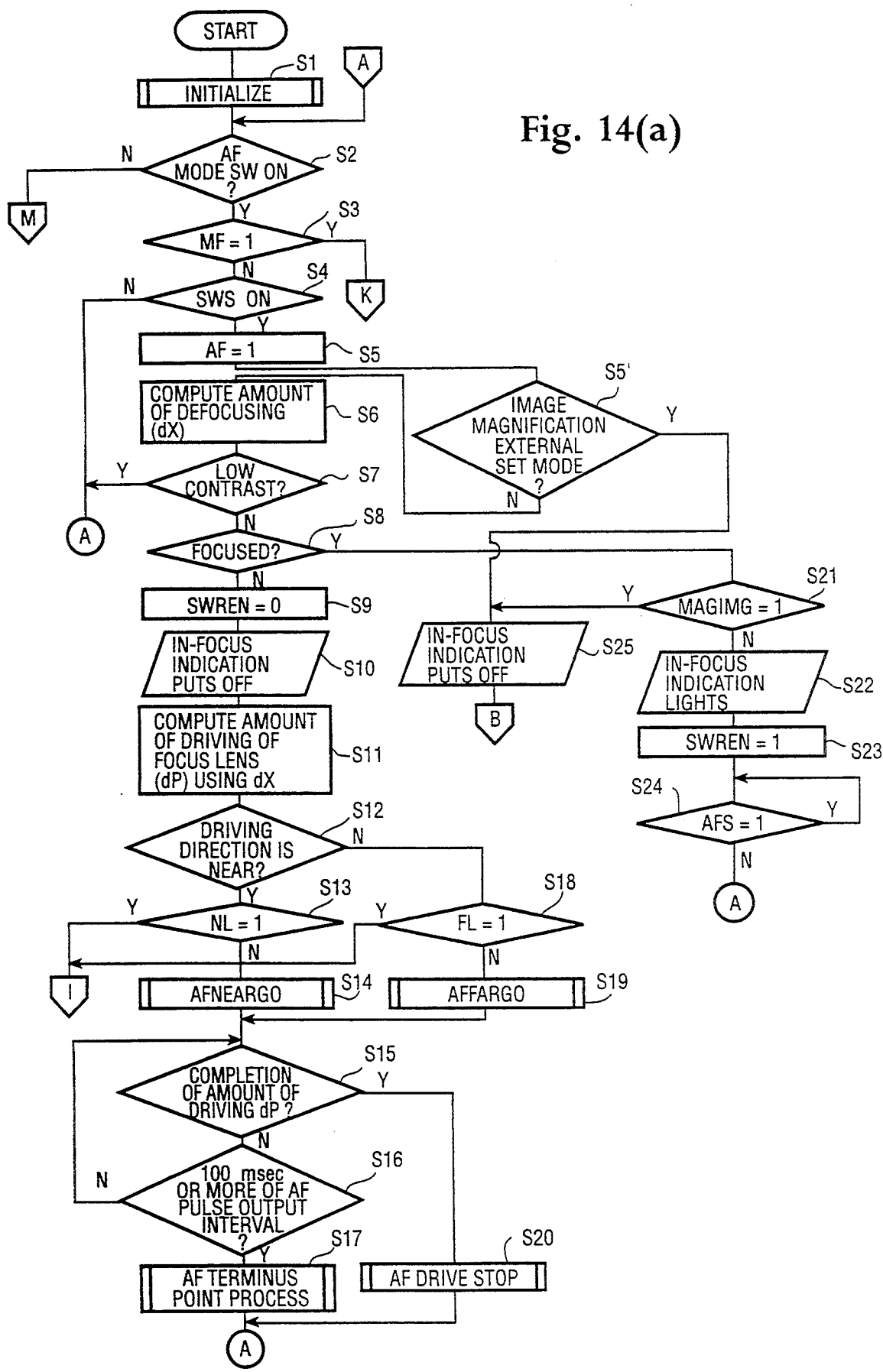
Figure 15:
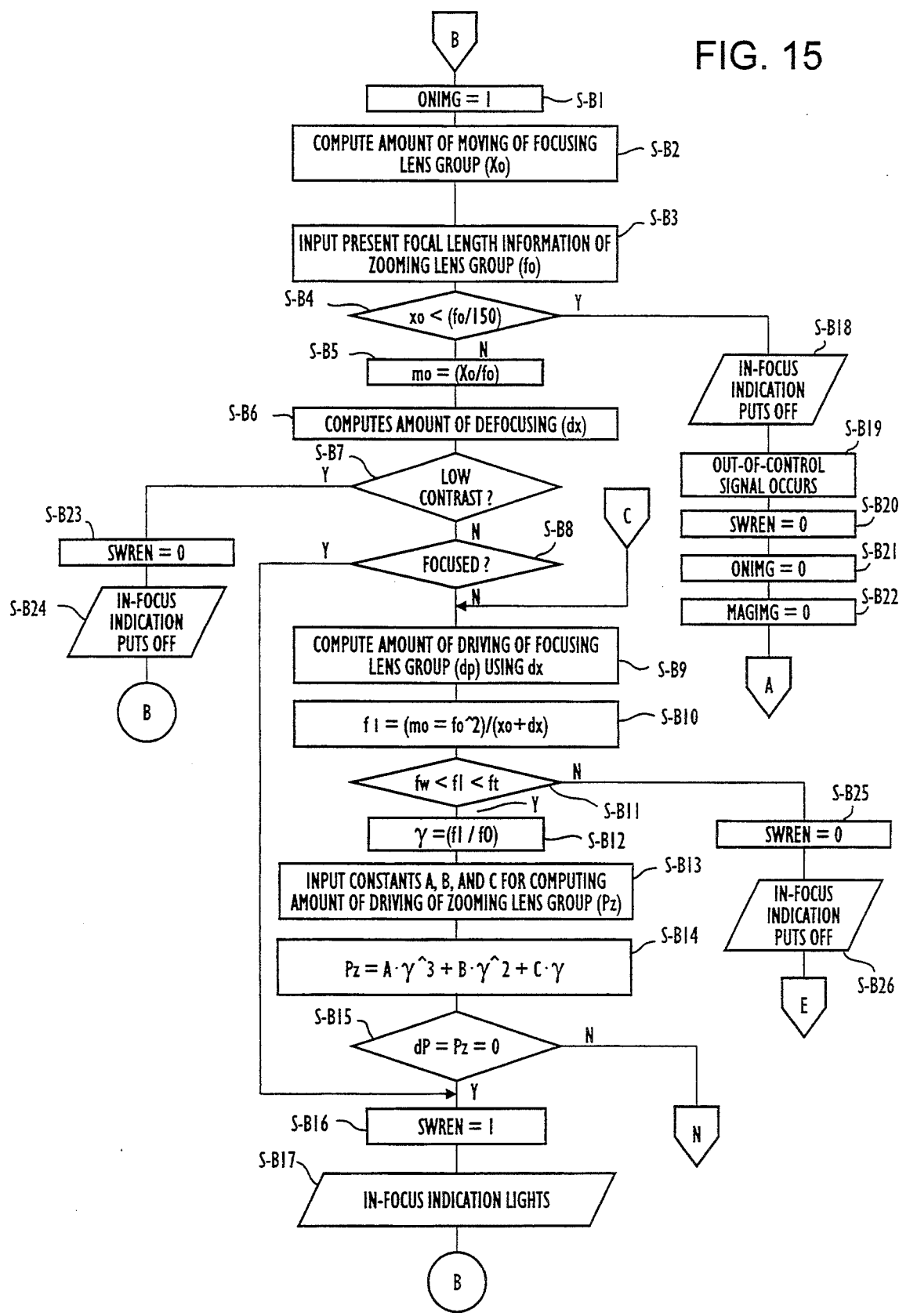
Figure 17:
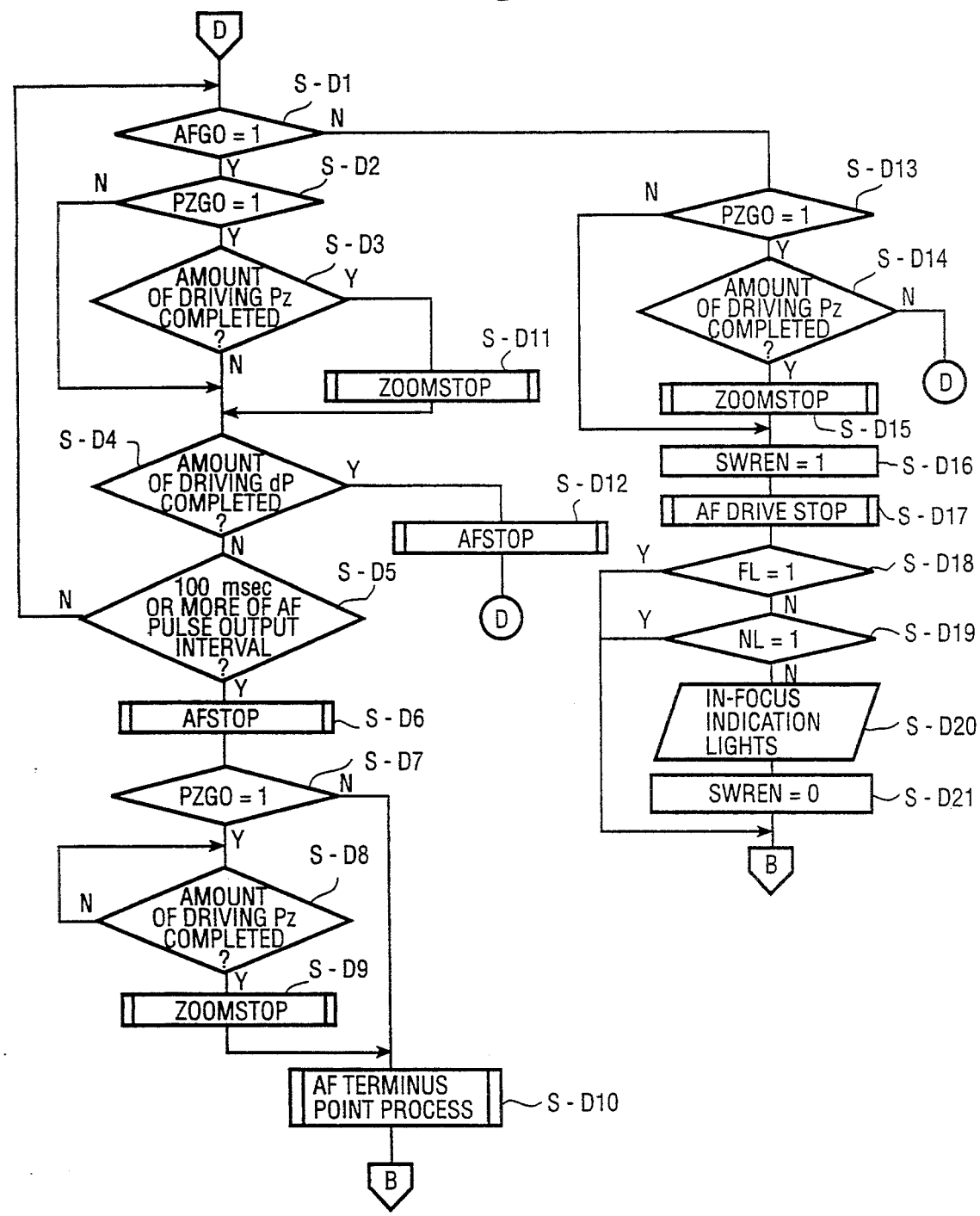
Figure 45:
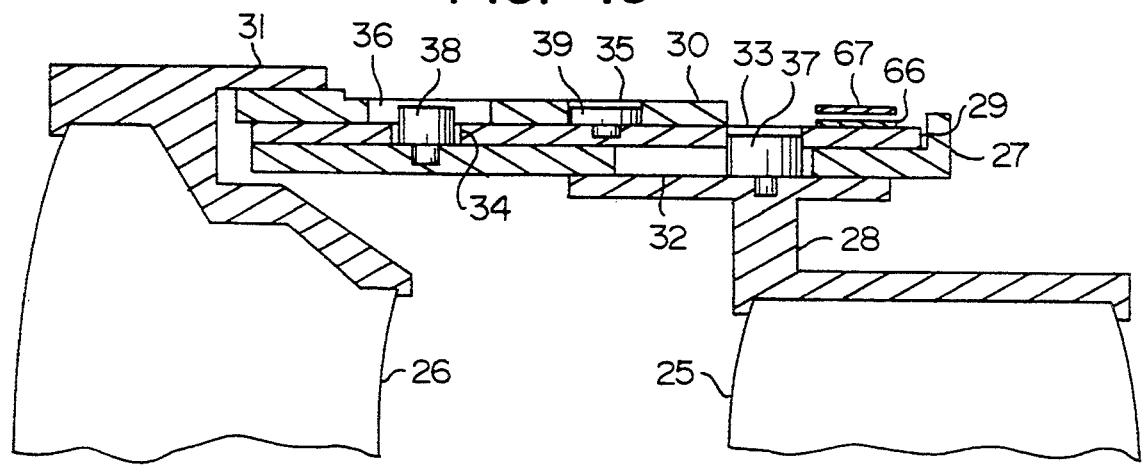
Figure 46:
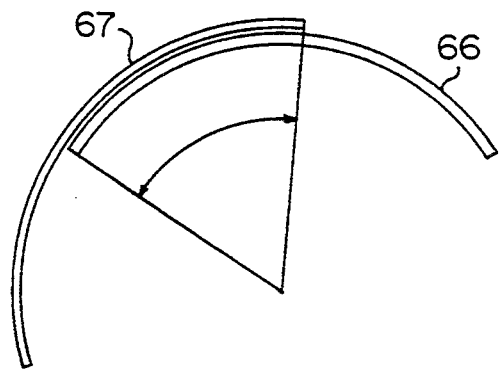
Figure 47:
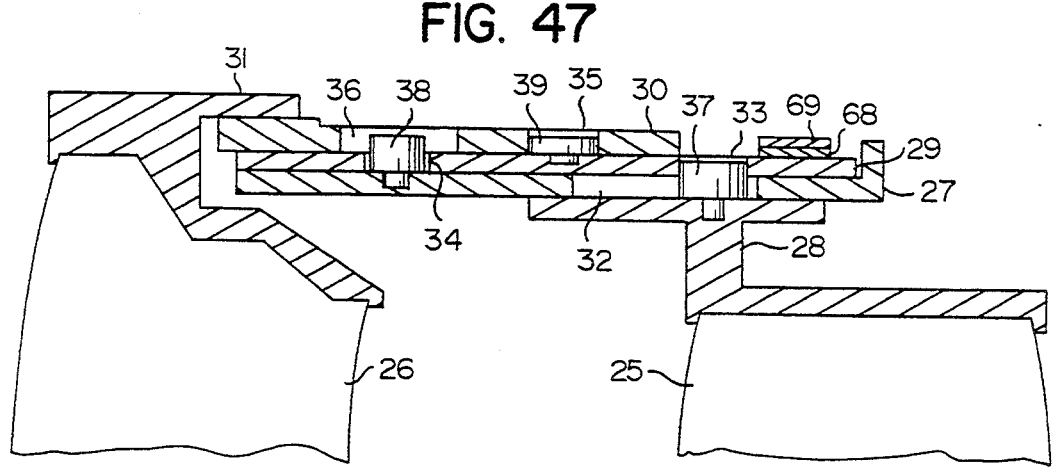
Figure 48:
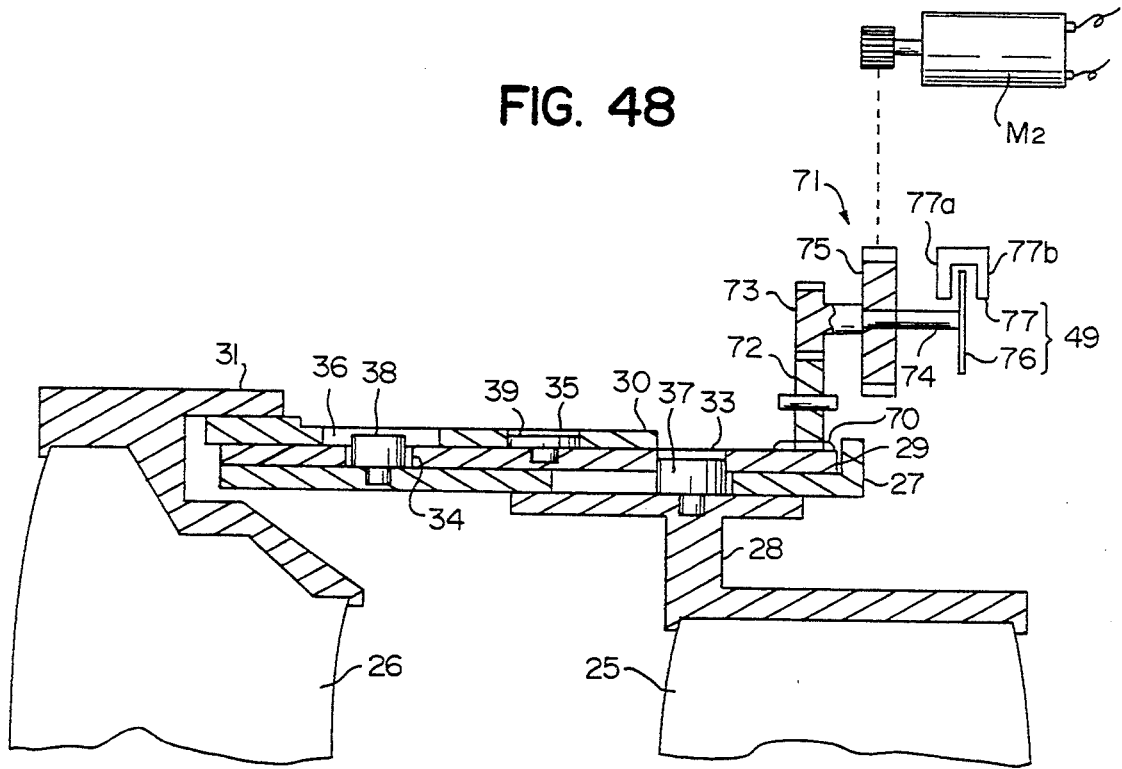
Figure 49:
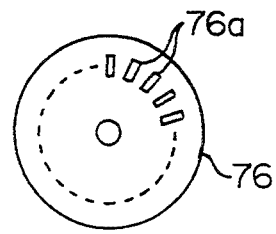
Figure 50:
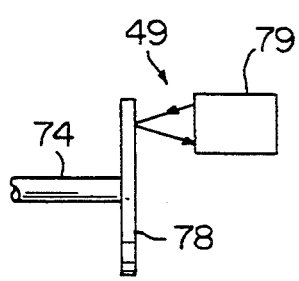
Figure 51:
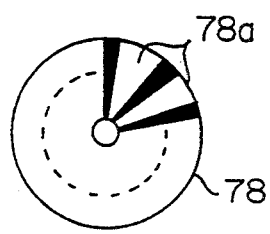
Figure 52:
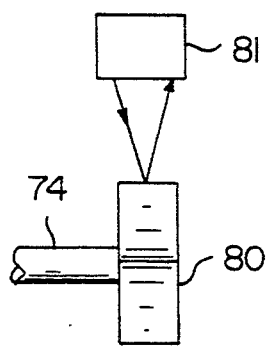
Figure 53:
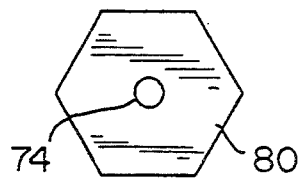

FIG. 14(a), 15(a), 15(b) and 17(a) are modifications of FIGS. 14, 15 and 17, respectively;

FIG. 43 is a descriptive diagram showing another example of the zoom position detection means for detecting a zoom position of the zooming lens group;

FIG. 44 is an exploded diagram of the reflection plate shown in FIG. 43;

FIG. 45 is a descriptive diagram showing another example of the zoom position detection means for detecting a zoom position of the zooming lens group;

FIG. 46 is a descriptive diagram of the electrode plate shown in FIG. 45;

FIG. 47 is a descriptive diagram of another example of the zoom position detection means for detecting a zoom position of the zooming lens group;

FIG. 48 is a descriptive diagram which conceptually shows an example of the power zoom mechanism of the photographic lens;

FIG. 49 is a front view of the slit plate shown in FIG. 48;

FIG. 50 is a front view of another example of the PZ pulser shown in FIG. 48;

FIG. 51 is a descriptive diagram of the reflection plate shown in FIG. 50;

FIG. 52 is a descriptive diagram showing another example of the PZ pulser shown in FIG. 48; and FIG. 53 is a front view of the multiple side reflector shown in FIG. 52.

DESCRIPTION OF THE EMBODIMENTS

Figure 1:
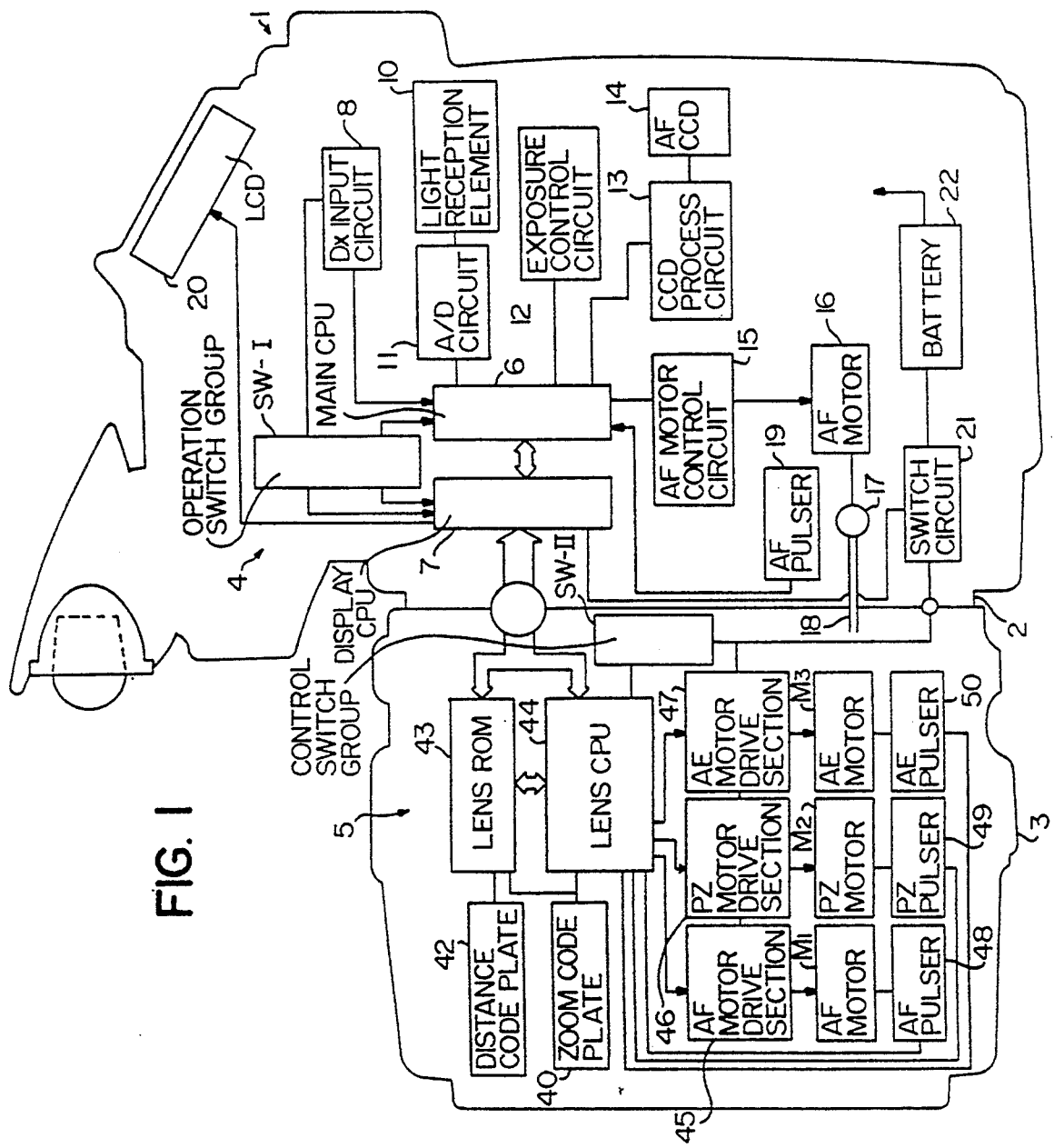
FIG. 1 is a control block circuit diagram of a image magnification control device of a camera in accordance with the present invention.

FIG. 1 illustrates an outlined descriptive diagram of a camera which is provided with a function which keeps an image magnification constant regardless of whether a subject moves. The camera comprises a camera main unit 1, a lens mount 2 that is part of the camera main unit 1; and a photographic lens 8 that is interchangeably mounted on the lens mount 2. The photographic lens 8 is provided with an autofocus mechanism (AF mechanism) comprising a focus drive means and a power zoom mechanism (PZ mechanism) comprising a zoom drive mechanism. In the embodiments, AF and PZ refer to autofocus and power zoom, respectively.

A zoom lens can be constructed in many-ways. Two types of zoom lenses are commonly employed in cameras. The first commonly employed type of zoom lens is referred to as a so called zoom lens. The second type of commonly employed zoom lens is referred to as a vari-focal lens. It is understood that the present invention is not limited to any particular zoom lens construction.

In a so called zoom lens, light rays that pass through the lens are always projected to a fixed point, such as the film image plane, regardless of the setting of the focal length of the lens. In a vari-focal zoom lens, light rays that pass through the lens are not always projected to a fixed point. That is, the vari-focal lens has the disadvantage that as the focal length of the lens changes, the light rays that pass through the lens falls either in front of or behind the film image plane. Thus, it is necessary to compensate for the positioning of the focusing lens elements so that the light rays will fall onto the film image plane.

Figure 2:
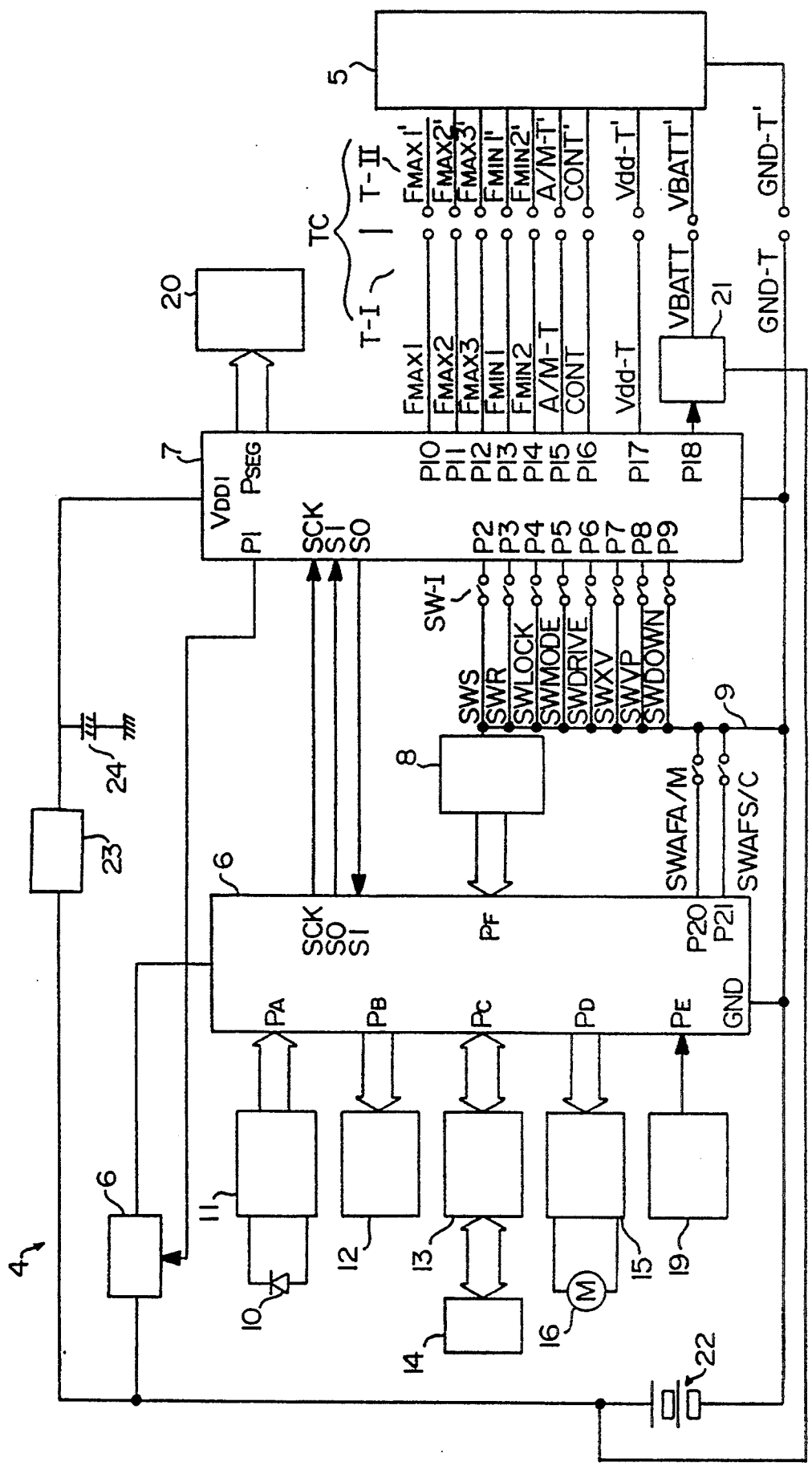
FIG. 2 is a detail circuit diagram of the image magnification control device in the camera body of the camera shown in FIG. 1.

The camera main unit 1 includes a camera control circuit 4, which is more clearly shown in FIG. 2. The photographic lens includes a lens control circuit 5, which is more clearly shown in FIG. 3.

Camera Control Circuit

The camera control circuit 4 comprises a main CPU 6 and display CPU 7. A serial input terminal SI of the main CPU 6 is connected to a serial output terminal SO of the display CPU 7; a clock terminal SCK of the main CPU 6 is connected to a clock terminal SCK of the display CPU 7.

Terminal PF of the main CPU 6 is connected to a DX circuit 8 for detecting an ISO sensitivity of a film (i.e., DX code). Terminal P20 of the main CPU 6 is connected to a switch, SWAF A/M, for selecting an automatic mode or a manual mode of the camera main unit. Terminal 21 of the main CPU 6 is connected to a switch, SWAF S/C, which selects an in-focus priority mode or a release priority mode of operation.

The DX circuit 8 and an switches SWAF A/M and SWAF S/C are connected to a ground wire 9. Terminals P2 to P9 of the display CPU 7 are serectively connected to the ground wire a through a switch group SW-I which includes a light metering switch SWS, a release switch SWR, a power ON/OFF lock switch SWLOCK, mode switch SWMODE, a drive switch SWDRIVE, a exposure compensation switch SWXV, an up switch SWUP, and a down switch SWDOWN. By operating the mode switch SWMODE along with the up and down switches SWUP and SWDONW, a program photograph mode, an automatic photograph mode, a manual photograph mode, and so forth can be selected. In addition, by operating the up and down switches SWUP and SWDONW along with the drive switch. SWDRIVE, a sequence shot (i.e., sequential photography) mode, a single shot (i.e., single photograph) mode, a self-timer mode, and so forth can be selected. Moreover, by operating the up and down switches SWUP and SWDOWN along with the exposure compensation switch SWXV, an exposure value can be compensated. The light metering switch SWS and release switch SWR are actually a single push button that activates the lightmeter when the switch is depressed halfway releases the shutter when the switch is fully depressed using a two-step pushbutton which works sequentially in The main CPU 6 includes terminals PA, PB, PC, PD, PE, VDD, and Gnd. A light reception element 10, such as a LED, is used to measures the luminance of a subject that is seen by the photographic lens 3. The ligth reception element 10 is interfaced to a A/D circuit 11, which is then inputted to terminal PA. An exposure compensation signal is outputted from terminal PB to an exposure control circuit 12. Terminal PC is connected to a charge-coupled device (CCD) 14 for AF, namely, in-focus operation, as a defocusing amount detection means through a CCD process circuit 13. The CCD 14 receives a light beam that is bounced off the subject 10 and enters the photographic lens 3, so as to detect a focal point. A motor control signal is inputted from terminal PD to an AF motor control circuit 15. The AF motor control circuit 15 drives and controls an AF motor 16 located in the camera main unit 1.

The AF motor 16 rotates a coupler 18 (FIG. 1) through a speed reduction gear 17. When the photographic lens 3 is mounted on the lens mount 2, the coupler 18 may engage a lens side coupler (which is linked a focusing lens group at the end of the lens barrel), causing the AF motor 16 to be linked with focusing lens group of the photographic lens 3, so that the focusing lens group can be focused by the AF motor 16. However, a lens corresponding to this embodiment does not have to provide a lens side coupler which is engaged with the coupler 18. In such a case, the AF motor 16 does not drive the focusing lens group. In addition, the speed reduction gear 17 is linked with an AF pulser 19, the output of the pulser 19 being inputted to terminal PE of the main CPU 6.

Terminal $P_{SEG}$ on the display CPU 7 is interfaced to a LCD display 20. Terminals P10 to P17 of the display CPU 7 are connected to information transfer connection terminals Fmax1 to Fmax3, Flmn1 and Fmin2, auto/manual information connection terminal A/M-T, common connection terminal Cont, and power connection terminal Vdd-T, respectively. An ON/OFF signal is inputted from terminal P18 of the display CPU 7 to a switch circuit 21, which is also connected to a power connection terminal VBat-T.

The possitive side of battery 22 is connected through a regulator 23 to ddl of the display CPU 7 and a capacitor 24. The possitive side of the battery 22 is also connected to power terminal DD of the main CPU 6 through a DC/DC converter 6', and to the switch circuit 21. An ON/OFF control signal is outbutted from terminal P1 of the display CPU 7 and inputted to the DC/DC converter 6'.

The minus side of the battery 22 is connected to ground terminal Gnd of the main CPU 6, ground terminal Gnd of the display CPU 7, the ground wire 9 of the operation switch group SW-I, and a ground connection terminal Gnd-T.

The connection terminals Fmax1 to Fmax3, Fmin1, Fmin2, Cont, Vdd-T, VBatt, and Gnd-T are provided at the end of the lens mount 2. They form a connection terminal group T-I of the camera body.

When the main switch, namely, the lock switch SWSLOCK is in the OFF position, an operation signal is not outputted from terminal P1 of the display CPU 7 to the DC/DC converter 6'. Thus, no power is supplied from the battery 22 to the main CPU 6 and the main CPU 6 is in the OFF state.

On the other hand, since the battery voltage is applied to terminal VDD of the display CPU 7 through regulator 23, the display CPU 7 operates even if the lock switch SWLOCK is in the OFF position. In this state, the LCD display 20 is off.

When the lock switch SWLOCK is turned ON, an ON signal is inputted to terminal P4 of the display CPU 7. A display signal is outputted from terminal PSEG of the display CPU 7 to the LCD display 20, and the LCD display 20 lights. At the time, an operation signal is outputted from terminal P1 of the display CPU to the DC/DC converter 6' and the voltage of the battery 22 is applied to terminal VDD of the main CPU 6, activating the main CPU 6.

Power Zoom Focus Structure of Photographic Lens

Figure 4:
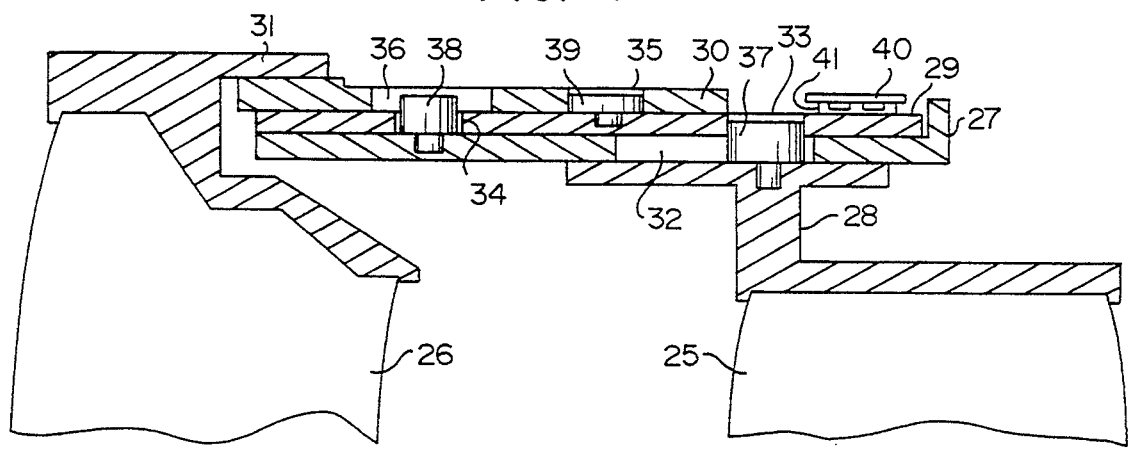
FIG. 4 is an outlined descriptive diagram showing a part of the driving mechanism of the zooming lens group of the photographic lens shown in FIG. 1.

The photographic lens 3 (FIG. 4) provides a power zoom mechanism which drives zooming lens groups 25 and 26 and a focus drive mechanism which drives a focus lens (not shown).

The power zoom mechanism has a ring shaped fixing frame 27; a lens frame 28 which is engaged with the fixing frame 27 in a manner that the lens frame 28 can travel in an axial direction therein, a first cam ring 29 which is engaged with the fixing frame 27 in the manner that the first cam ring can freely rotate on the outer surface of tile fixing frame, a second cam ring 30 which is engaged with the first cam ring 29 in the manner that the second cam ring 30 can freely rotate on the outer surface thereof and can freely travel in the axial direction; and a lens frame 31 fixed to the cam ring 30. The lens frames 27 and 31 mount the lens groups 25 and 26, respectively.

Located on the fixing frame 27, a guide hole 32 which is parallel with the axial line. Located on the cam ring 29 are slit cams 33 and 34. A slit cam 35 and a guide hole 36 are on the cam ring 30, which are parallel with the axial line. A guide roller 37, mounted on the outer surface of the lens frame 28, is inserted and engaged with the guide hole 32 and slit cam 33. A guide roller 37, mounted on the peripheral of the fixing frame 27, is inserted and engaged with the slit cam 34 and guide hole 36. A guide roller 39, mounted on the outer surface of the cam ring 29, is inserted and engaged with the slit cam 35.

The above focus drive mechanism has an AF motor M1, which drives the focus lens group (not shown) and a PZ motor M2 which drives the cam ring 29 (see FIG. 1). A variable aperture stop (not shown) provided in an optical path of the photographic lens 3 is controlled by an AE motor M3. The motor M1 and focus lens group, and the motor M2 and zoom lens group are linked through a friction type clutch.

Figure 5:
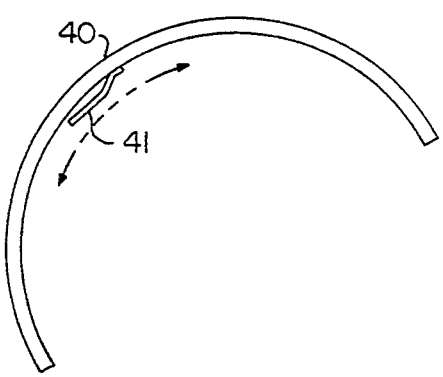
FIG. 5 is a descriptive diagram of the zoom code plate shown in FIG. 4.

Between a base of the cam ring 29 and a code plate mounting member (not shown), located on the fixing frame 27, is a zoom position reading means that is provided as a focal length detection means. The zoom position reading means has a zoom code plate 40 (FIGS. 4, 5) which is supported with a cord plate supporting member which is located concentric with the cam ring 29 and a brush 41 which elastically touches the inner surface of the zoom code plate. In addition, on the inner surface of the zoom code plate 40 are a plurality of pattern contacts which are intermittently provided in the peripheral direction. The pattern contacts and brush 41 work together, outputting a zoom position signal.

On the focus lens side of the lens 3 is a focus position reading means (namely, a distance reading means (not shown)) which is provided as a focus position detection means. The distance reading means uses the same structure as the zoom position reading means. A distance signal is obtained from a distance code plate 42 (refer to FIGS. 1 and 3) which is similar to the zoom code plate 40.

Figure 3:
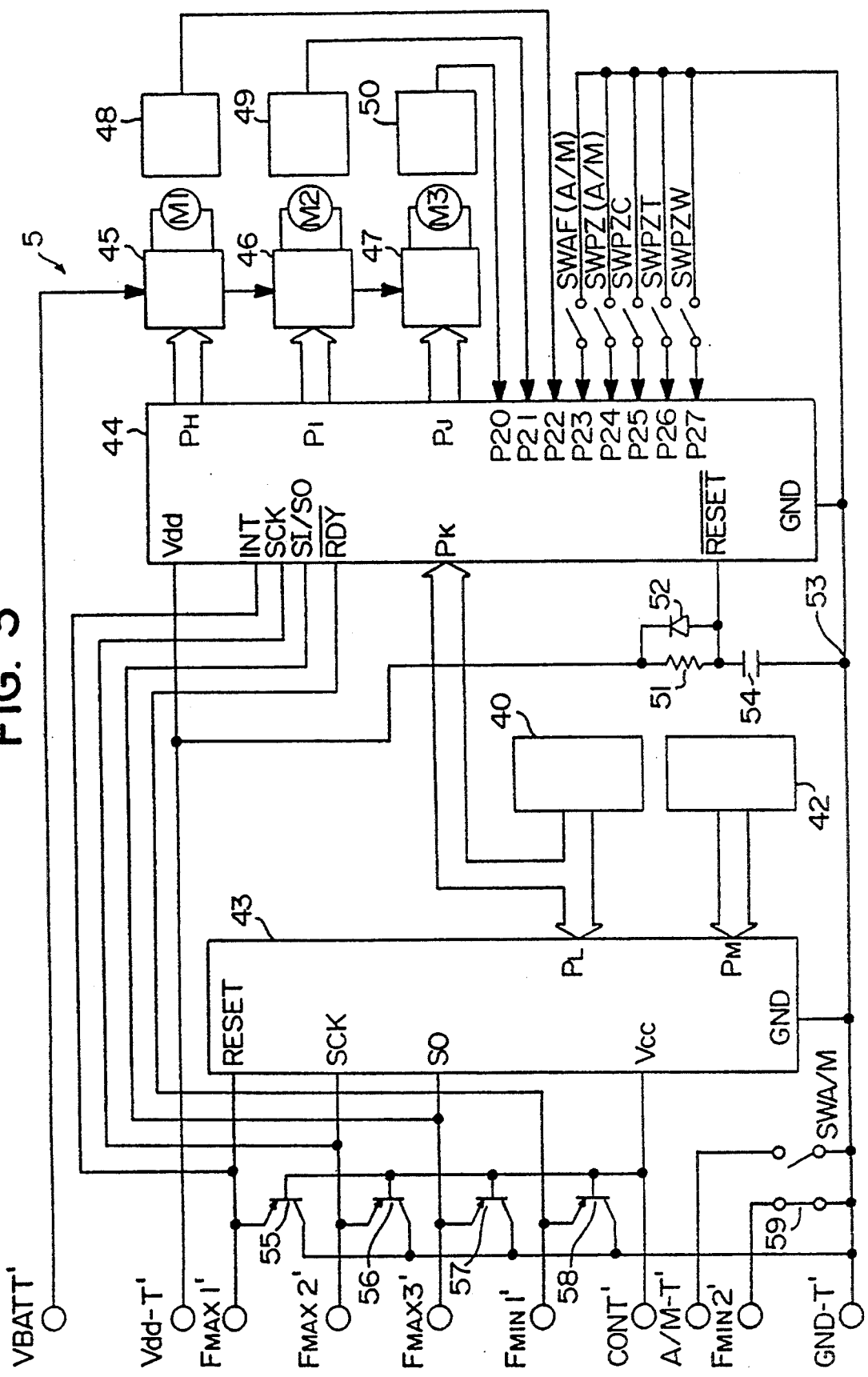
FIG. 3 is a detail circuit diagram of the photographic lens of the image magnlflcatlon control device in the photographic lens of the camera shown in FIG. 1.

Lens Control Circuit Referring to FIG. 3, the end surface of the photographic lens 3 which is connected to the lens mount 2 contains a plurality connection terminals Fmax1' to Fmax3', Fmin1', Fmin2', Cont', Vdd-T', VBatt', and Gnd-T'. When the photographic lens 3 is mounted on the lens mount 2 of the camera body 1, connection terminals Fmax1' to Fmax3', Fmin1', Fmin2', Cont', Vdd-T', VBatt', and Gnd-T' of the lens 3 which form a connection terminal group T-11, are connected to connection terminals Fmax1 to Fmax3, Fmin1, Fmin2, Cont, Vdd-T, VBatt, and Gnd-T, respectively. The connection terminal groups T-II and T-I form a connection section TC. Data is transferred between the camera control circuit 4 and the lens control circuit through the connection section TC.

The photographic lens 8 is equipped with a lens ROM 48 which stores information intrinsic to a lens, and a lens CPU 44 which controls the lens and performs other operations. The information intrinsic to the lens includes the number of pulses for maximally advancing the focus lens group and zoom lens group, availability of power zooming, availability of power focusing, presence of variable focus lens, and focus compensation value by zooming operation. An output signal of the zoom code plate 40 is inputted to terminal PL of the lens ROM 48 and terminal PK of the lens CPU 44. A distance signal from the distance code plate 42 is inputted to terminal PM of the lens ROM 48.

Motor control signals, which are outputted from terminals PH, PI, and PJ of the lens CPU 44, are inputted to an AF motor drive section (AF motor control circuit) 45, PZ motor drive section (PZ motor control circuit) 46, and AE motor drive section (AE motor control circuit) 47, respectively. The motor drive sections 45, 48, and 47 control motors M1, M2, and respectively. The rotations of the motors M1, M2, and M3 are detected by an AF pulser 48 (a focus position detection means), PZ pulser 49 (zoom position detection means, namely, a focal length detection means), and AE pulser 50. Output signals of the pulsers 48, 49, and 50 are inputted to terminals P20 to P22 of the lens CPU 44.

Connection terminal VBatt-T' is connected to power input sections of the motor drive sections 45 to 47. Connection terminal dd-T' is connected to power terminal dd of the lens CPU 44 and to one end of a resistor 51 and the cathode of a diode 52. The other end of the resistor 51 and anode of the diode 52 are connected to a reset terminal RESET of the lens CPU 44 and to one end of a capacetor 54 which the remaining end connected to a ground wire 53. The ground wire is connected to connection terminal Gnd-T', ground terminal Gnd of the lens ROM 43, and ground terminal Gnd of the lens CPU 44. In addition, the ground wire 53 is connected to auto/manual selection switch SWAF-(A/M), power zoom mode switch SWPZ(A/M), image magnification constant mode switch SWPZC (which keeps an image magnification of the zoom lens constant), zoom switch SWPZT (which drives the zoom lens to a Tele terminus (telephoto terminus) side), and zoom switch SWPZW (which drives the zoom lens in a Wide terminus (wide-angle terminus) side). The remaining terminal of the switches SWAF(A/M), SWPZ(A/M), SWPZC, SWPZT, and SWPZW are connected to terminals P23 to P27 of the CPU 44.

Connection terminal Fmax1' is connected to reset terminal RESIST of the lens ROM 43, interrupt terminal Int of the lens CPU 44, and an emitter of transistor 55. Connection terminal Fmax2' is connected to a clock terminal SCK of the lens ROM 43, clock terminal SCK of the lens CPU 44, and an emitter of transistor 56. Connection terminal Fmax3' is connected to a serial output terminal SO of the lens ROM 43, serial input-/output terminal SI/SO of the lens CPU 44, and an emitter of transistor 57. Connection terminal Fmin1' is connected to terminal $\overline{RDY}$ (not RDY) of the lens CPU 44 and an emitter of transistor 58. Connection terminal Fmin2' is connected to the ground wire 53 through a fuse 59 for setting information. Connection terminal A/M-T' is connected to the ground wire 53 though switch SW A/M, which selects an automatic mode (or program mode) and a manual mode which is operated by an aperture ring. Connection terminal Cont' and the bases of transistors 55 to 58 are connected to power input terminal Vcc of the lens ROM 53. The collectors of the transistors 55 to 58 are connected to the ground wire 53.

Theory of Constant Image Magnification

Figure 6:
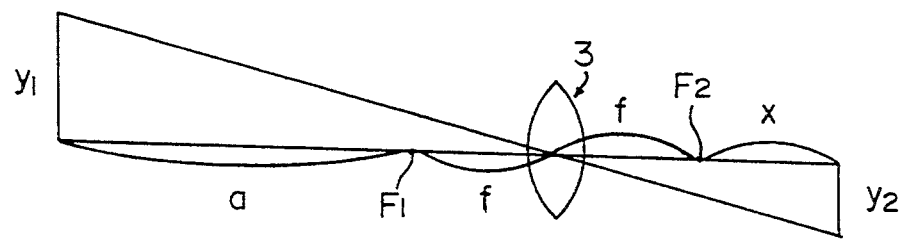
FIG. 6 is an outlined descriptive diagram showing the relationship between a subject and image taken by the photographic lens.

Referriing to FIG. 6, $F_1$ represents a focal position on a front side (substance side, namely subject side), $F_2$ represents a focal position on a rear side (image side) of the photographic lens, $y_1$ represents a size of the substance (subject) on the front side of the photographic lens 3, $y_2$ represents the size of the image focused on the rear side of the photographic lens 3 by rays of light from an infinitive position, a represents a distance from the front focal position $F_1$ to the image; x represents a distance from the rear focal point $F_2$ to the substance; and f represents a focal length of the photographic lens 3. The position at which an image $y_2$ is formed becomes a focused position.

An equation for the image formation shown in FIG. 6 is given as follows:

$$a*x=f^2 \qquad A$$

$$m=y_x/y_1=(x+f)/(a+f) \qquad B$$

Based on the distance a of the subject, the image magnification m can be obtained using equations A and B above:

$$m=f/a \qquad (1)$$

On the other hand, based on the distance x on the image side, the image magnification m can be obtained using equations A and B:

$$m=x/f \qquad (2)$$

Figure 7A:
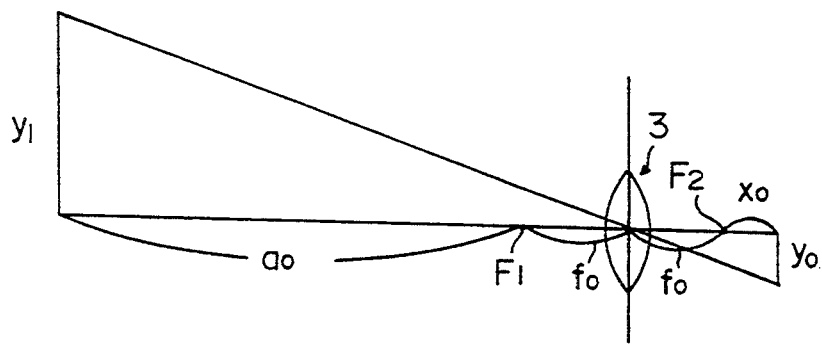
FIG. 7 is an outlined descriptive diagram which describes the image magnification constant theory in accordance with the present invention.
Figure 7B:
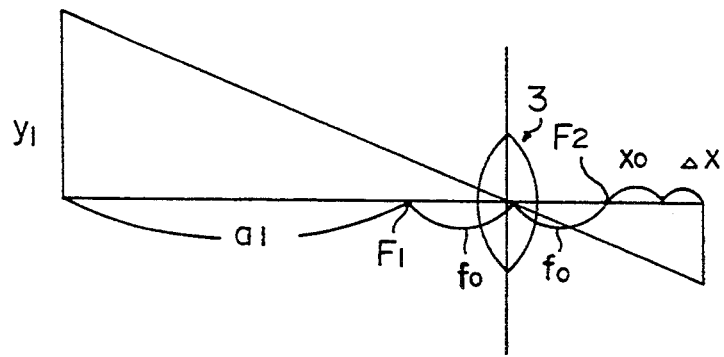
Figure 7C:
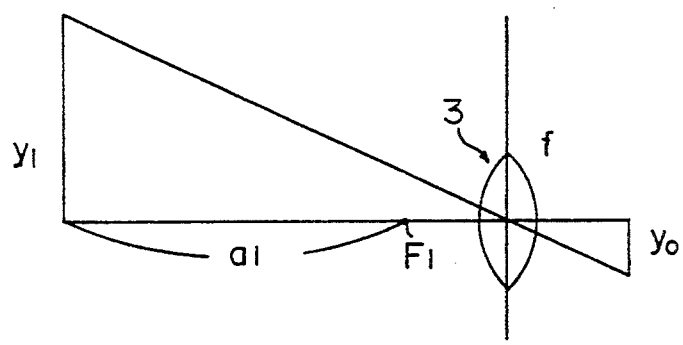

Assuming that the image magnification is $m_0$ when x and f in the equation (2) is $x_0$ and $f_0$, respectively, as shown in FIG. 7 (a), the image magnification $m_0$ is given as follows:

$$m=x_0/f_0 \qquad (3)$$

Assuming that the distance from the front focal position $F_1$ to the substance (subject) $y_1$ is $a_1$ when a defocus dx occurs, as shown in FIG. 7 (b), as the substance $y_1$ moves, equation A becomes:

$$a_1(x_0+dx)=f_0^2 \qquad (4)$$

Tistance $a_1$ can be rewritten using equation (4), as follows:

$$a=f_0^2/(x_0+dx) \qquad (5)$$

Assuming that a new focal length is f so as to keep the image magnification constant ($m_0$: constant), equation (1) can be described as follows:

$$m_0=f/a_1 \qquad (6)$$

Deform the equataton for obtaining the focal length f and substitute equations (3) and (5) into the equation, yielding:

$$f = m_0 \cdot a_1 = m_0 \frac{f_0}{x_0 + dx} \qquad (7)$$
$$= \frac{x_0}{f_0} * \frac{f_0^2}{x_0 + dx} = \frac{x_0 * f_0}{x_0 + dx}$$

With equation (7), the zoom ratio $f/f_0$ is obtained as follows:

$$\frac{f}{f_0} = \frac{x_0}{x_0 + dx} \quad (8)$$

Thus, by driving the zoom ring in accordance with the zoom ratio, the image magnification becomes constant ($m_0 = f/a_1 = x_0/f_0$), as shown in FIG. 7 (c).

Figure 8A:
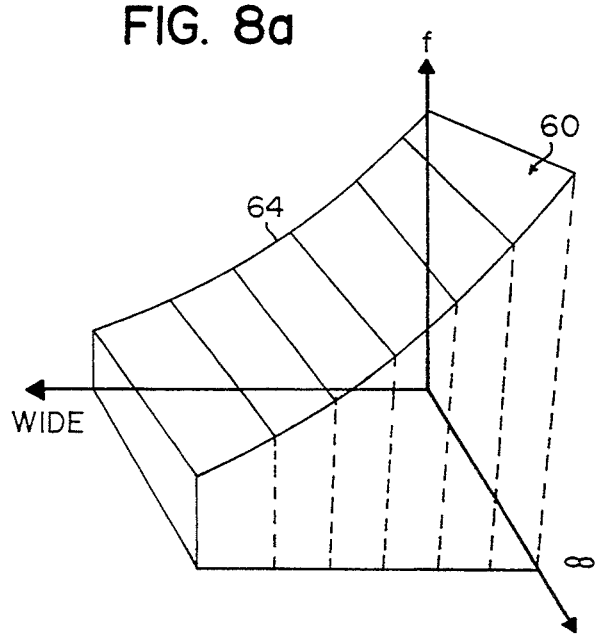
FIG. 8 (a) is a three-dimensional change coordinate diagram showing a change of the focal point of the focusing lens group by a zoom operation.
Figure 8B:
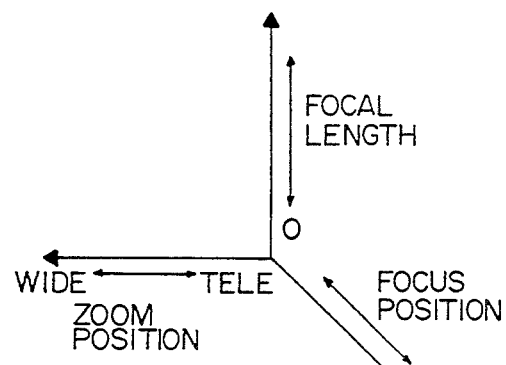
Figure 9A:
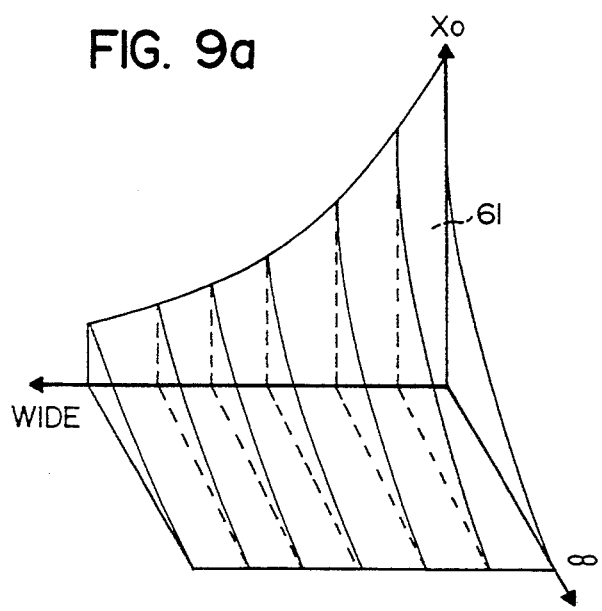
FIG. 9 (a) is a three-dimensional change coordinate diagram showing a change of the amount of defocusing of the focusing lens group by a zoom operation.
Figure 9B:
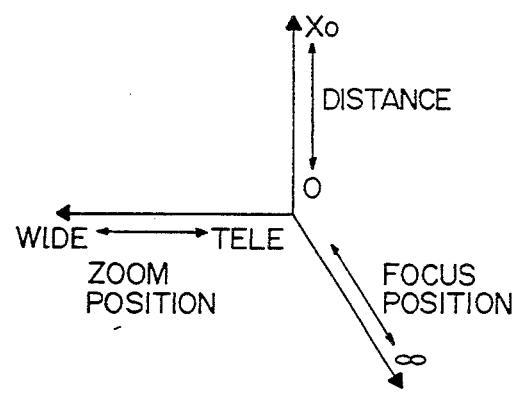

The focal length of the photographic lens 3 changes depending on the zoom position and focus position In three dimensions on a focal point curved surface 60 as: shown in FIG. 8. Consequently, the distance $x_0$ from the focal length to the image also changes depending on the zoom position and focal position in three dimensions on a surface 61 as shown in FIG. 9.

Figure 10:
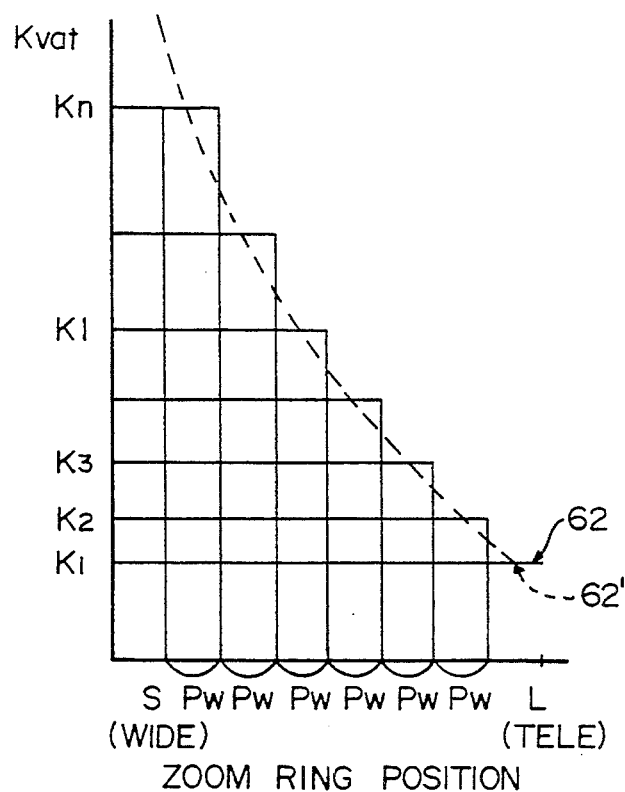
FIG. 10 is a descriptive diagram showing the relationship between a zoom position and K value of the zooming lens group.
Figure 11:
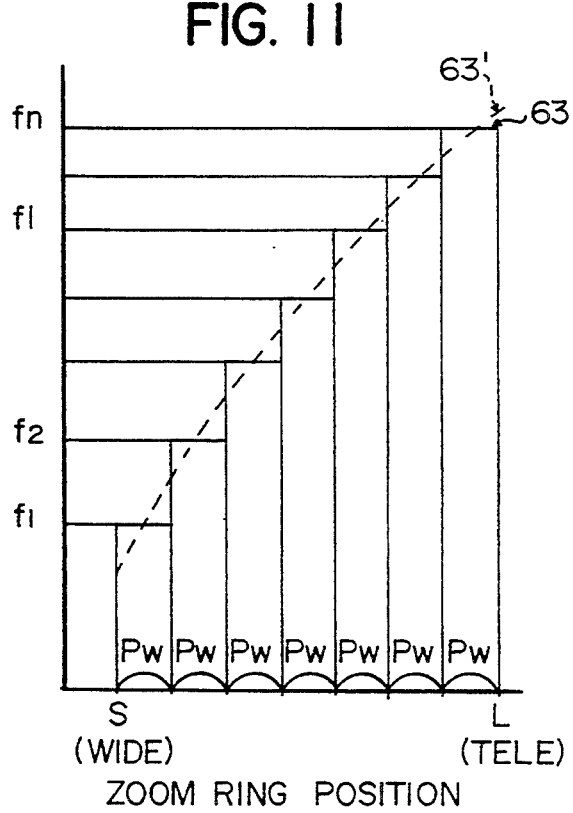
FIG. 11 is a descriptive diagram showing the relationship between a zoom position of the zooming lens group and the focal length of the focusing lens group.

Moreover, the K value Kval (which is the deviation between the amount of lens advanecement and the focal point) changes depending on the zoom position of the photographic lens 3. The relationship between the zoom position and Kval by the zoom code plate 40 stepwise changes along a compensation coefficient line illustrated by a solid line of FIG. 10. In addition, the relationship between the zoom position and focal length also stepwise changes along a compensation coefficient line 63, shown In FIG. 11. In the cases of FIGS. 10 and 11, it is desirable that the compensation coefficient lines 62 and 63 for the zoom control and focus control smoothly change, as illustrated by the broken lines 62' and 63', respectively. To accomplish this, compensation information, listed in Table 1, is stored in the lens ROM 48 and f and $x_0$ are computed by the lens CPU 44.

TABLE 1

| | Compensation Information |
|---|---|
| 01 | Number of initial pulses in encoder of zoom code plate $P_h$ |
| 02 | With of initial pulses in encoder of zoom code plate $P_h$ |
| 03 | Initial Kval $K_h$ |
| 04 | Compensation coefficient of initial Kval $K_c$ |
| 05 | Initial focal length $f_h$ |
| 06 | Compensation coefficient of initial focal length $f_h$ |
| 07 | Primary compensation coefficient of focus lens position and focal length $f_{fc1}$ |
| 08 | Secondary compensation coefficient of focus lens position and focal length $f_{fc2}$ |
| 09 | Coefficient for computing amount of advancing $x_0$ Q, R, S, T |
| 10 | Conversion coefficient from image magnification to zoom driving pulses A, B, C |

The start Kval, namely start K value represents a Kval of the left and right most ends of step $K_i$ (where i=0, 1, 2, 3 ...) of the compensation coefficient 62 shown in FIG. 10. In other words, when the lens moves from the L (Tele) side to the S (Wide) side, the right end of the step $K_i$ is Kval. Conversely, when the lens moves from the S (Wide) side to the L (Tele) side, the left end of the step $K_i$ is Kval.

Figure 12:
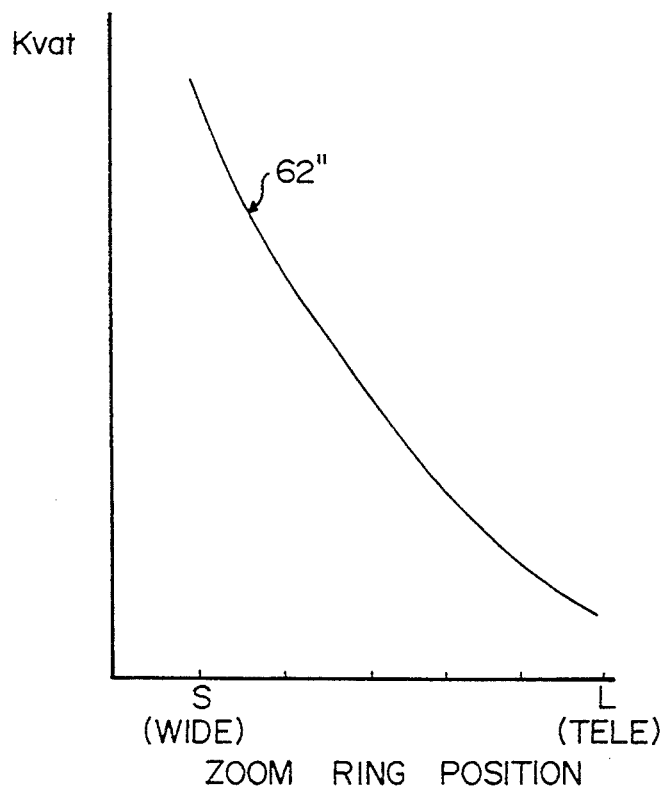
FIG. 12 is a descriptive diagram of the compensation curve where the relationship between the zoom position and K value of the zooming lens group shown in FIG. 10 is compensated.
Figure 13:
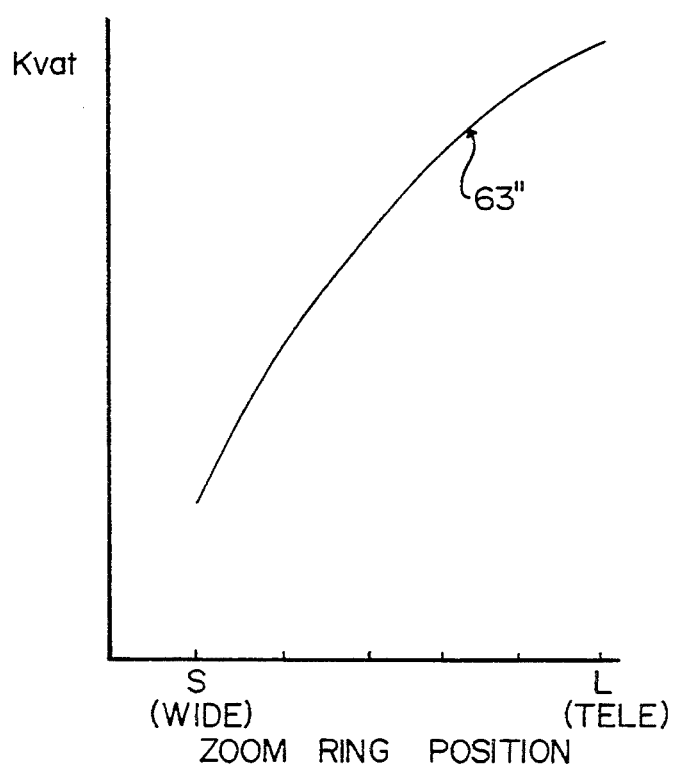
FIG. 13 is a descriptive diagram of a compensation curve where the relationship between the zoom position of the zooming lens group and the focal length of the focusing lens group shown in FIG. 11 is compensated.

The compensation coefficient of initial Kval $K_c$ is a coefficient for approximately computing a value that corresponds to the curve 62' as a slope of a straight line at the step $K_i$. The initial focal length $f_h$ refers to one of the left and right ends of the compensation coefficient line $f_i$ (where i=0, 1, 2, 3, ... N) like the initial Kval. The compensation coefficient of initial focal point $f_c$ is a coefficient for approximately computing a value corresponding to the compensation curve 63' as a slope of a straight line at the step $f_i$. The Kval and focal length obtained in this manner are illustrated as compensation curves 62" and 63" shown in FIGS. 12 and 13, respectively. The primary compensation coefficient of the focus lens position and focal length $f_{fc1}$ can be obtained from a curve 64 determined by the zoom position and focal length shown in FIG. 8. The secondary compensation coefficient of focus lens position and focal length $f_{fc2}$ is determined by the three dimensional focal point curved surface 60 where the focus amount is considered against $f_{fc1}$ described above.

The focal point curved surface 80 is a curved surface which is determined by optical designing and mechanical designing of the photographic lens 3. It cannot be represented with a simple equation accurately and proportionally. The amount of advancing the focus lens defined by such curved surface is proportional to the amount of zooming of the zoom lens nearly, but not perfectly. Thus, it is necessary to compensate the amount of advancing the focus lens. The compensation coefficients for that are Q, R, S, and T, which depend on the optical designing and mechanical designing of the lens. Moreover, equation (10), which uses the compensation coefficients Q, R, S, and T depends on the optical designing and mechanical designing of the photographic lens. The number of pulses for driving the zoom lens, $P_z$, which is used to keep the image magnification constant, depends on the optical designing and mechanical designing of the photographic lens. Thus, the compensation coefficients A, B, and C of equation (11), which computes Pz, also are determined by the optical designing and mechanical designing.

Assuming that the number of pulses at the absolute position of the present zoom ring of the photographic lens 3 is $P_s$ and that the present focus lens is $P_{inf}$, the focal length f and the amount of advancing $x_0$ are obtained as follows:

$$f = f_h + f_c*(P_s - P_h) + f_{fc1}* P_{inf} + f_{fc2}*(P_{inf})^2 \quad (9)$$

$$x_0 = Q(P_{inf})^3 + R(P_{inf})^2 + S(P_{inf}) + P_{inf}* T(P_h - P_s) \quad (10)$$

In this case, considering an over-moving of the amount of advancing of the lens on the infinite side, $P_{inf}$ should be a small value. In addition, assuming that the control image magnification is r, the number of zoom driving pulses $P_z$ can be obtained from the following equation.

$$P_z = Ar^2 + Br^2 + Cr \quad (11)$$

The data listed in Table 1 and the computation equations described are stored in the lens ROM 43 of the photographic lens 3 in advance.

Major terms used in flow charts which represent control operations of the camera control device structured as above are described as follows.

AFSTOP represents a process which stops the focusing lens group;

FL stands for the far limit and is a flag for representing whether the far terminus of the focusing lens group is being detected. When FL=1, the control circuit detects that the focusing lens group is positioned at the far terminus;

NL stands for the near limit and is a flag for representing whether the near terminus of the focusing lens group is being detected, When NL=1, the control circuit detects that the focusing lens group is positioned at the near terminus;

Pinf represents the number of pulses where the focusing lens group is driven from the far terminus to the near terminus. When Pinf=0, the focusing lens group is positioned at the far terminus. The number of pulses is detected by the AF pulser 48;

WL stands for the wide limit and is a flag for representing whether the wide terminus of the zooming lens group is being detected. When the WE flag=1, the control circuit detects that the zoom lens group is positioned at the wide terminus;

TL stands for the tele limit and is a flag for representing whether the tele terminus of the zooming lens group is being detected. When the TL flag=1, the control circuit detects that the zooming lens group is positioned at the tele terminus;

MFL stands for the macro far limit and is a flag for representing whether the far terminus of the focusing lens group is being detected by driving the zooming lens group in the macro area. When the MFL flag=1, the control circuit detects that the zooming lens group is a tele macro by a signal that is being outputted from the zoom code plate 40 and that the lens group is positioned at the far terminus in the focus state;

MNL stands for the macro near limit and is a flag for representing whether the near terminus of the focusing lens group is being detected by driving the zooming lens group in the macro area. When the MNL flag=1, the control circuit detects that the zooming lens group is a tele macro by a signal that is outputted from the zoom code plate 40 and that the lens group is positioned at the near terminus in the focus state;

SWREN is a release permission flag. When the SWREN flag=1, the release operation is permitted, while when the SWREN flag=0, the release operation is not permitted;

MF stands for the manual focus and is a flag for representing whether a manual focus state takes place. When the MF flag=1, the manual focus state takes place, while when MF=0, the manual focus state does not take place;

AF stands for the auto focus and is a flag for representing whether an autofocus state takes place. When the AF flag=1, the autofocus state takes place, while when AF=0, the auto focus state does not take place:

PZMACRO is a flag for representing whether the zooming lens group is positioned in the macro area by the power zoom mechanism. When the PZMACRO flag=1, the zooming lens group is positioned in the macro area;

AFGO is a flag for representing whether the focusing lens group is being driven. When the AFGO flag=1, the focusing lens group is being driven by the AF motor M1;

PZGO is a flag for representing whether the zooming lens group is being driven. When the PZGO flag=1, the zooming lens group is being driven by the PZ motor M2;

PZMGO is a flag for representing whether the zooming lens group is being driven by the PZ motor M2 in the macro area. When the PZMGO flag=1, the zooming lens group is being driven by the PZ motor M2;

PZMODE is a flag for representing whether the zooming lens group can be driven by the power zoom mechanism. When PZMODE=1, the zooming lens group can be driven;

MAGIMG is a flag for representing whether to start the image magnification constant operation. When AMGIMG=1, the image magnification constant start operation takes place.

ONIMG is a flag for representing whether the image magnification constant control operation takes place.

When ONIMG=1, the image magnification constant operation takes place.

AFFARGO represents a process which drives the focusing lens group in the far direction;

AFNEARGO represents a process which drives the focusing lens group in the near direction.

AFDRVF is a flag for representing a direction in which the focusing lens is driven in the process.

When AFDRVF=1, the focusing lens is driven in the far direction, while when AFDRVF=0, it is driven in the near direction;

PZTELGO represents a process which drives the zooming lens group in the tele direction;

PZWIDEGO represents a process which drives it in the wide direction;

PZDRVF is a flag for representing a direction in which the zooming lens group is driven in the process. When PZDRVF=1, the zooming lens group is driven in the tele direction, while when PZDRVF=0, it is driven in the wide direction;

MCRFARGO represents a process which drives the zooming lens group against the focusing lens group in the macro area;

MCRNEARGO represents a process which drives the zooming lens group against the focusing lens group in the macro area;

MCRDRVF is a flag which represents a direction in which the zooming lens group is driven. When MCRDRVF=1, the zooming lens group is driven in the far irection, while when MCRDRVF=0, it is driven in the near direction;

AFS is a flag for representing whether an in-focus priority mode takes place. When AFS=1, the in-focus priority mode takes place, while when AFS=0, a release priority mode takes place;

AFCORR stands for AF correct. When a zoom operation is conducted in the in-focus priority state, the focal position may be moved depending on a photographic lens (such as a variable focus lens). This flag is used to compensate the focal position of the lens. When AFCORR=1, the focal position being moved is compensated, while when AFCORR=0, it is not compensated: and ON/OFF of the macro switch represents whether the zooming lens group is positioned in the macro area or not.

The control operations of the camera control device structured as mentioned above are described using flow charts.

Figure 34:
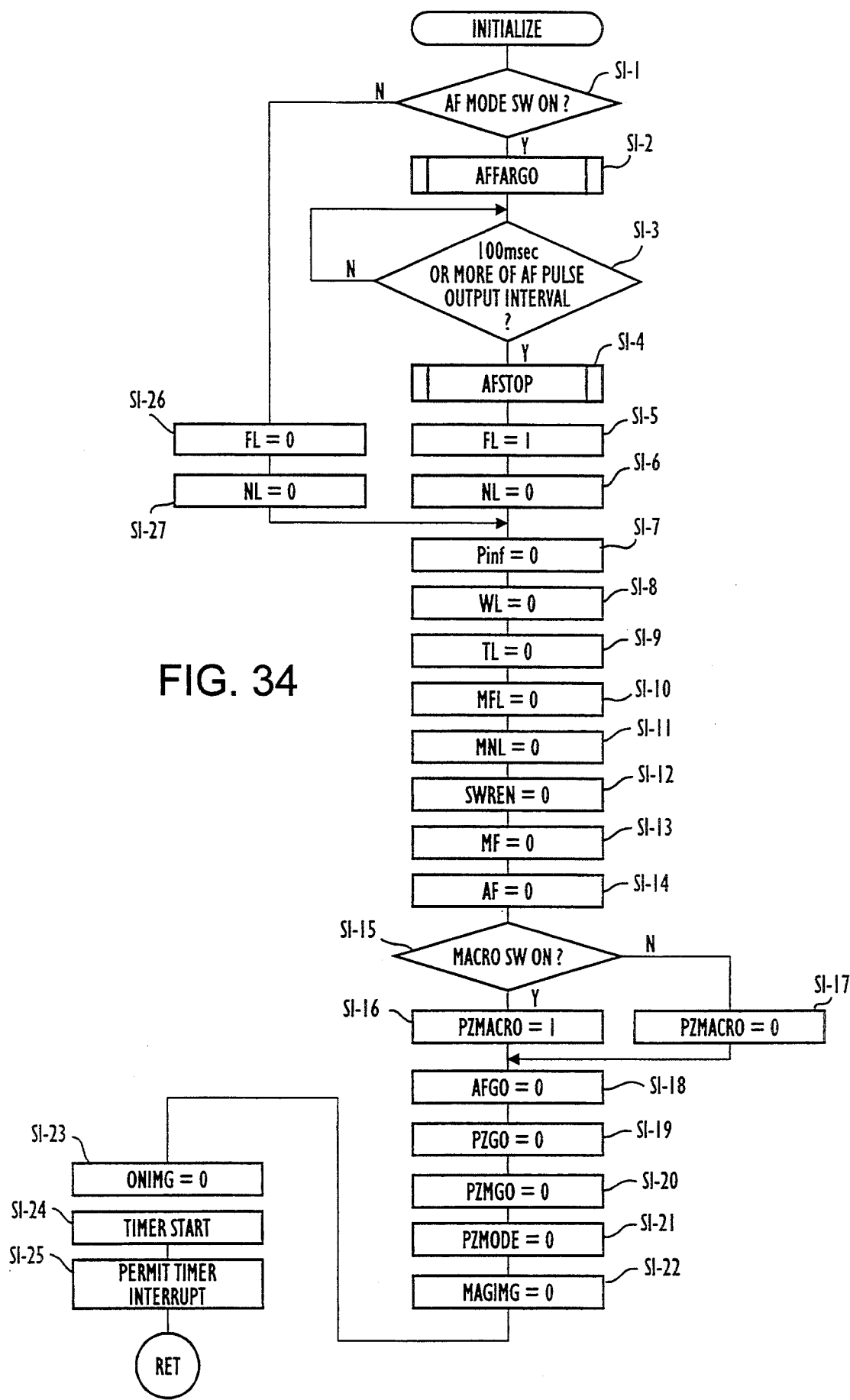

When lock switch SWLOCK is turned ON, the control device including the camera control circuit 4 and lens control circuit 5, executes a series of instructions shown in FIG. 14. The control device is initialized in step S1 by executing an initialilyation subroutine, shown in FIG. 34.

The initialization subroutine determines whether the AF mode switch (that is, the auto/manual selection mode switch SWAF A/M) has been turned on in step S1-1. When the AF mode switch has been turned on, the automatic focus operation is selected and processing advances to step S1-2 to execute the AFFARGO subroutine, which is shown in FIG. 85. When the switch is OFF, the manual operation is selected and processing advances to step S1-26. The subroutine drives the focus lens, namely the focusing lens group to the far terminus in step S1-2.

The subroutine activates the AF motor drive section 45 so as to drive the focusing lens group to the far terminus in step S-AFG1. The process sets the AFDRVF flag to 1 for representing that the focusing lens group is being driven in the far direction in step S-AFG2. The process sets the AFG0 flag ixalss set to 1 to indicate that the focusing lens group is being driven in step S-AFG3. The NL flag is set to 0 to indicate that near limit of the focusing lens group has not been detected (step S-AFG4) and the FL flag is set to 0 to indicate that the far end has not been detected (step S-AFG5). After that, the subroutine returns to step S1-3 of the initialiye subroutine, shown in FIG. 34.

When the focusing lens is being driven to the far terminus, driving pulses are outputted from the AF pulser 48 to the lens CPU 44. The subroutine determines whether the driving pulses are outputted from the AF pulser in S1-3. This determination is made by detecting whether the pulse interval is at least 100 msec. When a negative determined is obtained (i.e., a pulse interval of less than 100 msec), the subroutine enters a loop until the determined condition affirmative (i.e., a pulse interval of 100 msec or more). When the pulse interval exceeds 100 msec, the focusing lens is driven and stopped at the far terminus. At this time, the friction type clutch, which is linked with the focusing lens group, slips. Thus, when the pulse interval exceeds 100 msec, the test performed in step S1-3 is positive (i.e., the pulse interval is at least 100 msec in duation) and processing advances to step S1-4 so as to execute AFSTOP subroutine. The AFSTOP subroutine determines whether the focusing lens group is being driven (AFG0=1) in step S-AS1, shown in FIG. 41. When the lens group is not being driven, AFGO=0 and processing returns to S1-5 of the initialize subroutine. When the process determines that the focusing lens group is being driven in step S-AS1, AFG0 is equal to 1. Thus, processing advances to step S-AS2 to stop the AF motor M1 so as to stop driving the focusing lens group before advancing to step S-AS3. This step sets the AFGO flag to 0. After that, processing returns to step S1-5 of the initialize subroutine.

Step S1-5 the FL flag to represent that the far terminus of the focusing lens group is being detected. At present time, the focusing lens group is not positioned at the near terminus, and the subroutine advances to step S1-6 so as to set the NL flag to 0 torepresent that the near terminus of the focusing lens group is not being detected, before peseecding to to step S1-7.

If the subroutine determines thatthe AF switch, (i.e., the auto/manual selection switch SWAF A/M) has not been turned on in step S1-1, it is unknown where the focusing lens group is positioned. Thus, the processing advances to steps S1-26 and S1-27 so as to set the FL flag and the NL flag to 0. Thereafter, processing advances to step S1-7.

In step S1-7, since the focusing lens block is positioned at the far terminus and the number of driving pulses from the far terminus for the focusing lens group, Pinf, is 0, the subroutine sets Pinf to 0. After that, the WL flag (which represents whether the wide terminus of the zooming lens group is being detected) is set to 0, the TL flag (for representing whether the tele terminus of the zooming lens group is being detected) is set to 0, the MFL flag (for representing whether the far terminus of the focusing lens group is being detected by driving the zoom ring in the macro to area) is set to 0 the MNL flag (for representing whether the near terminus of the focusing lens group is being detected by driving the zoom ring in the macro area) is set to 0, the SWREN flag (for representing whether the release operation is permitted) is set to 0, the MF falg (for representing whether the manual focus state takes place) is to 0, and the AF flag (for representing whether the autofocus state takes place) is set to 0 (steps S1-8 to S1-14). Processing then advances to S1-15.

A determination is made as to whether the macro switch has been turned ON in step S1-15. When the determined condition is YES (ON), processing advances to S1-16, so as to set the PZMACRO flag (for representing whether the zooming lens group is positioned in the macro area by the power zoom mechanism), to 1 before going to step S1-18. When the determined condition is NO (OFF), processing goes to step S1-17 so as to set the PZMACRO flag to 0 before advancing to step S1-18.

Next, the AFGO flag (for representing whether the focusing lens group is being driven) is set to 0, the PZGO flag (for representing whether the zooming lens group is being driven) to 0, the PZMGO flag (for representing whether the zooming lens group is being driven by the PZ motor M2 in the macro area) is est to 0, the PZMODE flag (for representing whether the zooming lens group can be driven by the power zoom mechanism) is est to 0, the MAGIMG flag (for representing whether to start the image magnification constant operation) is set to 0, the ONIMG flag (for representing whether the image magnification constant control operation takes place) is set to 0, a timer such as 5 msec timer, is started, and the timer is, permitted to be interruptted in steps S1-18 to S1-25, before processing returns to step S2 of the start program shown in FIG. 14.

The program determines whether the AF mode switch, namely the, auto/manual selection switch SWAF A/M, has been turned on in step S2. When the switch has been turned ON, processing advances to S3. When the switch has not been turned ON, processing advances to step S-M1 M, shown in FIG. 21.

Figure 21:
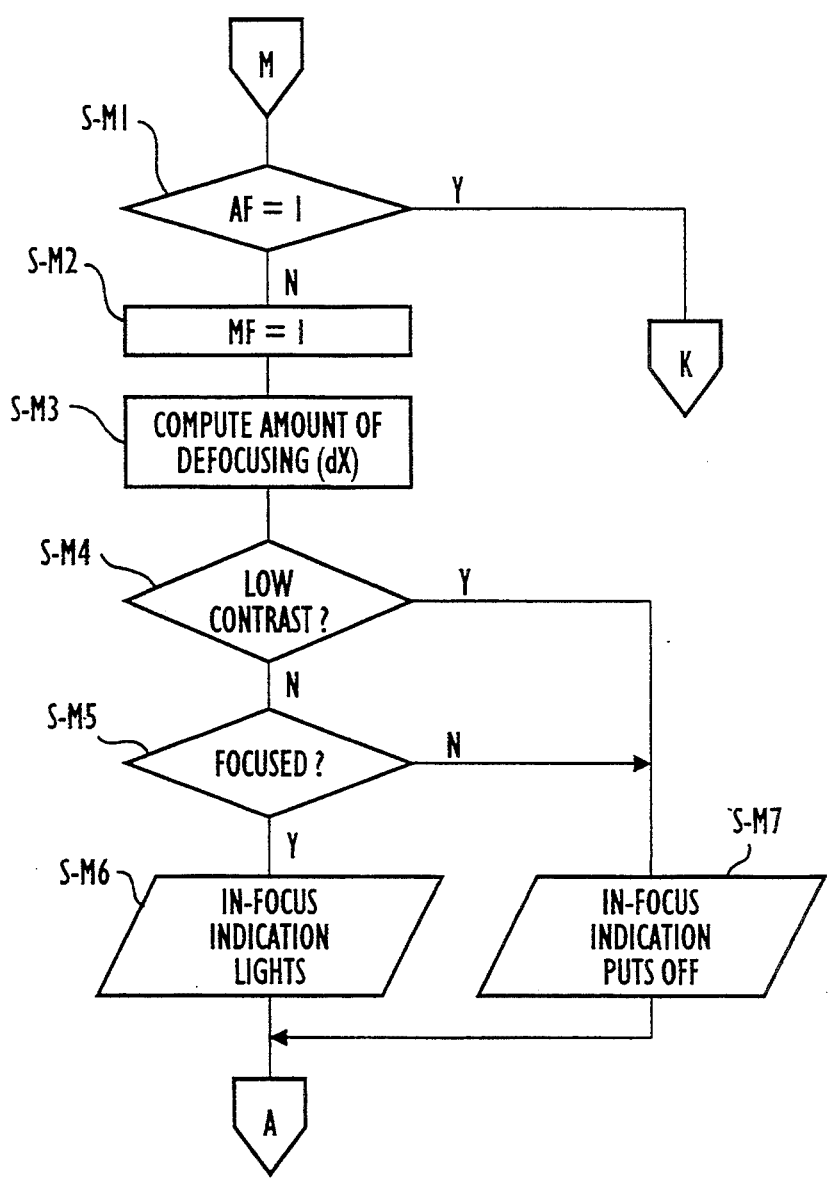

The next step determines whether the AF mode switch (switch SWAF A/M) has been turned ON and the AF operation (AF=1) takes place in step S-M1, shown in FIG. 21. When the AF equal 1 (i.e.,AF operation takes place), processing advances to step S-K1, shown in FIG. 30. When the AF does not equal 1, the program sets the MF flag (for representing whether the manual focus state takes place) to 1 (in step S-MP2), and advances to step S-M3 so as to compute the amount of defocusing of the focusing lens group, dx, in step S-M3.

Afterwords, a determination whether the contrast is low (step S-M4). When the contrast is low, processing advances to step S-M7 so as to turn off the in-focus indication. When the contrast is not low, processing advances to determine whether the focused. If the image is not focused, processing advances to step S-M7, so as to turn off the in-focus indication. When the image is focused, processing advances to step S-M6 to turn on the in-focus indication, before returning back to step S2, shown in FIG. 14, to determine whether the AF mode switch (switch SWAF A/M) has been turned ON (input). When the manual mode takes place, processing enters into a loop between step S-M1, shown in FIG. 21 and step S2 shown in FIG. 14 until the AF mode switch is turned ON.

Figure 30:
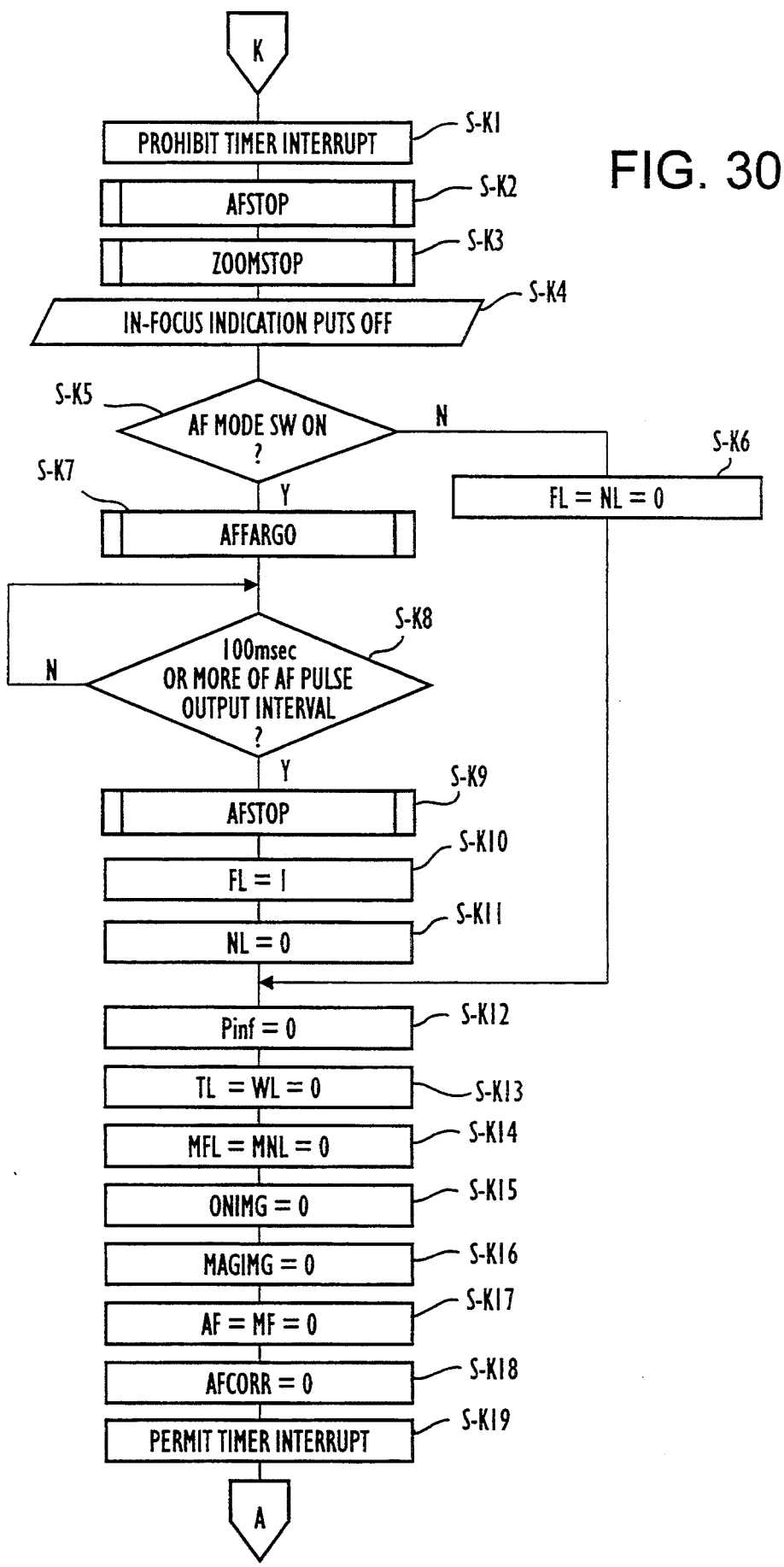

When AF=1 (i.e., AF operation state) in step S-M1 shown in FIG. 21, processing advances, to step S-K1 shown in FIG. 30. This step prohibits the timer interrupt before advancing to step S-K2 to execute an AFSTOP subroutine. The AFSTOP subroutine determines whether the focusing lens group is being driven (AFG0=1) or in step S-AS1, shown in FIG. 41. When the lens group is not being driven, processing advances to step S-K3, before which calls a ZOOMSTOP subroutine, shown in FIG. 30. When AFGO=1, the AF motor M1 is stopped so as to stop driving the focusing lens group. Processing the advances-to step S-K3, after the AFGO flag (for representing whether the focusing lens group is being driven) is set to 0 to call the ZOOMSTOP subroutine in FIG. 30.

Figure 42:
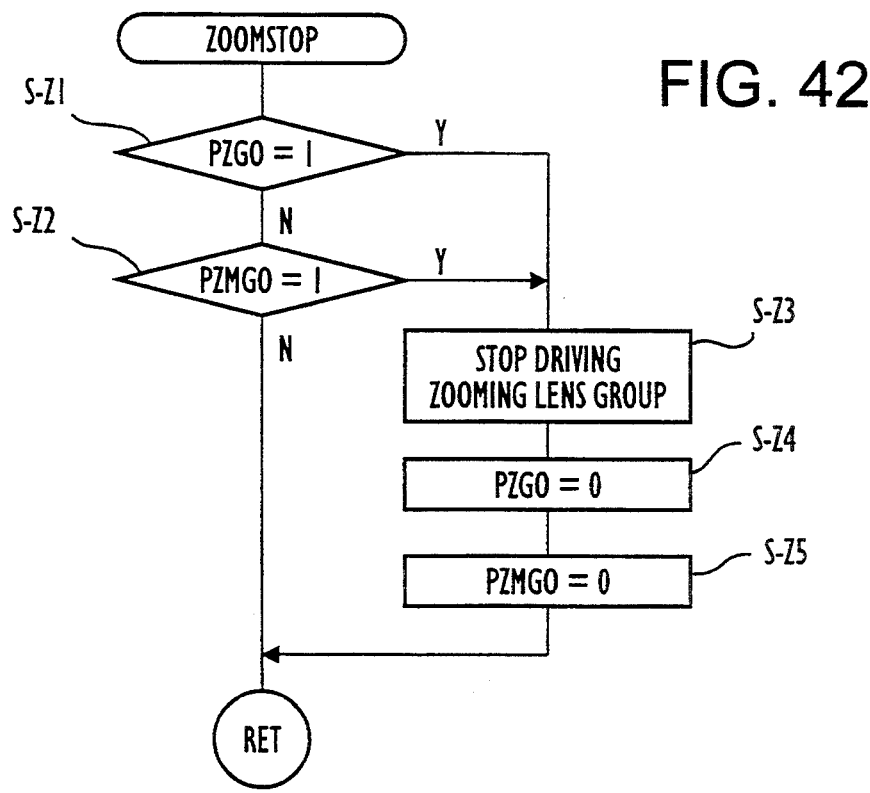

The ZOOMSTOP determines whether the zooming lens group is being driven (PZGO=1) in step S-Z1, shown in FIG. 42. When PZGO is not equal to 1, processing advances to S-Z2 so as to determine whether the AF drive (autofocus drive) operation is being conducted by the power zoom mechanism (PZ mechanism) in the macro area. When the AF drive operation Is not being conducted by the PZ mechanism (i.e.,PZMGO=0), processing returns to step S-K4, shown in FIG. 30. When the zooming lens group is being driven (i.e., PZGO =1) in step S-21 or AF drive operation is being conducted (i.e., PZMGO=1) in S-Z2, processing advances to step S-Z3, which stops the PZ motor M2 so as to stop driving the zooming lens group. Thereafter, the PZGO flag (for representing whether the zooming lens group is being driven) and the PZMGO flag are each set to 0 (steps S-Z4 and S-Z5), before the processing advances to step S-K4, shown in FIG. 30.

This step turns off the in-focus indication and then advances to step S-K5, so as to determine whether the AF mode switch (switch SWAF A/M) has been turned ON. If the AF mode switch is OFF, processing advances to step S-K6. If the AF mode switch is ON, the processing advances to step S-K7F call an AFFARGO subroutine.

If step S-K6 is performed, the FL flag (for representing whether the far terminus of the focusing lens group is being detected) and the NL flag (for representing whether the near terminus of the focusing lens group is being detected) and each set to 0. Processing then advances to step S-K12.

Figure 35:
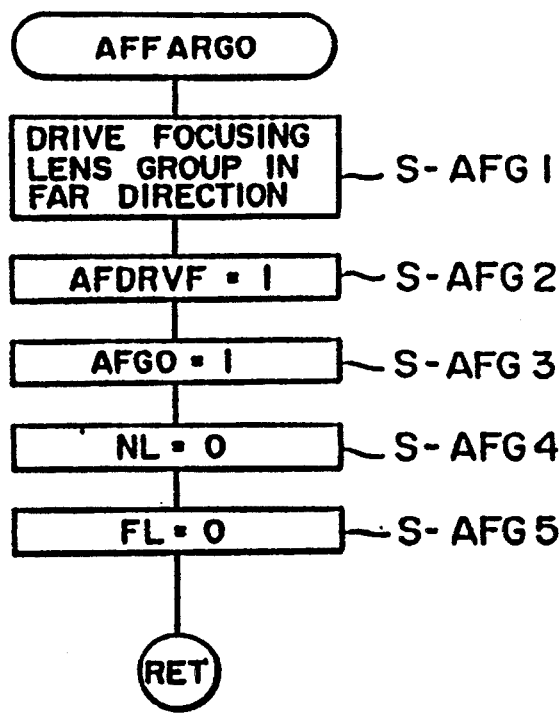

When step S-K7 is performed, an AFFARGO subroutine, shown in FIG. 35 is performed. In the same manner as described above, the process drives the focusing lens group in the far direction, sets the AFDRVF, AFGO, NL, and FL flag to 1 and then advances to step S-K8 shown in FIG. 30. When the focusing lens group is being driven in the far direction, driving pulses are outputted from the AF pulser 48 to the lens CPU 44. The software program determines whether the driving pulses are being outputted from the AF pulser 48 in step S-K8. This determination is made by detecting whether a pulse interval is of at least 100 msec ocurrs. When a pu;the determined condition is lse interval of less than 100 msec ocurrs, thesoftware program enters a loop, so as to continue the determination until a pulse inkwal of at least 100 msec is delected. When the pulse interval exceeds 100 msec, the focusing lens is driven and stopped at the far terminus. At this time, the friction type clutch, which is linked with the focusing lens slips. Thus, when the pulse interval exceeds 100 msec, processing advances to step S-K9 so as to execute the AFSTOP subroutine. This subroutine determines whether the focusing lens group is being driven (i.e., AFGO=1), in step S-AS1, shown in FIG. 41. When the lens group, is not being driven, AFGO=0 and processing advances to the ZOOMSTOP subroutine in step S-K3, shown in FIG. 30. When AFGO=1 the AF motor M1 is stoppped so as to stop the driving of the focusing lens group. Step S-AS3 is then performed so as to set the AFGO flag (for representing whether the focusing lens group is being driven) to 0 before advancing to step S-K10. The FL flag (for representing whether the far terminus of the focusing lens group is being detected) to 1. Since the focusing lens group is not positioned at the near terminus, processing advances to step S-K11 so as to set the NL flag (for representing whether the near terminus of the focusing lens group is being detected) to 0 (steps S-K10 and S-K11). In step S-K12.

Since the focusing lens group is positioned at the far terminus, the number of driving pulses from the far terminus for the focusing lens group, Pinf, is set to 0. Thereafter, the WL flag (for representing whether the wide terminus of the zooming lens group is being detected), the TL flag (for representing whether the tele terminus of the zooming lens group is being detected). The MFL flag (for representing whether the far terminus of the focusing lens group is being detected by driving the zoom ring in the macro area), the MNL flag (for representing whether the near terminus of the focusing lens group is being detected by driving the zoom ring in the macro area). The ONIMG flag (for representing whether the image magnification constant control operation takes place), the MAGIMG flag (for representing whether to start the image magnification constant operation), the MF flag (for representing whether the manual focus state takes place), the AF flag (for representing whether the autofocus state takes place), and the AFCORR flag (for representing whether to compensate the focus position of the lens) are set to 0 in steps S-K13 to S-K18, the timer is permitted to be Interruptted in step S-K19, and then the software program returns back to step shown in FIG. 14.

When the program determines that the auto/manual selection switch SWAF A/M has been turned ON in step S2, processing advances to step S3. In S3, it is determined whether the MF flag (for representing whether the manual focus state takes place) has been set to 1. When the focus state takes place an affirmative result is obtained YES and processing advances to step S-K1. When the determined condition is necpotive, processing advances to step S4.

Step, it is determined whether the light metering SWS switch has been turned ON. When the SWS switch has not been turned ON, processing returns back to step S2 So as to repeat the above operation until the SWS switch is turned ON. When the switch has been turned ON, processing advances to step S5 so as to set the AF flag (for representing whether the autofocus state takes place) to 1. Next, the amount of defocusing of the focusing lens group dx is computed in step S6 and it is determined whether the contrast of the subject is low using the amount of light from the subject which enters into light reception element 10 in step S7. When the contrast of the subject is low, processing returns back to step S2 so as to repeat the above operation until the contrast becomes high. When the contrast of subject is not low, processing advances to step S8. This step determines whether the subject is focused. When the image Is not focused, processing advances to S9. When the image is focused, processing advances to step S21 to determing whether the image magnification constant mode switch SWPZC has been turned ON and the MAGIMG flag (for representing whether to start the Image magnfication constant operation) has been set to 1. When the MAGIMG flag has been set to 1, processing turns off the in-focus indication (in step S25) and advances to step S-B1 Shown in FIG. 15, When the MAGIMG flag has not been set to 1, processing advances to step S22, turning ON the in-focus indication Then sets the SWREN flag (for representing whether the release operation is permitted) is set to 1 in step S23, and the software program advances to S24, This step determines whether the AF flag has been set to 1; that is whether the in-focus priority/release priority selection switch SWAF S/C has been placed In the S position (in-focus priority position) and the AFS flag (for representing whether the in-focus priority mode takes place) has been set to 1. When the determined condition is positive, the process enters a loop so as to lock the focus. When the determined condition is negative, (that is, the switch has been placed in the AFC position (release priority position)), processing returns back to step S2.

When, it is determined that the subject is not focused In step S8, processing advances to step S9 to set the SWREN flag (for representing whether the release operation is permitted) to 0. Then, the in-focus indication is turned OFF. In step S11, the amount of driving of the focusing lens group (dp), using the amount of defocusing dx obtained in step S6 is computed. In step S12, a determination is made as to whether the focusing lens group is being driven in the near direction. When the lens is being driven to the near direction processing advances to step S13. When the lens is in the far direction, processing advances to step S18.

In step S13, it is determined whether the NL flag (for representing whether the near terminus of the focusing lens group is being detected) has been set to 1. That is, it is, determined whether the focusing lens group is positioned at the near limit (near terminus) in step S18. When the focusing lens group is positioned at the near terminus (near limit) and the NL flag has been set to 1, processing advances to step SI-1 shown in FIG. 20. When the focusing lens group is not positioned at the near terminus (near limit), processing advances to step S14.

If step S18 is executed, that the FL flag is checked to determine whether the far terminus of the focusing lens group is being detected. When it is detected the FL flag is set to 1, meaning that the focusing lens group is positioned at the far terminus (far limit). When the focusing lens group is positioned at the far terminus (far limit) and the FL has been set to 1, 1, processing advances to step S-I1, shown in FIG. 20. When the focusing lens group is not positioned at the far-terminus (far limit), proocessing advances instead to step S19.

Figure 20:
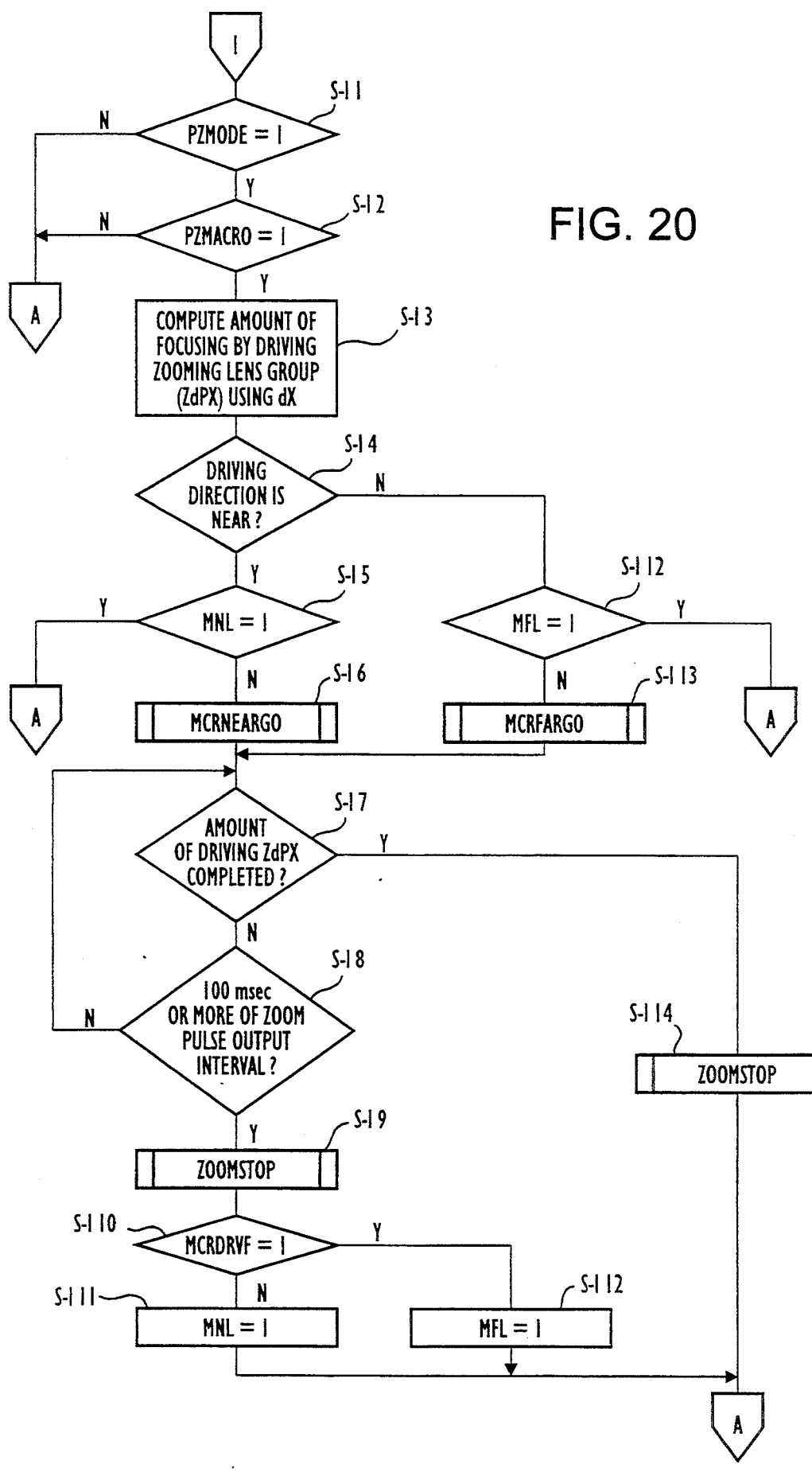

When the process advances to I shown in FIG. 20, a determination is made whether the PZMODE flag (for representing whether the zooming lens group can be driven by the power zoom mechanism) has been set to 1. When the determined condition is negative, processing returns back to step S2, shown in FIG. 14, until the determined condition becomes positive. When the determined condition is positive, processing advances to step S-I2, so as to determine whether the macho switch has been turned ON and the PZMACRO flag (for representing whether the zooming lens group is positioned in the macro area by the power zoom mechanism) has been set to 1. When the determined condition is negative, processing returns back to step S2, shown in FIG. 14, so as to enter a loop. When the determined condition is positive processing advances to step S-I3, so as to compute the amount of defocusing by driving the zooming lens(group (zdpx) using the amount of defocusing dx described above. In step S-I4, it is determined whether the focusing direction of the zooming lens group is far or near. When it is determined that the lens is in the near direction, processing advances to step S-I5. When it is determined that the lens is in the far direction, processing advances to step S-I12.

Step S-I5 determines wile tiler the MNL flag (for representing whether the near terminus-of the focusing lens group is being detected by driving the zoom ring in the macro area) has been set to 1. When the determined condition is positive, processing returns back to step S2, shown in FIG. 14, so as to enter a loop. When the determined condition is negative, ppcessing advances to step S-I6 so as to call a MCRNEARGO subroutine.

Step S-I12 determines whether the MFL flag (for representing whether the far terminus of the focusing lens group is being detected by driving the zoom ring in the macro area) has been set to 1. When the determined condition is positive, processing returns back to step S2, shown in FIG. 14, so as to enter a loop. When the determined condition is negative, the processing advances to step S-I13 so as to execute MCRFARGO subroutine.

Figure 39:
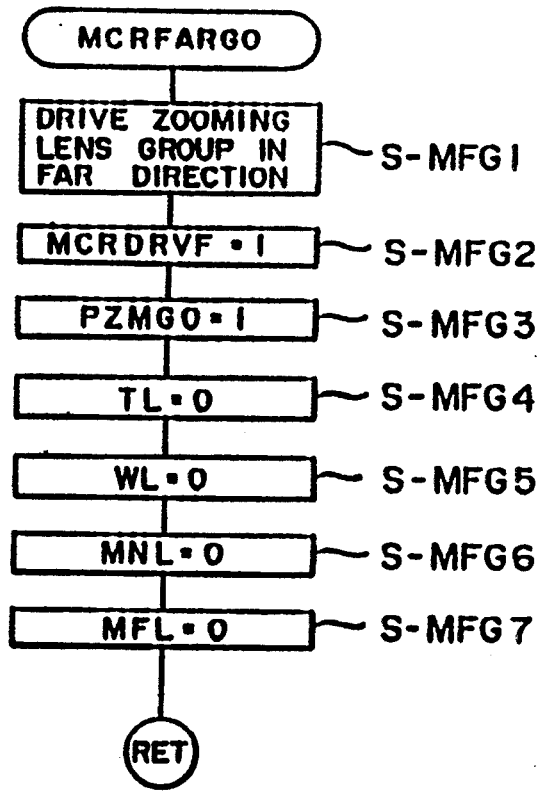
Figure 40:
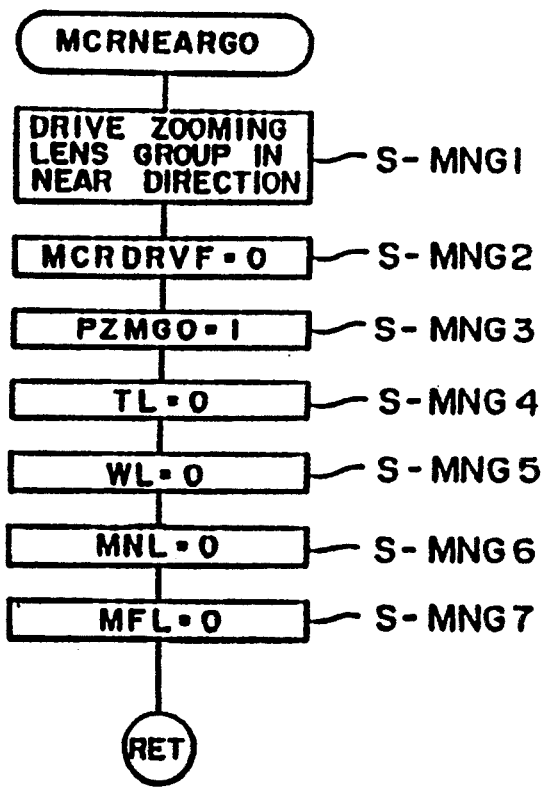

The MCRNEARGO subroutine (called In step S-I6) drives the zooming lens group in the near direction, as shown in FIG. 40. The MCRFARGO subroutine called in step S-I13 drives the zooming lens group in the far direction, shown in FIG. 39.

The MCRNESRGO subroutine shown in FIG. 40 activates the PZ motor M2 in step S-MNG1, so as to drive the zooming lens group in the near direction. Then, the MCRDRVF flag (for representing whether the zooming lens group is being driven in the far direction in the macro area) is set to 0 (i.e., near direction), The PZMGO fladg (for representing whether the zooming lens group is being driven by the PZ motor M2 in the macro area) is set to 1 (i.e., drive state) and the TL flag (for representing whether the tele terminus of the zooming lens group is being detected). The WL flag (for representing whether the wide terminus of the zooming lens group is being detected). The MNL flag (for representing whether the near terminus of the focusing lens group is being detected by driving the zoom ring in the macro area) and the MFL flag (for representing whether the far terminus of the focusing lens group is being detected by driving the zoom ring in the macro area) set to 0 in steps S-MNG-3 to S-MNG7. After that, processing advances to step S-I7, shown in FIG. 20.

In the MCRFARGO subroutine, the PZ motor M2 is activated in step S-MFG1 so as to drive the zooming lens group in the far terminus. Thereafter, the MCRDRVF flag (for representing whether the zooming lens group is being driven in the far direction in the macro area) is set to 1 (i.e., far direction) in step S-MFG2, and the PZMGO flag (for representing whether the zooming lens group is being driven by the PZ motor M2 in the macro area) is set to 1 (i.e., drive state) in step S-MFG3. Then, the TL flag (for representing whether the tele terminus of the zooming lens group is being detected), the WL flag (for representing whether the wide terminus of the zooming lens group is being detected), the MNL flag (for representing whether the near terminus of the focusing lens group is being detected by driving the zoom ring in the macro area) and the MFL flag (for representing whether the far terminus of the focusing lens group is being detected by driving the zoom ring in the macro area) are set to 0 in steps S-MFG4 to S-MFG7. After that, processing advances to S-I7, shown in FIG. 20. When the zooming lens group is being driven, driving pulses are outputted from the PZ pulser 49 to the lens CPU 44.

In step S-I7, it is determined whether the zooming lens group has been driven for the amount of focusing (zdpx) obtained in step S-I3. When the zooming lens group has been driven of an anountiqualr zdpx, processing advances to step S-I14 so as to execute a ZOOM-STOP subroutine, shown in FIG. 47, before returning back to step S2, shown in FIG. 14. When the determined condition is negative, processing advances to step S-I8.

In step S-I8, it is determined whether the driving pulses are being outputted from the PZ pulser 49. This determination is made by detecting whether the pulse interval is 100 msec or more or less than 100 msec. When time determined condition indicates a pulse interval of less than 100 msec, processing enters a loop until the determined condition indicates a pulse a interval at 100 msec or more. When the pulse interval equals or exceeds 100 msec, the zooming lens group is driven and stopped at the far terminus or near terminus by executing the ZOOMSTOP subroutine called in either step S-I14 or S-19. At this time, the friction type clutch, which links the PZ motor M2 and the zooming lens group, slippes. Thus, when the pulse interval equals or exceeds 100 msec, the determined condition is positive (100 msec or more) and processing advances to step S-I9 so as to perform ZOOMSTOP subroutine, shown in FIG. 42. After that, processing advances to S-I10 so as to determine whether the driven direction was near or far. When the determined condition is negative (i.e., near direction), processing advances to step S-I11, so as to set the MNL flag (for representing whether the near terminus of the focusing lens group is being detected by driving the zoom ring in the macro area) to 1 before returning back to step S2, shown in FIG. 14. When the determined condition is position,(i.e., far direction), processing advances to step S-I15 so as to set the MFL flag (for representing whether the far terminus of the focusing lens group is being detected by driving the zoom ring in the macro area) is set to 1 before returning back to step S2, shown in FIG. 14.

Figure 36:
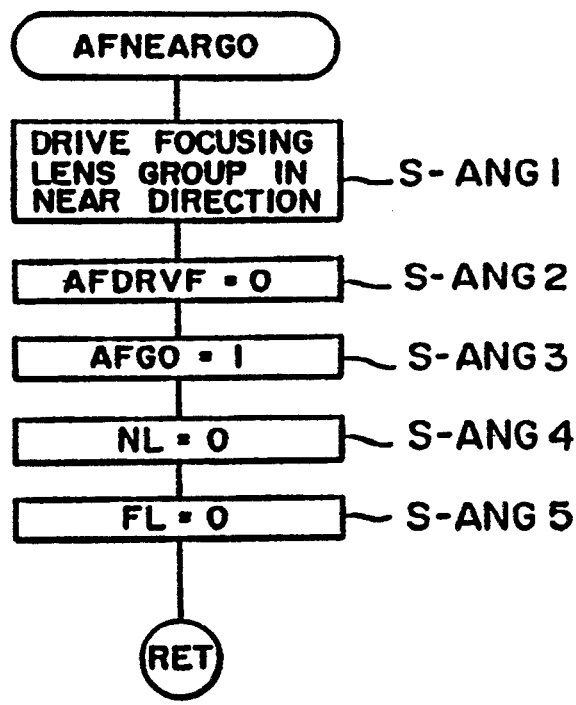

When processing advances from step S13 to S14, it drives the focusing lens group in the near direction, a shown in FIG. 36. When processing advances from steps S18 to S19, it drives the focusing lens group in the far direction as shown in FIG. 35.

The instructions shown in FIG. 35 drive the focusing lens group in the far direction in step S-AFG1. The process sets the AFDRVF flag (for representing whether the focusing lens group is being driven in the far direction) to 1 (i.e., far direction) in step S-AFG2. Then, the AFGO flag (for representing whether the focusing lens group is being driven) is set to 1 (i.e., drive state) in step S-AFG3, and the NL flag (for representing whether the near terminus of the focusing lens group is being detected) and FL flag (representing whether the far terminus of the focusing lens group is being detected) are set to 0 in steps S-AFG4 and S-AFG5 before advancing to step S15, shown in FIG. 14.

The instructions shown in FIG. 36 drive the focusing lens group in the near direction in step S-ANG1. In step S-ANG2, since the driving direction of the focusing lens group is near rather than far, the AFDRVF flag (for representing whether the focusing lens group is being driven in the far direction) is est to 0 (i.e., near direction). The AFGO flag (for representing whether the focusing lens group is being driven) is est to 1 in step S-ANG3. The NL flag (for representing whether the near terminus of the focusing lens group is being detected) and the FL flag (for representing whether the far terminus of the focusing lens group is being detected) to 0 in steps S-ANG4 and S-ANG5 before advanceing to step S15, shown in FIG. 14.

In step S15, it is determined whether the focusing lens group has been driven for the amount of defocusing dp obtained in step S6. When the focusing lens group has been driven for an amount equal to dp, processing advances to S20 to executed an AF drive stop subroutine so as to stop the focusing lens group, before returning back to step S2. When the focusing lens group has not been driven by an amount equal to dp, processing advances to step S16 to determine whether the interval of the driving pulses which are outputted from the AF pulser 48 is at least 100 msec When the test indicates the pulse interval is less than 100 msec processing enters a loop so as to repeat steps S-15 and S-16. When the pulse interval exceeds 100 msec, processing stops driving the focusing lens group. At this time, the friction type clutch, which links the AF motor M1 and the focusing lens group, slips. Thus, when the pulse interval exceeds 100 msec, processing advances to step S17 so as to execute the AF terminus point subroutine. After that, processing advances back to step S2.

AF Terminus Point Subroutine

Figure 23:
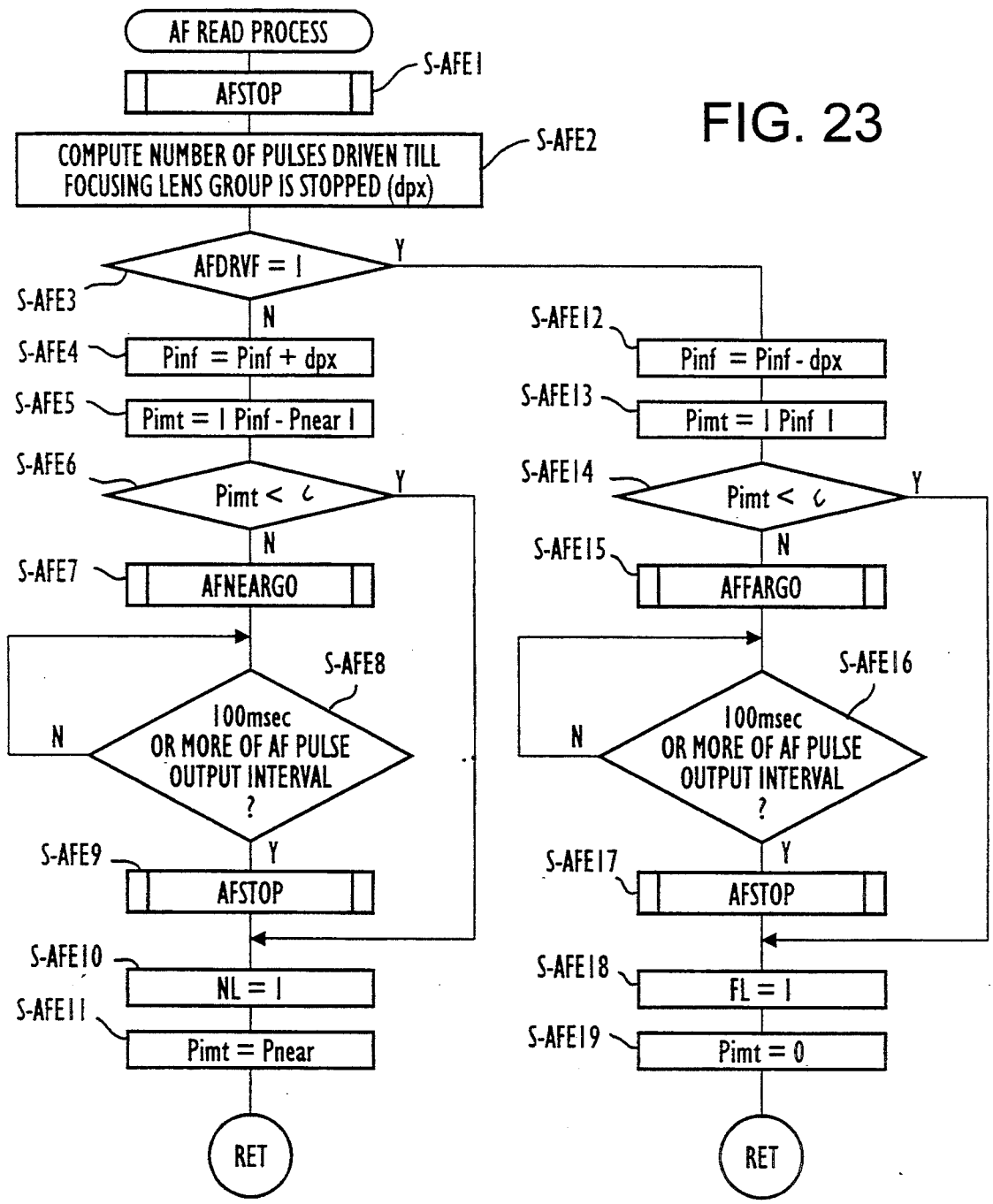

The AF terminus point subroutine in S17 is performed as shown in FIG. 23. The AFSTOP subroutine, shown in FIG. 41, takes place in the manner as described above in S-AFE1 so as to stop driving the focusing lens group and then advances to S-AFE2. The process computes the number of pulses being driven until the focusing lens group is stopped, dpx, using an output from the AF pulser 48 in S-AFE2 and then advances to S-AFE3. The process determines whether the driving direction of the focusing lens group is far or not in S-AFE3. When the driving direction is far, the determined condition is YES and the process advances to S-AFE12. When the driving direction is near, the determined condition is NO and the process advances to S-AFE4.

In S-AFE4, the process replaces the number of pulses for advancing the focusing lens group Pinf with a value where the number of pulses for advancing the focusing lens group from the far terminus Pinf is added to the number of pulses being driven until the focusing lens group is stopped, dpx, obtained in S-AFE2 and then advances to S-AFE5.

In S-AFE4, the process subtracts the number of pulses between the far terminus and near terminus of the focusing lens, Pncar from the number of pulses between the ncar terminus and the focal point of the focusing lens group, Pinf obtained in S-AFE4, computes an absolute value of the result as Plmt. After that, the process advances to S-AFE6.

In the terminus point detection process, since the number of pulses between the far terminus and near terminus is known, it can be set as the number of pulses for driving the focusing lens group to the near terminus. However, it is necessary to consider that the focusing lens group may not be driven to the near terminus and stopped in the midway due to some cause.

On the other hand, since the number of pules Pnear is a known value from the lens being used, when the focusing lens group is positioned at the near terminus, the result of the absolute value of the subtraction of Pinf—

Pnear will be 0. Thus, when the focusing lens group is positioned at the near terminus, the result of the subtraction should be 0. However, by considering some error, if the result of the subtraction is in a predetermined allowance, it is treated that the focusing lens group is positioned at the terminus point. The number of pulses Pnear which is a known value of the lens has been stored in the lens ROM as fixed data.

Thus, the process determines whether the number of pulses at the terminus point is in a predetermined allowable value e or not. Namely, when |Pinf−Pnear| is less than the allowable value e, the determined condition is YES and the process advances to S-AFE10. Otherwise, the predetermined condition is NO and the process advances to S-AFE7. The allowable value e represents a range of pulses (such as 10 pulses) for which the focusing lens group can be driven without an error. In S-AFE7, the process drives the focusing lens group shown in FIG. 36 on the near terminus side and then advances to S-AFE8.

When the focusing lens group is being driven in the near direction, driving pulses are output from the AF pulser 48 to the lens CPU 44. The process determines whether the driving pulses are being output from the AF pulser or not in S-AFE8. This determination is made by detecting whether the pulse interval is 100 msec or more or less than 100 msec. When the determined condition is NO (less than 100 msec), the process enters a loop so as to repeat the determination until the determined condition becomes YES (100 msec or more), namely the terminus point is detected. When the pulse interval exceeds 100 msec, the process drives the focusing lens group to the near terminus and stops it. At the time, the friction type clutch which links the AF motor M1 and the focusing lens group gets slipped. Thus, when the pulse interval exceeds 100 msec, the determined condition is YES (more than 100 msec) and the process advances to S-AFE9 so as to perform the process AFSTOP shown in FIG. 41. After that, the process advances to S-AFE10. The process sets the flag NL for representing whether the near terminus of the focusing lens group is being detected or not to 1 in S-AFE10 and then advances to S-AFE11. The process equalizes Pinf to Pnear in S-AFE11 and then advances to S2 shown in FIG. 14.

When the process determines whether the driving direction is far or not in S-AFE3, the determined condition is YES (far direction) and the process advances to S-AFE12. At the time, the process replaces the number of pulses for advancing the focusing lens group, Pinf, with a value where the number of pulses being driven until the focusing lens group is stopped, dpx, obtained in S-AFE2 is subtracted from the number of pulses for which the focusing lens group is advanced from the far terminus. Pinf and then advances to S-AFE13.

In S-AFE13, the process computes an absolute value |Pinf−dpx| of the number of pulses from the focal point to the far terminus of the focusing lens group, Pinf obtained in S-AFE12 and then advances to S-AFE14. However, because the focusing lens group may not be driven to the far terminus but stopped midway, it is necessary to detect that. On time other hand, when time focusing lens group is positioned at the far terminus, time absolute value of Pinf, namely the absolute value of Pinf−dPx in S-AFE12 [result of the subtraction in S-AFE12] will be 0. Thus, when the focusing lens group is positioned at the far terminus, the result of the subtraction should be 0. However, by considering some error, when the error is in an allowable value, it is treated that the focusing lens group is positioned at the terminus point.

The process determines whether the number of pulses at the terminus point is in an allowable value e or not in S-AFE14. In other words, when |Pinf| is less than the allowable value e, the determined condition is YES and the process advances to S-AFE18. Otherwise, the determined condition is NO and the process advances to S-AFE15. In S-AFE15, the process drives the focusing lens group to the far terminus shown in FIG. 35 in the manner as described above.

When the focusing lens group is being driven to the far terminus, driving pulses are output from the AF pulser 48 to the lens CPU 44. The process determines whether the driving pulses are being output from the AF pulser 48 or not in S-AFE16. This determination is made by detecting whether the pulse interval is 100 msec or more or less than 100 msec. When the determined condition is NO (less than 100 msec), the process enters a loop so as to repeat the determination until the determined condition becomes YES (less than 100 msec), namely the terminus point is detected. When the pulse interval exceeds 100 msec, the process drives the focusing lens group to the far terminus and stops it. At the time, the friction type clutch which links the AF motor M1 and the focusing lens group gets slipped. Thus, when the pulse interval exceeds 100 msec, the determined condition is YES (more than 100 msec) and the process advances to S-AFE17 so as to performs the process AFSTOP shown in FIG. 41. The process advances to S-AFE18 so as to set the flag FL for representing whether the far terminus of the focusing lens group is being detected or not to 0 and then advances to S2 shown in FIG. 14.

Figure 22:
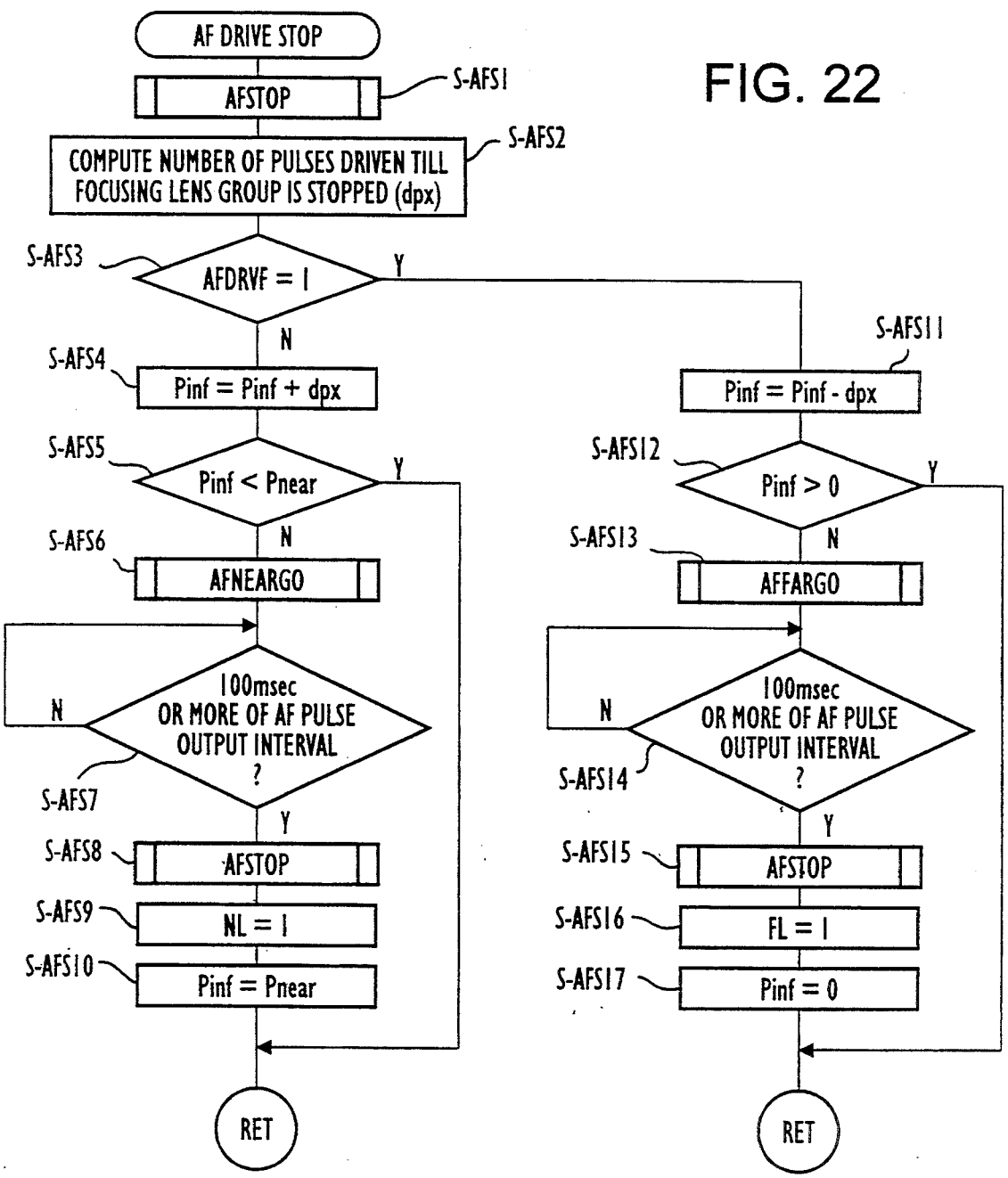

AF Drive Stop (FIG. 22)

The AF drive stop process in S20 is conducted as shown in FIG. 22. The process AFSTOP shown in FIG. 41 as described above takes place in S-AFS1 so as to stop driving the focusing lens group and then advances to S-AFS2. The process computes the number of pulses being driven until the focusing lens group is stopped, dpx, using an output from the AF pulser 48 and then advances to S-AFS3. The process determines whether the driving direction is far or not in S-AFS3. When the determined condition is YES (far direction), the process advances to S-AFS11. When the determined condition is NO (near direction), the process advances to S-AFS4.

The process replaces the number of pulses for advancing the focusing lens group, Pint with a value where the number of pulses being driven until the focusing lens group is stopped, dpx (equivalent to dp) obtained in S-AFS2 is added to the number of pulses for which the focusing lens group is advanced from the far terminus, Pint and then advances to S-AFS5.

The process determines Whether the number of pulses at the terminus point is larger (out of range) or smaller (in range) than Pnear in S-AFS5. When the determined condition is YES (in range), the process advances to S2 shown in FIG. 14. When the determined condition is NO (out of range), the process advances to S-AFS6. The process drives the focusing lens group in the near direction in S-AFS6 shown in FIG. 36.

When the focusing lens group is being driven in the near direction, driving pulses are output from the AF pulser 48 to the lens CPU 44. The process determines whether the driving pulses are being output from the AP pulser 48 in S-AFS7. This determination is made by detecting whether the pulse interval is 100 msec or more or less than 100 msec. When the determined condition is NO (less than 100 msec), the process enters a loop so as to repeat the determination until the determined condition becomes YES (100 msec or more), namely the terminus point is detected. When the pulse interval exceeds 100 msec. the process drives the focusing lens group to the near terminus and stops it. At the time, the friction type clutch which links the AF motor M1 and the focusing lens group gets slipped. Then, when the pulse interval exceeds 100 msec. the determined condition becomes YES (100 msec or more) and the process advances to S-AFS8 so as to performs the process AFSTOP shown in FIG. 41. The process advances to S-AFS9 and sets the flag NL for representing whether the near terminus of the focusing lens group is being detected or not to 1. The process equalizes Pinf to Pnear in S-AFS10 and then advances to S2 shown in FIG. 14.

The process determines whether the driving direction is far or not in S-AFS3. When the determined condition is YES (far direction), the process advances to S-AFS11. The process replaces the number of pulses for which the focusing lens is advanced, Pinf with a value where the number of pulses being driven until the focusing lens group is stopped, dpx, obtained in S-AFS2 is subtracted from the number off pulses for which the focusing lens group is advanced from the far terminus, Pinf and advances to S-AFS12.

The process determines whether the number of pulses Pinf at the terminus point is larger (in range) or smaller (out of range) than 0 in S-AFS12. When the determined condition is YES (in range), the process advances to S2 shown in FIG. 14. When the determined condition is NO (out of range), the process advances to S-AFS13. The process drives the focusing lens group in the far direction in the manner described above and shown in FIG. 35 in S-AFS13.

When the focusing lens group is being driven in the far direction, driving pulses are output from the AF pulser 48 to the lens CPU 44. The process determines whether the driving pulses are being output from the AF pulser 48 or not in S-AFS14. This determination is made by detecting whether the pulse interval is 100 msec or more or less than 100 msec. When the determined condition is NO (less than 100 msec), the process enters a loop so as to repeat the determination until the determined condition becomes YES (100 msec or more), namely the terminus point is detected. When the pulse interval exceeds 100 msec. the process drives the focusing lens group to the far terminus and stops it. At the time, the friction type clutch which links the AF motor M1 and the focusing lens group gets slipped. Thus, when the pulse interval exceeds 100 msec, the determined condition is YES (100 msec or more) and the process advances to S-AFS15 so as to perform the process the AFSTOP shown in FIG. 41. The process advances to S-AFS18. The process sets the flag FL for representing whether the far terminus of the focusing lens group is being detected or not to 1 in S-AFS16, sets Pinf to 0 in S-AFS17, and advances to S2 shown in FIG. 14.

Image Magnification Constant Control

In S21 shown in FIG. 14, the process determines whether the flag MAGIMG for representing whether to start the image magnification constant operation or not has been set to 1 or not. When the flag MAGIMG has been set to 1, the determined condition is YES and the process advances to S25. The process turns off the in-focus indication in S25. The process advances to B shown in FIG. 15 so as to perform the image magnification constant control operation.

In S-B1 shown in FIG. 15, the process sets the flag ONIMG for representing whether the image magnification constant control operation takes place or not to 1 (control state). The process advances to S-B2. The process computes the amount of advancing of the focusing lens group from the infinite terminus, $x_0$ in S-B2 and then advances to S-B3. The process inputs the present focal length information of the zooming lens group, $f_0$ in S-B3 and then advances to S-B4. The process determines whether the amount of advancing $x_0$ is smaller than $f_0/150$ or not. In this determination, whether the amount of advancing $x_0$ is smaller than $f_0/150$ or not means whether the image magnification is too small to be controlled or not. When the image magnification is too small, a change of the image magnification caused by moving of the subject cannot be precisely detected. Thus, in this case, when the determined condition is YES, the process advances to S-B18 so as to turn off the in-focus indication. The process generates an out-of-control signal to inform the operator that the Image magnfication constant control operation is disabled in S-B19. The process sets the flag SWREN for representing whether the release operation is permitted or not to 0 in S-B20. The process sets the flag ONIMG for representing whether the image magnification constant control operation takes place or not to 0 (non-control state) in S-B21. The process sees the flag MAGIMG for representing whether to start the image magnification constant operation or not to 0 in S-B22 and then advances to S2 shown in FIG. 14.

When the process determined that the image magnification is not too small in S-B4, the determined condition is NO and the process advances to S-B5. The process computes $m_0 = x_0/f_0$ in S-B5 and then advances to S-B6. The process computes the amount of defocusing dx in S-B6 and then advances to S-B7. The process determines whether the contrast of the subject is low or not in S-B7. When the determined condition is YES (low contrast), the process advances to S-B28. The process sets the flag SWREN for representing whether the release operation is permitted or not to 0 in S-B23. The process turns off the in-focus indication in S-B24. The process advances to S2 shown in FIG. 14 so as to enter a loop until the contrast become high. For improving the operability, this operation allows the image magnificatlon constant control operation to be continued when the subject is returned to a predetermined position on the screen even if it is lost from the screen or it is moved in a horizontal direction and the contrast decreases.

When the determined condition is NO, the process advances to S-B8 so as to determined whether the subject is being focused or not. When the determined condition is YES (focused), since the contrast is high and the subject does not move from the former position, the process advances to S-B16. The process sets the flag SWREN for representing whether the release operation is permitted or not to 1 (release permission) in S-B16. The process advances to S-B17 so as to turn on the in-focus indication and returns back to S-B1 so as to enter a loop. When the determined condition is NO (not focused) in S-B8, since the lens should be moved, the process advances to S-B9. The process computes the amount of driving of the focusing lens group, dp, using the amount of defocusing dx in S-B9 and then advances to S-B10.

The process computes a focal length of the focusing lens group of which the amount of defocusing dx occurs using the equation (7) in S-B10 and then advances to S-B11. In this step, the focal length f of the equation (7) is assumed to be fl. Assuming that the focal length at the wide terminus of the focusing lens group is fW and that at the TL terminus is ft, to perform the image magnification constant control operation, it is necessary that fW<fl<ft. The process determines that in S-B11. When fl is not in the range, the determined condition is NO and the process advances to S-25. The process sets the flag SWREN for representing whether the release operation is permitted or not to 0 in S-B25. The process turns off the in-focus indication in S-B26 and then advances to E shown in FIG. 18. The process E waits until fl is in the range of fW<fl<ft.

When fl is in the range of fW<fl<ft in S-B11, the determined condition is YES and the process advances to S-B13. The process computes the control image magnification $r = fl/f_0$ and then advances to S-B13. The process inputs constants A, B, and C for computing the amount of driving of the zooming lens group Pz from the lens ROM 43 to the lens CPU 44 or main CPU 6 and then advances to S-B14. The process computes the amount of driving Pz of the equation (11) using the constants A, B, and C in S-B14 and advances to S-B15. The process determines whether dp and Pz are 0 or not in S-B15. When both of them are 0, the determined condition is NO and the process advances to N shown in FIG. 16. When both of them are 0, the determined condition is YES and the process advances to S-B16 so as to set the flag SWREN for representing whether the release operation is permitted or not to 1 (release permission). The process advances to S-B17 so as to turn on the in-focus indication and then returns back to S-B1 so as to enter a loop.

Figure 16:
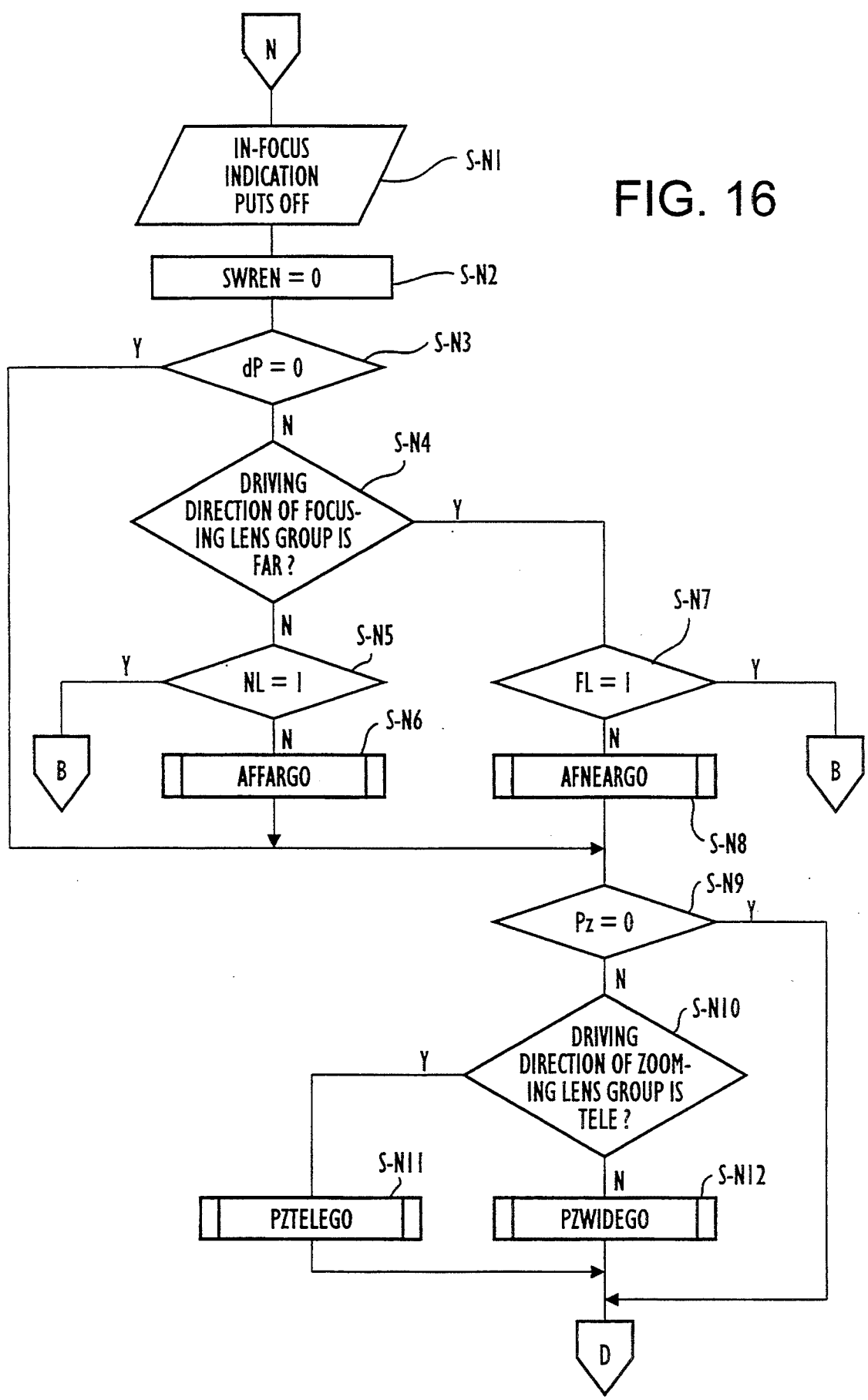

When the process determined that either of dp and Pz is not 0 in S-B15, it advances to N shown in FIG. 16. The process turns off the in-focus indication in S-N1. The process sets the flag SWREN for representing whether the release operation is permitted or not to 0 in S-N2 and then advances to S-N3. The process determines whether the amount of driving of the focusing lens group, dp, is 0 or not in S-N3. When the amount of driving is 0, the determined condition is YES and the process advances to S-N9. The process determines whether the amount of driving of the zooming lens group, Pz, is 0 or not in S-N9. When the amount of driving is 0, the determined condition is YES and the process advances to D shown in FIG. 17.

When the amount of driving dp is not 0 in S-N3, the determined condition is NO and the process advances to S-N4. The process determines whether the driving direction of the focusing lens group is far or not in S-N4. When the direction is near, the determined condition is NO and the process advances to S-N5. When the direction is far, the determined condition is YES and the process advances to S-N7. The process determines whether the flag NL for representing whether the near terminus of the focusing lens group is being detected or not has been set to 1 or not in S-N5. When the terminus point has been detected and the NL has been set to 1, the determined condition is YES and the process returns back to B shown in FIG. 15 so as to enter a loop. When the determined condition is NO, the process advances to S-N6. The process determines whether the flag FL for representing whether the far terminus of the focusing lens group is being detected or not has been set to 1 or not in S-N7. When the terminus point has been detected and the FL has been set to 1, the determined condition is YES and the process returns back to B shown in FIG. 15 so as to enter a loop. When the determined condition is NO, the process advances to S-N8. The process in S-N6 shown in FIG. 35 is the process AFFARGO which drives the focusing lens group in the far direction. The process in S-N8 shown in FIG. 36 is the process AFNEARGO which drives the focusing lens group in the near direction. After that, the process advances to S-N9. The process determines whether the amount of driving Pz is 0 or riot in S-N9. When it is not 0, the determined condition is NO and the process advances to S-N10. The process determines whether the driving direction of the zooming lens group is tele or not in S-N10. When the direction is tele, the determined condition is YES and the process advances to S-N11 so as to perform the process PZTELEGO shown in FIG. 87 which drives the zooming lens group in the tele direction. When the direction is wide in S-N10, the determined condition is NO and the process advances to S-N12 so as to perform the process PZWIDEGO shown in FIG. 38 which drives the zooming lens group in the wide direction.

Figure 37:
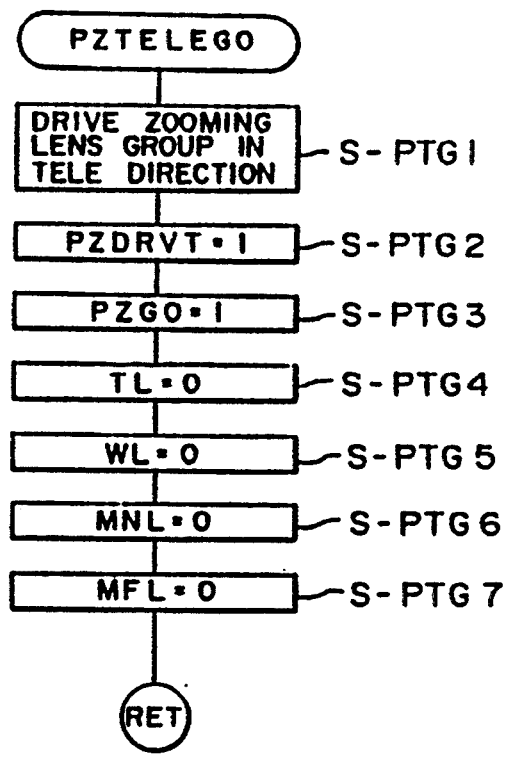

The process PZTELEGO shown in FIG. 37 drives the zooming lens group in the tele direction in S-PTG1. The process sets the flag PZDRVF for representing whether the zooming lens group is being driven in the tele direction or not to 1 (tele direction) in S-PTG2. The process sets the flag PZGO for representing whether the zooming lens group is being driven or not to 1 (drive state) in S-PTG3. In steps S-PTG4 to S-PTG7, the process sets the flag WL for representing whether the wide terminus of the zooming lens group is being detected or not to 0, sets the flag MNL for representing whether the near terminus of the focusing lens group is being detected by driving the zoom ring in the macro area or not to 0, sets the flag MFL for representing whether the far terminus of the focusing lens group is being detected by driving the zoom ring in the macro area or not to 0, and then advances to D shown in FIG. 17.

Figure 38:
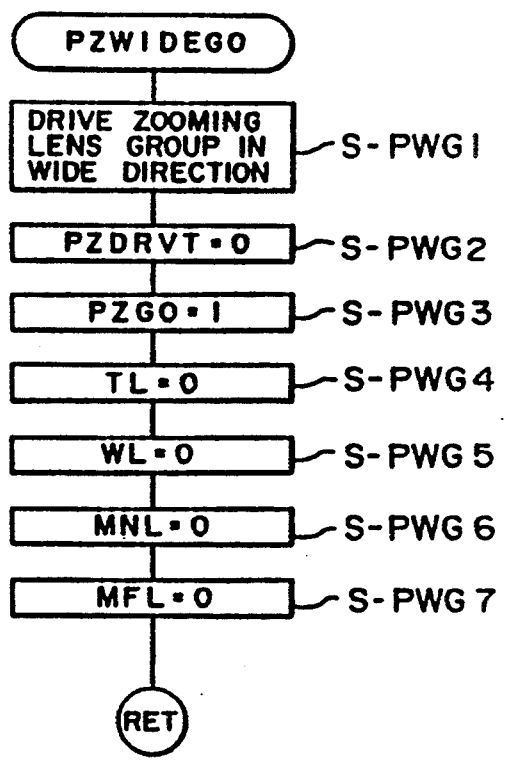

The process PZWIDEGO shown in FIG. 38 drives the zooming lens group in the wide direction in S-PWG1. The process sets the flag PZDRVF for representing whether the zooming lens group is being driven in the tele direction or not to 0 (wide direction) in S-PWG2. The process sets the flag PZGO for representing whether the zooming lens group is being driven or not to 1 (drive state) in S-PWG3. In steps S-PWG4 to S-PWG7, the process sets the flag TL for representing whether the tele terminus of the zooming lens group is being detected or not to 0, sets the flag WL for representing whether the wide terminus of the zooming lens group is being detected or not to 0 sets the flag MNL for representing whether the near terminus of the focusing lens group is being detected by driving the zoom ring in the macro area or not to 0, sets the flag MFL for representing whether the far terminus of the focusing lens group is being detected by driving the zoom ring in the macro area or not to 0, and advances to D shown in FIG. 17.

The process D shown in FIG. 17 always stops at any position rather than detecting the terminus point because the focusing lens group is positioned in the zoom area. The process determines to detect the terminus point of the focusing lens group only. In the process D shown in FIG. 17, the following cases are described:

(a) When both the focusing lens group and zooming lens group do not move;

(b) When only the zooming lens group moves and the focusing lens group does not move;

(c) When the zooming lens group stops and only the focusing lens group moves;

(d) When both the focusing lens group and zooming lens group move; (however, the focusing lens group stops earlier than the zooming lens group); and (e) When both the focusing lens group and zooming lens group move; (however, the zooming lens group stops earlier than the focusing lens group).

Each of above cases is described in the following:

(a) When both the focusing lens group and zooming lens group do not move

In S-D1 shown in FIG. 17, the process determines whether the flag AFGO for representing whether the focusing lens group is being driven or not has been set to 1 (drive state) or not. When the determined condition is YES, the process advances to S-D2. When the determined condition is NO, the process advances to S-D18. The process determines whether the flag PZGO for representing whether the zooming lens group is being driven or not has been set to 1 (drive state) or not in S-D16. When the determined condition is NO, the process advances to S-D16. The process sets the flag SWREN for representing whether the release operation is permitted or not to 1 (in-focus indication) in S-D16, stops driving the focusing lens group shown in FIG. 22 in S-D17, and then advances to S-D18.

The process determines whether the flag FL for representing whether the far terminus of the focusing lens group is being detected or not has been set to 0 (terminus point detection) or not in S-D18. When the terminus point has been detected, the determined condition is YES and the process advances to B shown in FIG. 15 so as to enter a loop. When the terminus point has not been detected, the determined condition is NO and the process advances to S-D19. The process determines whether the flag NL for representing whether the near terminus of the focusing lens group is being detected or not has been set to 1 (terminus point detection) or not in S-D19. When the determined condition is YES, the process advances to B shown in FIG. 15. When the terminus point has not been detected, the determined condition is NO and the process advances to S-D20.

When both the determined conditions in S-D18 and S-D19 are NO, since the image magnification becomes constant, the process turns on the in-focus indication in S-D20. The process sets the flag SWREN for representing whether the release operation is permitted or not to 1 in S-D21 and then returns back to B shown in FIG. 15 so as to enter a loop. When both the determined conditions in S-D18 and S-D19 are YES, the process returns back to B shown in FIG. 15 so as to enter a loop until the image magnification becomes constant.

(b) when only the zooming lens group moves and the focusing lens group does not move The process determines whether the flag AFGO for representing whether the focusing lens group is being driven or not has been set to 1 (drive state) or not in S-D1. When the determined condition is YES, the process advances to S-D2. When the determined condition is NO, the process advances to S-D13. The process determines whether the flag PZGO for representing whether the zooming lens group is being driven or not has been set to 1 (drive state) or not in S-D13. When the determined condition is YES, the process advances to S-D14. The process determines whether the zooming lens group has been driven for the number of driving pulses Pz in S-D14. When the determined condition is NO, the process returns back to S-D1 so as to enter a loop until the zooming lens group has been driven for the number of driving pulses Pz. When the zooming lens group has been driven for the number of driving pulses Pz, the determined condition in S-D14 is YES (drive completion) and the process advances to S-D15. The process stops driving the zooming lens group shown in FIG. 42 in S-D15 and then advances to S-D16. After that, the process advances to S-D16 to S-D21 and then returns back to B shown in FIG. 15 so as to enter a loop.

(c) When the zooming lens group stops and only the focusing lens group moves

The process determines whether the flag AFGO for representing whether the focusing lens group is being driven or not has been set to 1 (drive state) or not in S-D1. When the determined condition is YES (drive state), the process advances to S-D2. The process determines whether the flag PZGO for representing whether the zooming lens group is being driven or not has been set to 1 (drive state) or not in S-D2. When the determined condition is NO (non-drive state), the process advances to S-D4. The process determines whether the focusing lens group has been driven for the number of pulses dp or not in S-D4. When the determined condition is YES, the process advances to S-D12 so as to perform the process AFSTOP shown in FIG. 41. The process stops driving the focusing lens group and then returns back to S-D1 so as to enter a loop.

When the determined condition in S-D4 is NO, the process advances to S-D5. The process determines whether the output interval of AF pulses which are output from the AF pulser 48 is 100 msec or more or less than 100 msec in S-D5. When the determined condition is NO (less than 100 msec), the process returns back to S-D1 so as to enter a loop until the pulse interval becomes 100 msec or more. When the determined condition is YES (100 msec or more), the process advances to S-D6 so as to perform the process AFSTOP shown in FIG. 41. The process stops driving the focusing lens group and then advances to S-D7.

The process determines whether the flag PZGO for representing whether the zooming lens group is being driven or not has been set to 1 (drive state) or not in S-D7. When the zooming lens group is not being driven, the determined condition is NO and the process advances to S-D10. The process advances to the terminus point process shown in FIG. 28 and returns back to B shown in FIG. 15 so as to enter a loop.

(d) When both the focusing lens group and the zooming lens group move; however, the focusing lens group stops earlier than the zooming lens group The process determines whether the flag AFGO for representing whether the focusing lens group is being driven or not has been set to 1 (drive state) or not in S-D1. When the determined condition is YES (drive state), the process advances to S-D2. The process determines whether the flag PZGO for representing whether the zooming lens group is being driven or not has been set to 1 (drive state) or not in S-D2. When the determined condition is YES (drive state), the process advances to S-D3. The process determines whether the zooming lens group has been driven for the number of driving pulses Pz or not in S-D3. When the determined condition is NO, the process advances to S-D4. The process determines whether the focusing lens group has been driven for the number of pulses dp in S-D4. When the determined condition is YES, the process advances to S-D12 so as to perform the process AFSTOP shown in FIG. 41. The process stops driving the focusing lens group, returns back to S-D1, and advances to S-D13 to S-D19.

When the determined condition is NO in S-D4, the process advances to S-D5. The process determines whether the output interval of the AF pulses which are output from the AF pulser 48 is 100 msec or more or less than 100 msec. When the determined condition is NO (less than 100 msec), the process returns back to S-D1 so as to enter a loop until the pulse interval becomes 100 msec or more. When the determined condition is YES (100 msec or more), the process advances to S-D6 so as to perform the process AFSTOP shown in FIG. 41. The process stops driving the focusing lens group and then advances to S-D7.

The process determines whether the flag PZGO for representing whether the zooming lens group is being driven or not has been set to 1 (drive state), or not in S-D7. When the zooming lens is being driven, the determined condition is YES and the process advances S-D8. The process determines whether the zooming lens group has been driven for the number of driving pulses Pz based on the pulses which are output from the PZ pulser 49 or not in S-D8. When the determined condition is NO, the process enters a loop until the zooming lens group has been driven for the number of driving pulses. When the determined condition is YES, the process advances to S-D9 so as to stop driving the zooming lens group shown in FIG. 42 and then advances to S-D10 shown in FIG. 28 so as to perform the terminus point process and then returns back to B shown in 15 so as to enter a loop.

(e) When both the focusing lens group and zooming lens group move; (however, the zooming lens group stops earlier than the focusing lens group)

The process determines whether the flag AFGO for representing whether the focusing lens group is being driven or not has been set to 1 (drive state) or not in S-D1. When the determined condition is YES (drive state), the process advances to S-D2. The process determines whether the flag PZGO for representing whether the zooming lens group is being driven or not has been set to 1 (drive state) or not in S-D2. When the determined condition is YES (drive state), the process advances to S-D3. The process determines whether the zooming lens group has been driven for the number of driving pulses Pz in S-D3. When the determined condition is YES, the process advances to S-D11 so as to stop driving the zooming lens group as shown in FIG. 42. The process advances to S-D4.

The process determines whether the focusing lens group has been driven for the number of pulses dp in S-D4. When the determined condition is YES, the process advances to S-D12 so as to perform the process AFSTOP shown in FIG. 41 so as to stop driving the focusing lens group and then returns back to S-D1. When the AFSTOP process is performed, the flag AFGO for representing whether the focusing lens group is being driven or not is set to 0. Thus, since the determined condition in S-D1 is NO, the processes in S-D13 to S-D21 are performed.

When the determined condition is NO in S-D4, the process advances to S-D5. The process determines whether the output interval of the AF pulses which are output from the AF pulser 48 is 100 msec or more or less than 100 msec in S-D5. When the determined condition is NO (less than 100 msec), the process returns back to S-D1 so as to enter a loop until the output interval becomes 100 msec or more. When the determined condition is YES (100 msec or more), the process advances to S-D6 so as to perform the process AFSTOP shown in FIG. 41. The process stops driving the focusing lens group and then advances to S-D7.

The process determines whether the flag PZGO for representing whether the zooming lens group is being driven or not has been set to 1 (drive state) or not in S-D7. When the zooming lens group is not being driven, the determined condition is NO and the process advances to S-D10. The terminus point process shown in FIG. 23 takes place in S-D10 and returns back to B shown in FIG. 15 so as to enter a loop.

Figure 18:
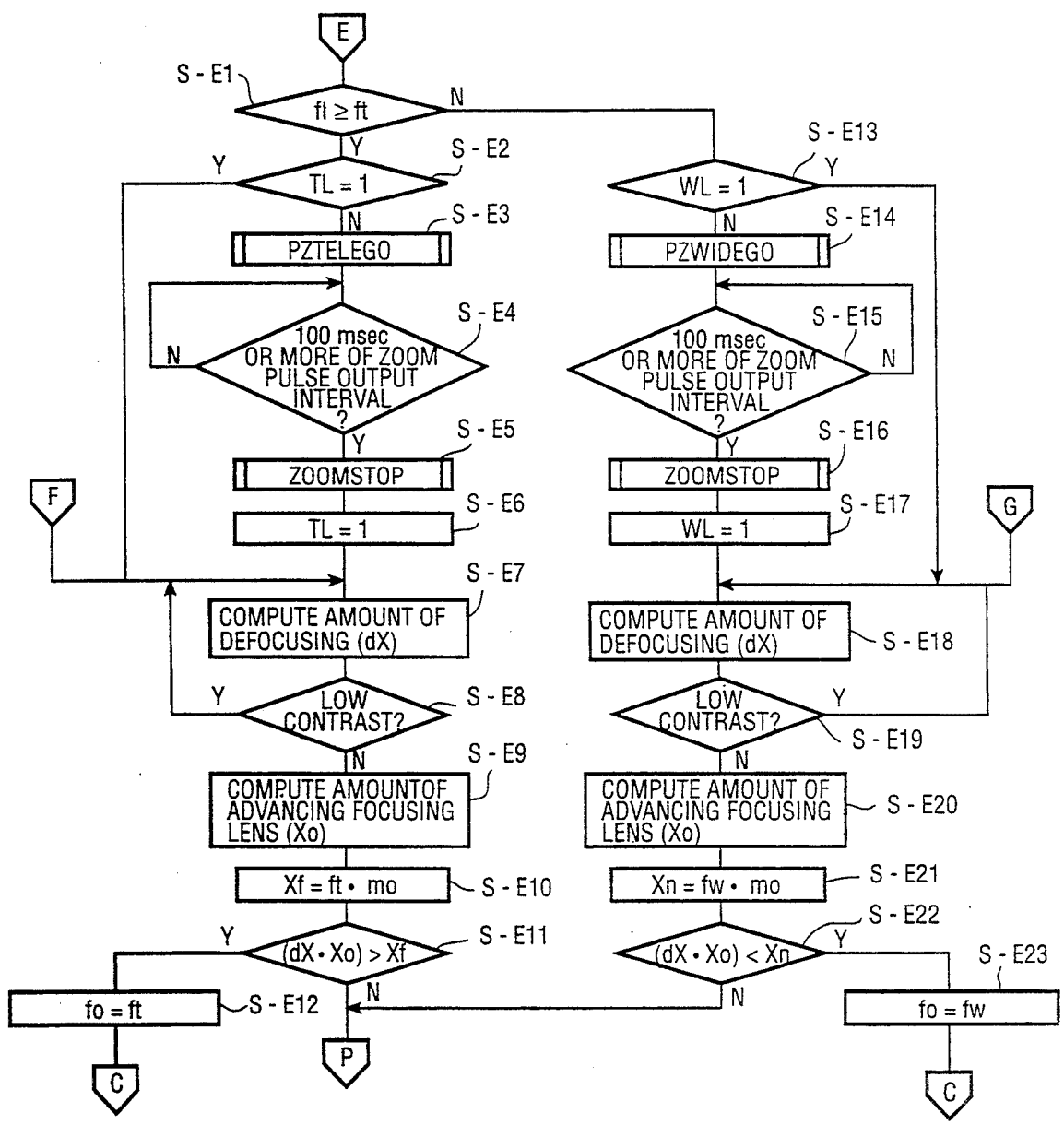

When the process advances to S-B25 and S-B28 by the determined condition in S-B11 of the process B shown in FIG. 15, it advances to E shown in FIG. 18. When the image magnification constant control is not in the zoom range, since "it is preferable that the zooming lens group be moved to the terminus point, rather than being placed midway for further-processes", the process advances to E.

Whether the zooming lens group is positioned at the wide terminus or tele terminus is determined using fl. When fl is smaller than ft, fl is smaller than fw. Thus, by determining the sizes of fl and ft only, those of fl and fw can be determined at the same time rather than determining both the sizes of fl and ft and those of fl and ft.

Thus, the process determines whether fl is equal to ft or not or whether fl is larger than ft in S-E1. When fl is equal to ft or when fl is larger than since the zooming lens group is positioned on the tele terminus side, the determined condition is YES and the process advances to S-E2. When fl is smaller than since the zooming lens group is positioned on the wide terminus side, the determined condition is NO and the process advances to S-E13.

The process determines whether the flag TL for representing whether the tele terminus of the zooming lens group is being detected or not has been set to 1 (terminus point detection) or not in S-E2. When the terminus point has been detected, the determined condition is YES and the process advances to S-E7. When the determined condition is NO, the process advances to S-E3. The process drives the zooming lens group in the tele direction as shown in FIG. 37 in S-E3 and then advances to S-E4. The process waits until the zooming lens group is positioned at the terminus point in S-E4. When the determined condition is NO (less than 100 msec), the process enters a loop until the determined Condition becomes YES after the zooming lens group is detected at the terminus point. When the determined condition is YES (100 msec or more), the process advances to S-E5 so as to perform the process ZOOM-STOP shown in FIG. 42. The process stops driving the zooming lens group in S-E5 and then advances to S-E6. The process sets the flag TL for representing whether the tele terminus of the zooming lens group is being detected or not to 1 in S-E7 and then advances to S-E7.

When the process advances from S-E2 or S-E6 to S-E7, it computes the amount of defocusing of the focusing lens group, dx, and then advances to S-E8. The process determines whether the contrast of the subject is low or not in S-E8. When the contrast is low, the determined condition is YES and the process enters a loop until the contrast is present. When the contrast is present, the determined condition is NO and the process advances to S-E9. The process computes the amount of advancing of the focusing lens group, $X_0$ in S-E9 and advances to S-E10. The process computes $Xf = ft \cdot m_0$ in S-E1 and then advances to S-E11.

Figure 19:
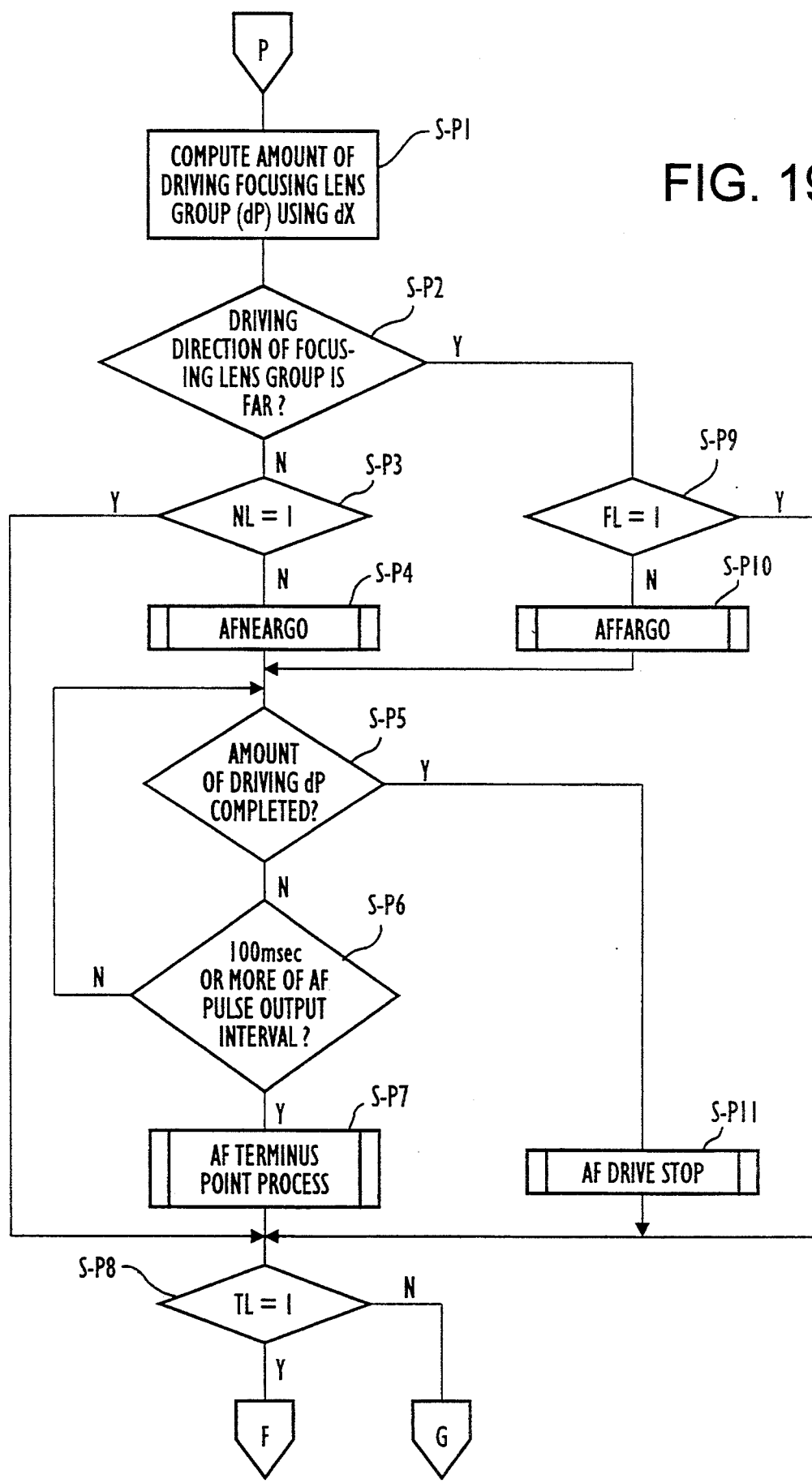

In S-E1, the process determines whether or not the subject is in the focal length of the image magnification $m_0$ obtained last time using the determination of whether $dx + x_0$ is larger than $x_f$ obtained in S-E10. When the process determined that the subject is in the focal length, the determined condition is YES and the process advances to S-E12. The process replaces $f_0$ with ft in S-E12 and then advances to S-B9 shown in FIG. 15 so as to start driving the focusing lens group. When the process determined that the subject is far from the focal length in S-E1, the determined condition is NO and the process advances to P shown in FIG. 19.

When the process determined that fl is smaller than ft and that the focusing lens group is positioned on the WL terminus side in S-E1, the determined condition is NO, the process advances to S-E13, and then it determines whether the flag WL for representing whether the wide terminus of the zooming lens group is being detected or not has been set to 1 (terminus point detection) or not in S-E13. When the terminus point has been detected, the determined condition is YES and the process advances to S-E18. When the determined condition is NO, the process advances to S-E14. The process drives the zooming lens group in the wide direction as shown in FIG. 38 in S-E14 and then advances to S-E15. The process waits until the zooming lens group detects the terminus point in S-E15. When the determined condition is NO (less than 100 msec), the process enters a loop until the zooming lens group is positioned at the terminus point and the determined condition becomes YES. When the determined condition is YES (100 msec or more), the process advances to S-E18 so as to perform the process ZOOMSTOP shown in FIG. 42. The process stops driving the zooming lens group and then advances to S-E17. The process sets the flag WL for representing whether the wide terminus of the zooming lens group is being detected or not to 1 in S-E17 and then advances to S-E18.

When, the process advances from S-E13 or S-E17 to S-E18, it computes the amount of defocusing of the focusing lens group, dx, in S-E7 and then advances to S-E19. The process determines whether the contrast of the subject is low or not in S-E19. When the contrast is low, the determined condition is YES and the process enters a loop until the contrast is present. When the contrast is present, the determined condition is NO and the process advances to S-E20. The process computes the amount of advancing of the focusing lens group, $X_0$ in S-E20 and then advances to S-21. The process computes $x_n = fw \cdot m_0$ in S-E21 and then advances to S-E22.

The process determines whether or not the subject is in the focal length of the image magnification $m_0$ obtained last time using the determination of whether $d_x + x_0$ is smaller than $x_n$ or not in S-E22. When the subject is in the focal length in S-E22, the determined condition is YES and the process advances to S-E23. The process replace $f_0$ with fw in S-E23. The process advances to S-B9 shown in FIG. 15 so as to start driving the focusing lens group. When the process determined that the subject is nearer to than the focal length, the determined condition is NO and the process advances to P shown in FIG. 19.

The process computes the amount of driving of the focusing lens group, dp, using the amount of defocusing dx in S-P1 and then advances to S-P2. The process determines whether the driving direction of the focusing lens is far or not in S-P2. When the determined condition is NO (near direction), the process advances to S-PS. When the determined condition is YES (far direction), the process advances to S-P9. The process determines whether the flag NL for representing whether the near terminus of the focusing lens group is being detected or not has been set to 1 or not in S-P3. When the terminus point has been detected, the determined condition is YES and the process advances to S-P8. When the determined condition is NO, the process advances to S-P4. The process determines whether the flag FL for representing whether the far terminus of the focusing lens group is being detected or not has been set to 1 or not in S-P9. When the terminus point has been detected, the determined condition is YES and the process advances to S-P10. When the determined condition is NO, the process advances to S-P4. The process drives the focusing lens group in the near direction as shown in FIG. 36 in S-P4. The process drives the focusing lens group in the far direction as shown in FIG. 35 in S-P10 and then advances to S-P5.

The process determines whether the focusing lens group has been driven for the amount of driving dp. When the focusing lens group has been driven for the amount of driving, the determined condition is YES and the process advances to S-P11. When the determined condition is NO, the process advances to S-P6. The process determines whether the interval of pulses which are output from the AF pulser 48 is 100 msec or more or less than 100 msec in S-P6. When the determined condition is NO (less than 100 msec), the process returns back to S-P5 so as to enter a loop. When the determined condition is YES (100 msec or more), the process advances to S-P7 so as to perform the AF terminus point process shown in FIG. 23 in S-P7 The process advances to S-P8 so as to perform the AF drive stop process shown in FIG. 22 in S-P11 and then advances to S-P8. The process determines whether the flag TL for representing whether the tele terminus of the zooming lens group is being detected or not has been set to 1 in S-P8. When the terminus point has been detected, the determined condition is YES and the process advances to S-E7 shown in FIG. 18. When the determined condition is NO, the process advances to G shown in FIG. 18 so as to repeat the same operation.

Timer Interrupt Process

Figure 24:
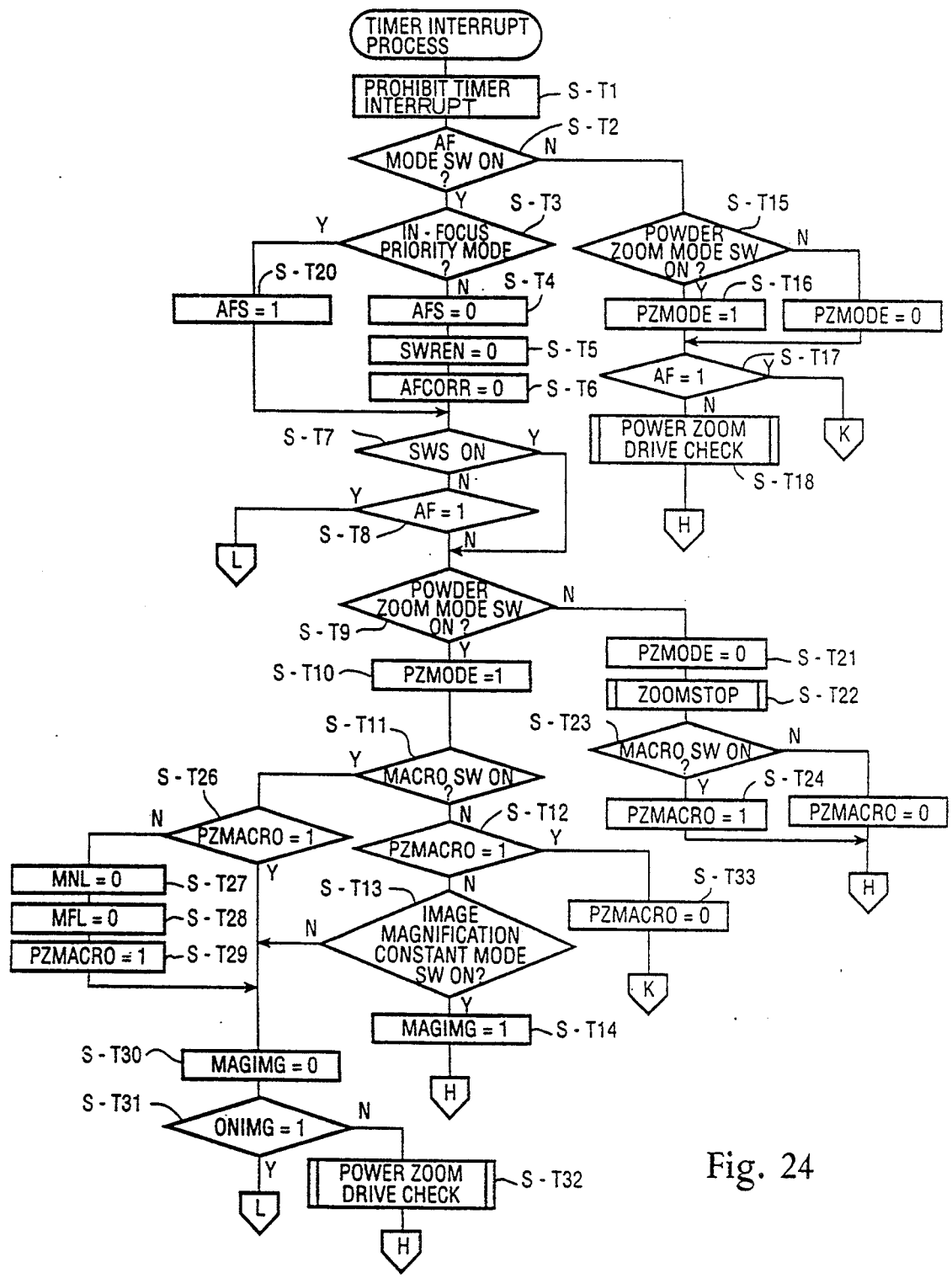

The process prohibits a timer interrupt in S-T1 shown in FIG. 24 and then advances to S-T2. The process turns on the AF mode switch (switch SWAF A/M) and determines whether the AF mode takes place or not. When the determined condition is YES (AF mode), the process advances to S-T3. When the determined condition is NO (manual mode), the process advances to S-T15. The process determines whether the power zoom mode switch SWPZ has been turned on in S-T15. When the switch has been turned on, the determined condition is YES and the process advances to S-T16. When the switch has been turned off, the determined condition is NO and the process advances to S-T19. The process sets the flag PZMODE for representing whether the zooming lens group can be driven by the power zoom mechanism or not to 1 (drive enable) in S-T16. The process sets the flag PZMODE for representing whether the zooming lens group can be driven by the power zoom mechanism or not to 0 (drive disable) in S-T19. After that, the process advances to S-T17. The process determines whether the flag AF for representing whether the autofocus state takes place or not has been set to 1 (autofocus state) or not in S-T17. When the determined condition is YES, the process advances to K shown in FIG. 30. When the determined condition is NO, the process advances to S-T18. The process checks whether the power zoom is driven shown in FIG. 28 in S-T18 and then advances to H shown in FIG. 25.

Figure 25:
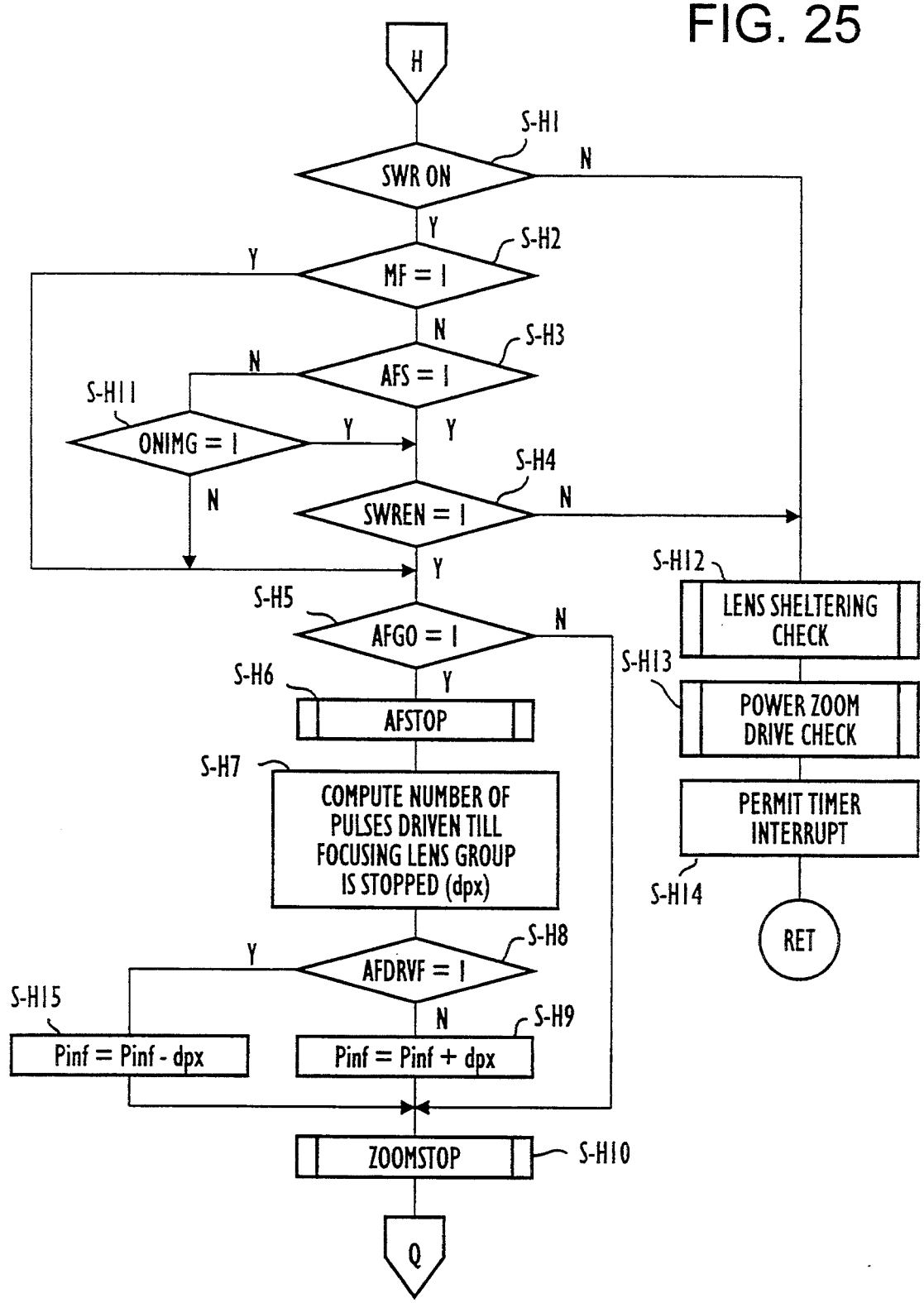
Figure 32:
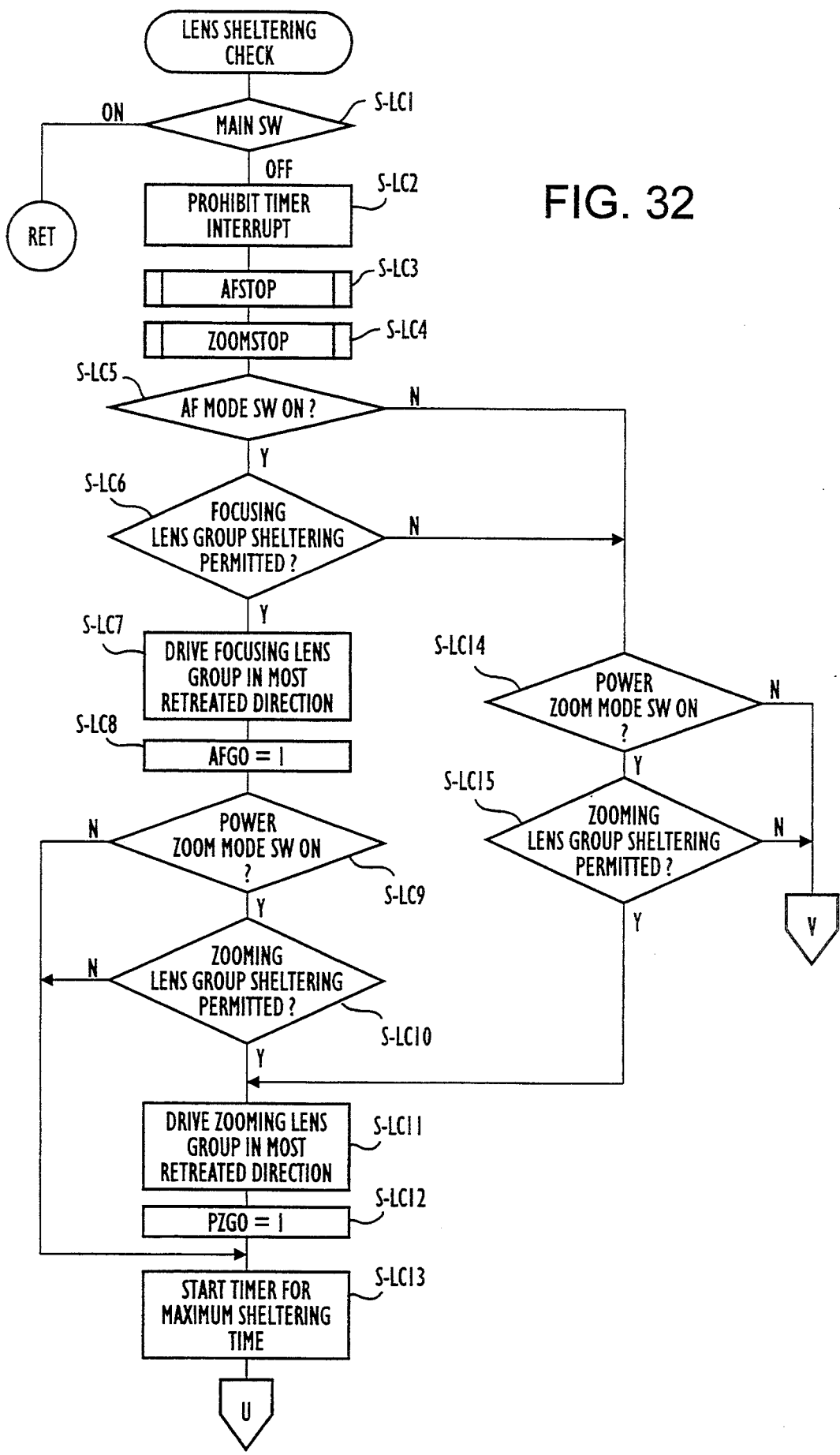

The process determines whether the release switch SWR has been turned on in S-H1 shown in FIG. 25. When the switch has been turned on, the determined condition is YES and the process advances to S-H2. When the switch has not been turned on, the determined condition is NO and the process advances to S-H12. The lens sheltering check process shown in FIG. 32 takes place in S-H12 and then advances to S-H13. The power zoom drive check operation shown in FIG. 28 takes place in S-H13 and then advances to S-H14. The process permits a timer interrupt in S-H14 so as to complete the timer interrupt process.

When the process determined that the release switch SWR has been turned on in S-H1 and then advanced to S-H2, it determines whether the flag MF for representing whether the manual focus state takes place or not has been set to 1 (manual focusing state) or not in S-H2. When the manual focus state takes place, the determined condition is YES and the process advances to S-H5. When the determined condition is NO, the process advances to S-H3. The process determines whether the in-focus priority/release priority selection switch SWF S/C has been placed in the in-focus priority (AFS) position or not in S-H3. When the switch has been placed in the in-focus priority (AFS) position, the determined condition is YES and the process advances to S-H4. When the switch has been placed in the release priority (AFC) position, the determined condition is NO and the process advances to S-H11. The process determines whether the flag ONIMG for representing whether the image magnification constant control operation takes place or not had been set to 1 (image magnification constant state) or not in S-H11. When the image magnification constant state takes place, the determined condition is YES and the process advances to S-H4. When the determined condition is NO, the process advances to S-H5. The process determines whether the flag SWREN (for representing whether the release operation is permitted) has been set to 1 (release permission) in S-H4. When the determined condition is YES, the process advances to S-H5, When the determined condition is NO, the process advances to S-H12 and S-H14 and then completes the timer interrupt process.

The process determines whether the flag AFGO for representing whether the focusing lens group is being driven or not has been set to 1 (drive state) or not in S-H5. When the focusing lens group is being driven, the determined condition is YES and the process advances to S-H6. When the determined condition is NO, the process advances to S-H10. The process AFSTOP shown in FIG. 41 takes place in S-H6 so as to stop driving the focusing lens group and then advances, to S-H7. The process computes the number of pulses being driven until the focusing lens group is stopped, dpx, using an output from the AF pulser 48 in S-H7 and then advances to S-H8. The process determines whether the flag AFDRVF for representing whether the focusing lens group is being driven in the far direction or not has been set to 1 (far direction) or not in S-H8. When the direction is far, the determined condition is YES and the process advances to S-H15. When the determined condition is NO, the process advances to S-H9. The process replaces Pinf with Pinf−dpx in S-H15. The process replaces Pinf with Pinf+dpx in S-H9 and then advances to S-H10. The process ZOOMSTOP in S-H10 shown in FIG. 42 stops driving the zooming lens group and then advances to Q shown in FIG. 26 or Q' shown in FIG. 27.

Release Process (1) Release Process Q

Figure 26:
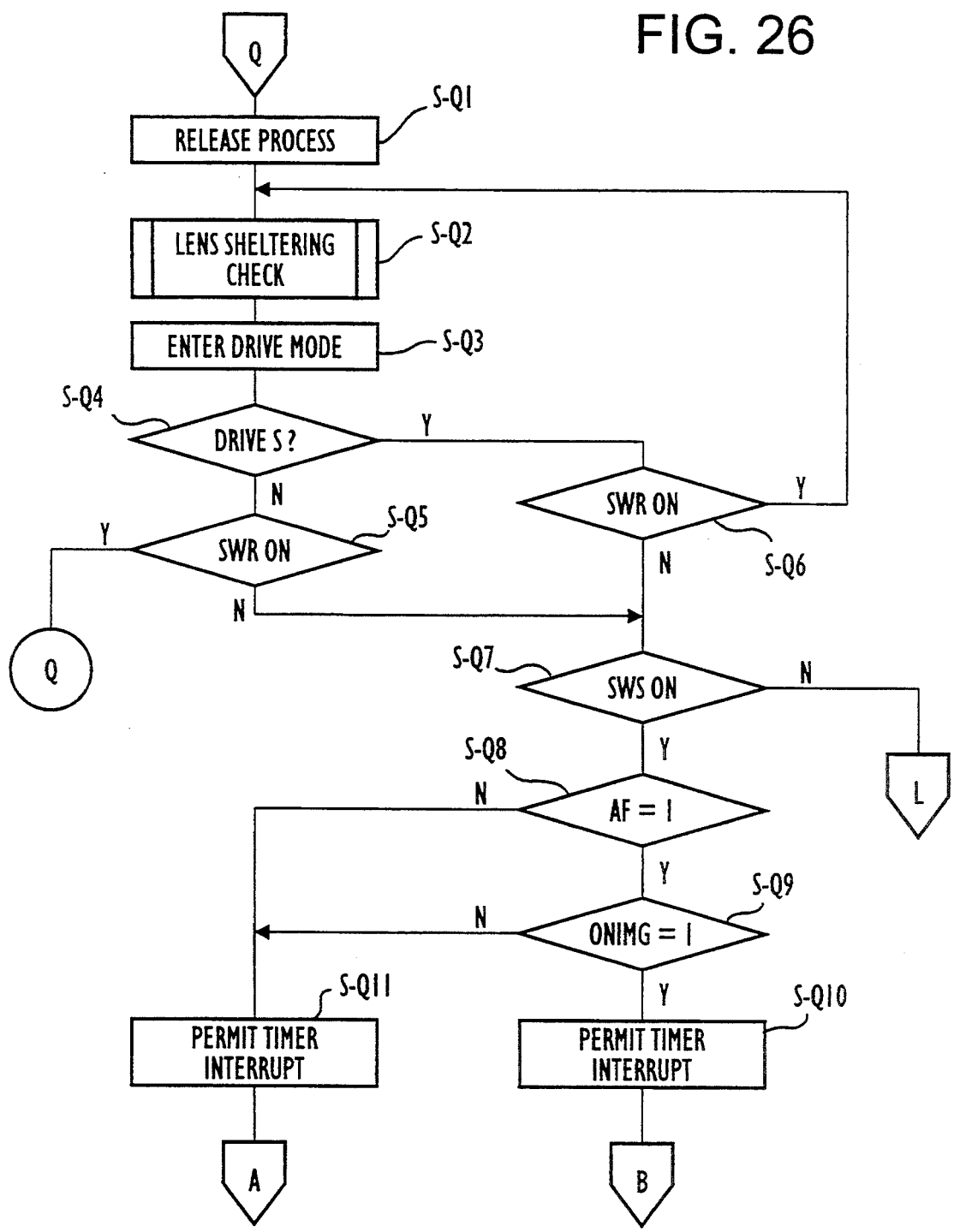

The release process, shown in FIG. 26, is continuously performed without driving the focusing lens group and zooming lens group when the release switch SWR has been turned on in the continuous release mode (drive C).

When the process advances to STEP S-Q1, shown in FIG. 26, it performs the release process in S-Q1 so as to release the shutter of the camera and then advances to S-Q2. A lens sheltering check subroutine, shown in FIG. 32 takes place in S-Q2 and then advances to S-Q3. When the operator controls the up switch SWUP or down switch SWDOWN with the drive switch SWDRIVE operated, the process enters the drive C mode, namely continuous release mode (where the release process is continuously performed) or drive S mode, namely single release mode (where the release process is performed once) and then advances to S-Q4. The process determines whether the drive mode is the drive S or not in S-Q4. When the drive mode is the drive C, the determined condition is NO and the process advances to S-Q5. When the drive mode is the drive S, the determined condition is YES and the process advances to S-Q6. The process determines whether the release switch SWR has been turned on or not in S-Q5. When the switch has been turned on, the determined condition is YES and the process returns back to S-Q1 so as to continuously perform the release process in a loop until the switch is turned off. When the switch has been turned off, the determined condition is NO and the process advances to S-Q7. The process also determines whether the release switch SWR has been turned ON or OFF in S-Q6. When the process has been turned on, the determined condition is YES and returns back to S-Q2 so as to enter a loop until the switch is turned off. When the switch has been turned off, the determined condition is NO and the process advances to S-Q7. The process determines whether the light metering switch SWS has been turned on or not in S-Q7. When the switch has not been turned on, the determined condition is NO and the process advances to the process L shown in FIG. 31. When the switch has been turned on, the determined condition is YES and the process advances to S-Q8.

Figure 31:
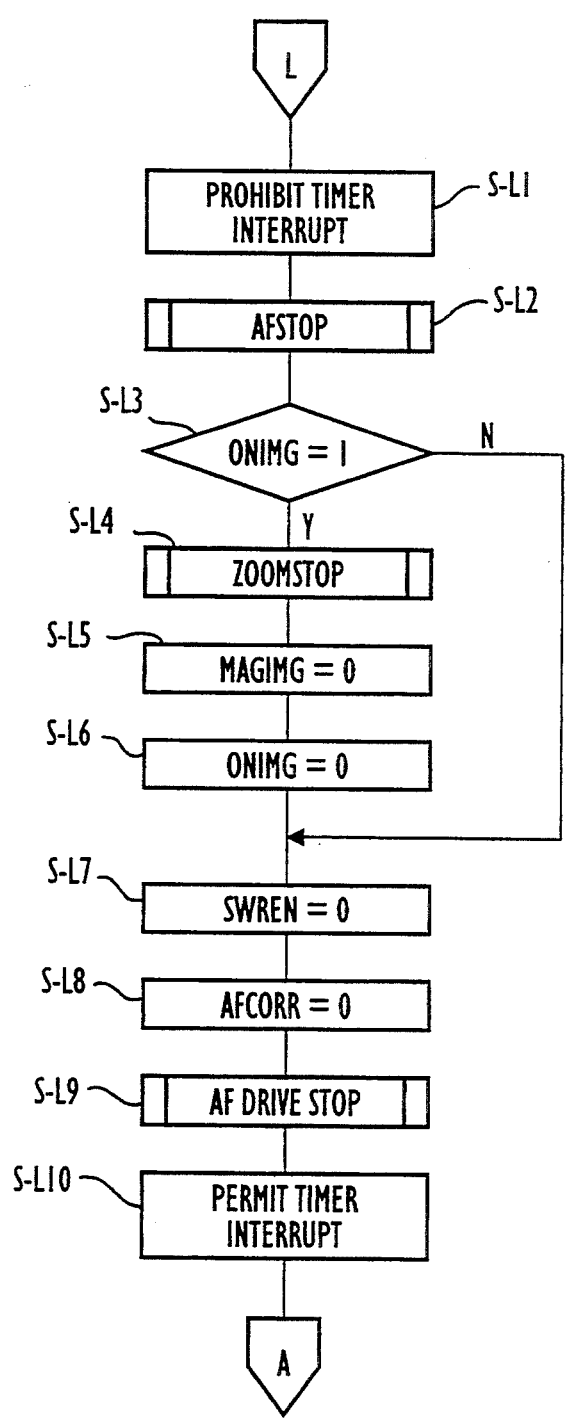

The process prohibits the timer interrupt in S-L1 shown in FIG. 31 and then advances to S-L2. The process AFSTOP, shown in FIG. 41, in S-L2 stops the focusing lens group and then advances to S-L3. The process determines whether the flag ONIMG for representing whether the image magnification constant control operation takes place or not has been set to 1 (image magnification constant control state) or not in S-L3. When the control operation does not take place, the determined condition is NO and the process advances to S-L7. When the control operation takes place, the determined condition is YES and the process advances to S-L4. The process ZOOMSTOP shown in FIG. 42 in S-L4 stops the zooming lens group and then advances to S-L5. The process sets the flag MAGIMG for representing whether to start the image to 0 in S-L5 and then advances to S-L6. The process sets the flag ONIMG for representing whether the image magnification constant control operation takes place or not to 0 in S-L6 and then advances to S-L7. The process sets the flag SWREN for representing whether the release operation is permitted or not to 0 (non permission) in S-L7 and then advances to S-L8. The process sets the flag AF-CORR for representing whether to compensate the focus position of the lens or not to 0 in S-L8 and then advances to S-L9. The AF drive process shown in FIG. 22 takes place in S-L9 and then the process advances to S-L10. The process permits the timer interrupt in S-L10 and then returns back to S2 shown in FIG. 14.

When the process advances from S-Q7 to S-Q8 shown in FIG. 26, it determines whether the flag AF for representing whether the autofocus state takes place or not has been set to 1 (autofocus state) or not in S-Q8. When the autofocus state takes place, the determined condition is YES and the process advances to S-Q9. When the determined condition is NO, the process advances to S-Q11. The process determines whether the flag ONIMG for representing whether the image magnification constant control operation takes place or not has been set to 1 (image magnification constant control state) or not in S-Q9. When the control state does not take place, the determined condition is NO and the process advances to S-Q11. When the control state takes place, the determined condition is YES and the process advances to S-Q10. The process permits the timer interrupt in S-Q10 and then returns back to B shown in FIG. 15. The process permits the timer interrupt in S-Q11 and then returns back to S2 shown in FIG. 14.

Release Process Q'

Figure 27:
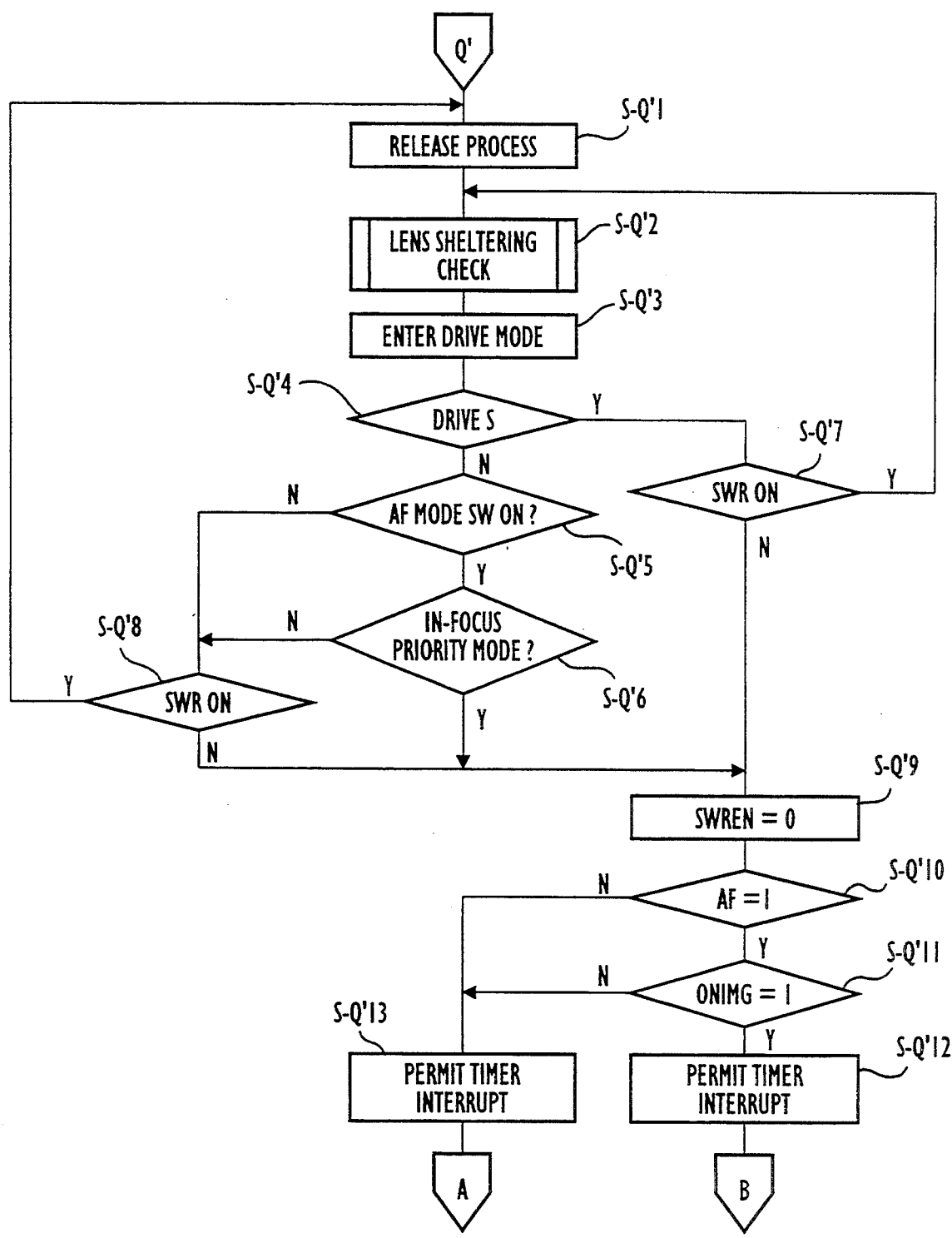

The release process shown in FIG. 27 performs the release permission preceded by repeated AF operation and image magnification constant control operation regardless of whether the release switch SWR has been turned on/off when the drive mode is the continuous release mode (drive C) and the in-focus priority mode takes place. In other words, the processes in S-Q'5 and S-Q'6 perform the release operation after determining whether the AF mode and in-focus priority mode take place or not.

The release process in S-Q'1 shown in FIG. 27 releases the shutter of the camera anti then advances to S-Q'2. The lens sheltering check process shown in FIG. 32 takes place in S-Q'2 and then the process advances to S-Q'3. When the operator controls the up switch SWUP or down switch SWDOWN with the drive switch SWDRIVE operated, the process enters the drive C, namely continuous release mode (where the release process is continuously performed) or the drive S, namely single release mode (where the release process is performed once) and then advances to S-Q'4. The process determines whether the drive mode is the drive S or not in S-Q'4. When the drive mode is the drive S, the determined condition is NO and the process advances to S-Q'5. When the drive mode is the drive S, the determined condition is YES and the process advances to S-Q'7.

The process determines whether the release switch SWR has been turned on or not in S-Q'7. When the switch has been turned on, the determined condition is YES and the process returns back to S-Q'2 so as to enter a loop until the switch is turned off. When the switch has been turned off, the determined condition is NO and the process advances to S-Q'9.

The process determines whether the AF mode switch (switch SWAF A/M) has been turned on or not in S-Q'5. When the switch has been turned on, the determined condition is YES (AF mode) and the process advances to S-Q'6. When the switch has been turned off, the determined condition is NO (manual) and the process advances to S-Q'8. The process determines whether the in-focus priority/release priority selection switch SWF S/C has been placed in the in-focus priority position (AFS) or not in S-Q'6. When the switch has been placed in the in-focus priority position, the determined condition is YES and the process advances to S-Q'9. When the determined condition is NO, the process advances to S-Q'8.

The process determines whether the release switch SWR has been turned on or not in S-Q'8. When the switch has been turned on, the determined condition is YES and the process returns back to S-Q'1 so as to continuously perform the release process in a loop until the switch is turned off. When the switch has been turned off, the determined condition is NO and the process advances to S-Q'9.

The process sets the SWREN flag for representing whether the release operation is permitted or not to 0 in S-Q'9 and then advances to S-Q'10. The process determines whether the flag AF for representing whether the auto focus state takes place or not has been set to 1 (autofocus) or not in S-Q'10. When the autofocus state takes place, the determined condition is YES and the process advances to S-Q'11. When the determined condition is NO, the process advances to S-Q'13. The process determines whether the flag ONIMG for representing whether the image magnification constant control operation takes place or not has been set to 1 (image magnification constant control state) or not in S-Q'11. When the control state does not take place, the determined condition is NO and the process advances to S-Q'12. When the control state takes place, the determined condition is YES and the process advances to S-Q'13. The process permits the timer interrupt in S-Q'12 and then returns back to B shown in FIG. 15. The process permits the timer interrupt in S-Q'13 and then returns back to S2 shown in FIG. 14.

When the process determined that the manual mode takes place in S-T2 shown in FIG. 24, the processes in S-15 to S-T18, the process K shown in FIG. 30, the process H shown in FIG. 25, the process Q shown in FIG. 26 or the process Q shown in FIG. 27, and the process L shown in FIG. 31 take place. When the process determines that the AF mode switch (switch SWAF A/M) has been turned off in S-T2, the determined condition is NO (AF) and the process advances to S-T3.

The process determines whether the in-focus priority mode takes place or not in S-T3. When the mode is the in-focus mode, the process advances to S-T20. The process sets the flag AFS for representing whether the in-focus priority mode takes place or not to 1 (in-focus priority) in S-T20 and advances to S-T7. When the process determines that the mode is not the in-focus priority mode in S-T3, the determined condition is NO and the process advances to S-T4. The process sets the flag AFS for representing whether the in-focus priority mode takes place or not to 0 and then advances to S-T5. In this case, since the release operation can be performed in any time, the process sets the flag SWREN for representing whether the release operation is permitted or not to 0 in S-T5 and then advances to S-T6. The flag SWREN is set to 0 so that the AF process can be performed even if the focal point is moved after the subject is focused. In other words, even If the subject is focused in the in-focus priority mode, the in-focus state cannot be always detected. When the present mode is changed to another mode, it is necessary to perform the AF process once again.

When the zooming lens group is driven and zoomed after the subject is focused, the focal point may be moved depending on the type of the photographic lens such as a variable focal lens. When the variable focal lens is zoomed by driving the zooming lens group, the focal point is moved. Thus, the focal point should be compensated. In the in-focus priority mode, it is necessary to set the flag AFCORR to 1 and perform the AF operation once again. However, since the present mode is not the in-focus priority mode, the process sets the flag AFCORR for representing whether to compensate the focus position of the lens of not to 0 in S-T8 and then advances to S-T7.

The process determines whether the light metering switch SWS has been turned on or not in S-T7. When the switch has been turned on, the determined condition is YES and the process advances to S-T9 without checking the AF bit. When the switch has not been turned on, the determined condition is NO and the process advances to S-T8 so as to check the AF bit. The process determines whether the flag AF for representing whether the autofocus state takes place or not has been set to 1 (autofocus state) or not in S-T8. When the autofocus state takes place, the determined condition is YES and the process advances to L shown in FIG. 31. When the determined condition is NO, the process advances to S-T9.

The process determines whether the power zoom switch SWPZ has been turned on or not in S-T9. When the switch has been turned off, the determined condition is NO and the process advances to S-T21. When the switch has been turned on, the determined condition is YES and the process advances to S-T10. The process sets the flag PZMODE for representing whether the zooming lens group can be driven by the power zoom mechanism or not to 1 (drive state) in S-T10 and then advances to S-T11. The process sets the flag PZMODE for representing whether the zooming lens group can be driven by the power zoom mechanism or not to 0 in S-T21 and then advances to S-T22. In S-T22, the process ZOOMSTOP shown in FIG. 42 takes place. The process advances to S-T28.

Regardless of whether the zoom switch SWPZ has been turned on or off, the zooming lens group may have been manually moved to the macro area. In addition, although the zooming lens group is driven and controlled regardless of whether it is positioned in the zoom area or macro area, the drive control method depends on the area where the zooming lens is positioned. Thus, the process determines whether the macro switch has been turned on or off in S-T11 and S-T28.

When the process determined that the macro switch SWPZC has been turned on in S-T28, the determined condition is YES and the process advances to S-T24. When the switch has not been turned on, the determined condition is NO and the process advances to S-T25. The process sets the flag PZMACRO for representing whether the zooming lens group is positioned in the macro area by the power zoom mechanism or not to 1 (macro area) in S-T24. The process sets the flag PZMACRO for representing whether the zooming lens group is positioned in the macro area by the power zoom mechanism or not to 0 (zoom area) in S-T25 so as to perform the process H shown in FIG. 25.

When the process determined that the macro switch has been turned on in S-T11, the determined condition is YES and the process advances to S-T26. When the switch has not been turned on, the determined condition is NO and the process advances to S-T12. The process determines whether the flag PZMACRO for representing whether the zooming lens group is positioned in the macro area by the power zoom mechanism or not has been set to 1 (macro area) or not in S-T26. When the zooming lens group has been positioned in the macro area, the determined condition is YES and the process advances to S-T30. When the zooming lens group has not been positioned in the macro area, the determined condition is NO and the process advances to S-T27. The process sets the flag MNL for representing whether the near terminus of the focusing lens group is being detected by driving the zoom ring in the macro area or not to 0 in S-T27 and then advances to S-T28. The process sets the flag MFL for representing whether the far terminus of the focusing lens group is being detected by driving the zoom ring in the macro area or not to 1 in S-T28 and then advances to S-T29. The process sets the flag PZMACRO for representing whether the zooming lens group is positioned in the macro area by the power zoom mechanism or not to 1 (macro area) in S-T29 and advances to S-T30. Since the image magnification constant control operation cannot be performed in the macro area, the process sets the flag MAGIMG for representing whether to start the image magnification constant operation or not to 0 in S-T30 and advances to S-T31. The process determines whether the flag ONIMG for representing whether the image magnification constant control operation takes place or not has been set to 1 (control state) or not in S-T31. When the control operation is being performed, the determined condition is YES and the process advances to L shown in FIG. 31 so as to stop the image magnification constant control operation. When the control operation is not being performed, the determined condition is NO and the process advances to S-T32. The process checks the power zoom drive operation shown in FIG. 28 in S-T32 and then advances to H shown in FIG. 25 so as to perform the release process.

When the process advances from S-T11 to S-T12, the process determines whether the flag PZMACRO for representing whether the zooming lens group is positioned in the macro area by the power zoom mechanism or not has been set to 1 (macro area) or not in S-T12. When the zooming lens group has been positioned in the macro area, the determined condition is YES and the process advances to S-T33. When the zooming lens group has not been positioned in the macro area, the determined condition is NO and the process advances to S-T13. The process sets the flag PZMACRO for representing whether the zooming lens group is positioned in the macro area by the power zoom mechanism or not to 0 (zoom area rather than macro area) in S-T33 and then advances to K shown in FIG. 30.

The process advances from S-T12 to S-T13. The process determines whether the image magnification constant mode switch SWPZC has been turned on or not in S-T13. When the switch has not been turned on, the determined condition is NO and the process advances to S-T30 and S-T31 described above. After that, the process advances to L shown in FIG. 31 so as to stop the image magnification constant control operation. When the switch has been turned on, the determined condition is YES and the process advances to S-T14. The process sets the flag PZMACRO for representing whether the zooming lens group is positioned in the macro area by the power zoom mechanism or not to 1 in S-T14 and advances to H shown in FIG. 25 so as to perform the release process.

Power Zoom Drive Check

Figure 28:
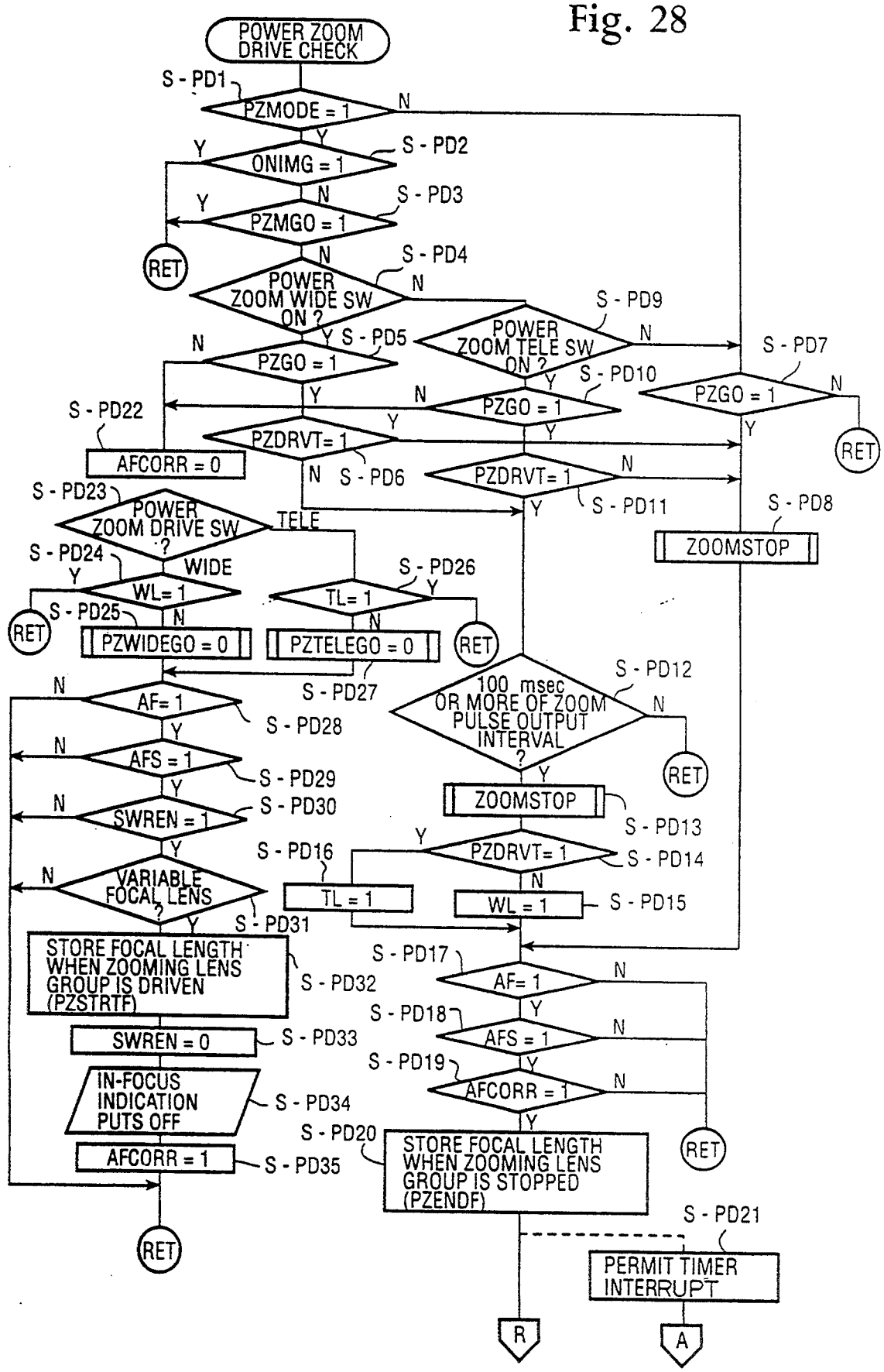

The process determines whether the power zoom mode switch SWPZ has been turned on and the flag PZMODE for representing whether the zooming lens group can be driven by the power zoom mechanism or not has been set to 1 (drive enable) or not in S-PD1 shown in FIG. 28. When the power zoom can be driven, the determined condition is YES and the process advances to S-PD2. When the power zoom cannot be driven, the determined condition is NO and the process advances to S-PD7. The process determines whether the zooming lens group is being driven by the power zoom mechanism, namely the flag PZGO for representing whether the zooming lens group is being driven or not has been set to 1 (drive state) or not in S-PD7. When the zooming lens group is not being driven, the process advances to a step following the power zoom drive check process. When the zooming lens group is being driven, the determined condition is YES and the process advances to S-PD8. The process ZOOMSTOP in S-PD8 shown in FIG. 42 stops the zooming lens group and then advances to S-PD17.

When the process determined that the flag PZMODE for representing whether the zooming lens group can be driven by the power zoom mechanism or not has been set to 1 (drive enable) in S-PD1, the determined condition is YES and the process advances to S-PD2. The process determines whether the flag ONIMG for representing whether the image magnification constant control operation takes place or not has been set to 1 (control state) or not in S-PD2. When the control operation is being performed, the determined condition is YES and the process advances to a step following the power zoom drive check process. When the determined condition is NO, the process advances to S-PD3. The process determines whether the flag PZMGO for representing whether the zooming liens group is being driven by PZ motor M2 in the macro area or not has been set to 1 (drive state) or not in S-PD3. When the zooming lens group is being driven, the determined condition is YES and the process advances to a step following the power zoom drive check process. When the determined condition is NO, the process advances to S-PD4.

The process determines whether the zooming switch SWPZW for driving the zooming lens group in the wide direction has been turned on or not in S-PD4. When the switch has been turned on, the determined condition is YES and the process advances to S-PD5. When the determined condition is NO, the process advances to S-PD9. The process determines whether the zoom switch SWPZT for driving the zooming lens group in the tele direction has been turned on or not in S-PD9. When the switch has been turned on, the determined condition is YES and the process advances to S-PD10. When the determined condition is NO, the process advances to S-PD7. The process determines whether the flag PZGO representing whether the zooming lens group is being driven or not has been set to 1 (drive state) or not in S-PD5. When the zooming lens group is not being driven, the determined condition is NO and the process advances to S-PD22. When the zooming lens group is being driven, the determined condition YES and the process advances to S-PD6. The process determines whether the flag PZGO for representing whether the zooming lens group is being driven or not has been set to 1 (drive state) or not also in S-PD10. When the lens group is not being driven, the determined condition is NO and the process advances to S-PD22. When the lens group is being driven, the determined condition is YES and the process advances to S-PD11.

When the zooming lens group is being moved to the tele side while the zoom switch SWPZW for driving the zooming lens group in the wide direction has been turned on and the zooming lens group is being driven, a contradiction occurs. Thus, the process determines whether the flag PZDRVT for representing whether the zooming lens group is being driven on the tele side or not has been set to 1 (being driven on tele side) or not in S-PD6. When the zooming lens is being driven on the tele side, a contradiction occurs. In this case, the determined condition is YES and the process advances to S-PD8 so as to perform the process ZOOMSTOP which stops the zooming lens group.

In addition, when the zooming lens group is being moved on the wide side while the zoom switch SWPZT for driving the zooming lens group in the tele direction has been turned on and the zooming lens group is being driven, a contradiction occurs. Thus, the process determines whether the flag PZDRVT for representing whether the zooming lens group is being driven on the tele side or not has been set to 1 (being driven on tele side) or not in S-PD11. When the zooming lens group is being driven on the wide side, a contradiction occurs. In this case, the determined condition is NO and the process advances to S-PD8 so as to perform the process ZOOMSTOP which stops the zooming lens group.

On the other hand, when the process determined that the zooming lens group is not being driven on the tele side in S-PD6, no contradiction occurs. In this case, the determined condition is NO and the process advances to S-PD12. When the process determined that the zooming lens group is not being driven on the wide side in S-PD11, namely the lens is being driven on the tele side, no contradiction occurs. In this case, the determined condition is YES and the process advances to S-PD12. The process determines whether the interval of pulses being output from the PZ pulser 49 is 100 msec or more or less than 100 msec in S-PD12. When the pulse interval is less than 100 msec. the determined condition is NO and the process advances to a step following the power zoom drive check process. When the output interval is 100 msec or more, the determined condition is YES and the process advances to S-PD13. The process ZOOMSTOP shown in FIG. 42 in S-PD13 stops the zooming lens group. The process advances to S-PD14. The process determines whether the flag PZDRVT for representing whether the zooming lens group is being driven on the tele side or not has been set to 1 (being driven on tele side) or not in S-PD14, When the zooming lens group is being driven on the tele side, the determined condition is YES and the process advances to S-PD16. When the zooming lens group is being driven on the wide side rather than the tele side, the determined condition is NO and the process advances to S-PD15, The process sets the flag WL for representing whether the wide terminus of the zooming lens group is being detected or not to 1 in S-PD15. The process sets the flag TL for representing whether the tele terminus of the zooming lens group is being detected or not to 1 in S-PD16. The process advances to S-PD17.

When the process advances from S-PD5 and S-PD10 to S-PD22, it set the flag AFCORR for representing whether to compensate the focus position of the lens or not 0 in S-PD22 and then advances to S-PD23. The process determines in which direction of tele or wide, the zooming lens group is being driven by which of zoom switch SWPZT or SWPZW. When the zoom switch SWPZT has been Turing on, the process advances to S-PD26. When the zoom switch SWPZW has been turned on, the process advances to S-PD24.

The process determines whether the flag WL representing whether the wide terminus of the zooming lens group is being detected or not has been set to 1 or not in S-PD24. The process determines whether the flag TL lot representing whether the tele terminus of the zooming lens group is being detected or not has been set to 1 or not in S-PD26. When the determined condition in S-PD24 and S-PD26 is YES, the process advances to a step following the power zoom drive check process. When the determined condition in S-PD24 and S-PD26 is NO, the process advances to S-PD25 and S-PD27, respectively.

The process PZWIDEGO shown in FIG. 38 in S-PD25 drives the zooming lens group in the wide direction. The process PZTELEGO Shown in FIG. 37 in S-PD27 drives the zooming lens group in the tele direction. The process advances to S-PD28.

The process determines whether the flag AF for representing whether the autofocus state takes place or not has been set to 1 (autofocus state) or not in S-PD28. When the autofocus state takes place, the determined condition is YES and the control advances to S-PD29. The process determines whether the in-focus priority/release priority selection switch SWF S/C has been placed in the in-focus priority position (AFS) or not in S-PD29. When the switch has been placed in the in-focus priority position, the determined condition is YES and the process advances to S-PD30. The process determines whether the flag SWREN for representing whether the release operation is permitted or not has been set to 1 (release permission) or not in S-PD30. When the release operation has been permitted, the process advances to S-PD31. The process determines whether the photographic lens 3 is a variable focal lens or not based on the information stored in the lens ROM 43 in S-PD31. When the photographic lens is the variable focal lens, the determined condition is YES and the process advances to S-PD32. When the determined condition in S-PD28 to S-PD31 is NO, the process advances to a step following the power zoom drive check process.

When the process advances from S-PD31 to S-PD32, it stores the focal length PZSTARTF at which the zooming lens group is driven in S-PD32 and advances to S-PD33. The process sets the flag SWREN for representing whether the release operation is permitted or not to 0 (non-release permission) in S-PD33 and advances to S-PD35. The process sees the flag AFCORR for representing whether to compensate the focus position of the lens or not to 1 in S-PD35 and then advances to a seep following the power zoom drive check process.

Figure 29:
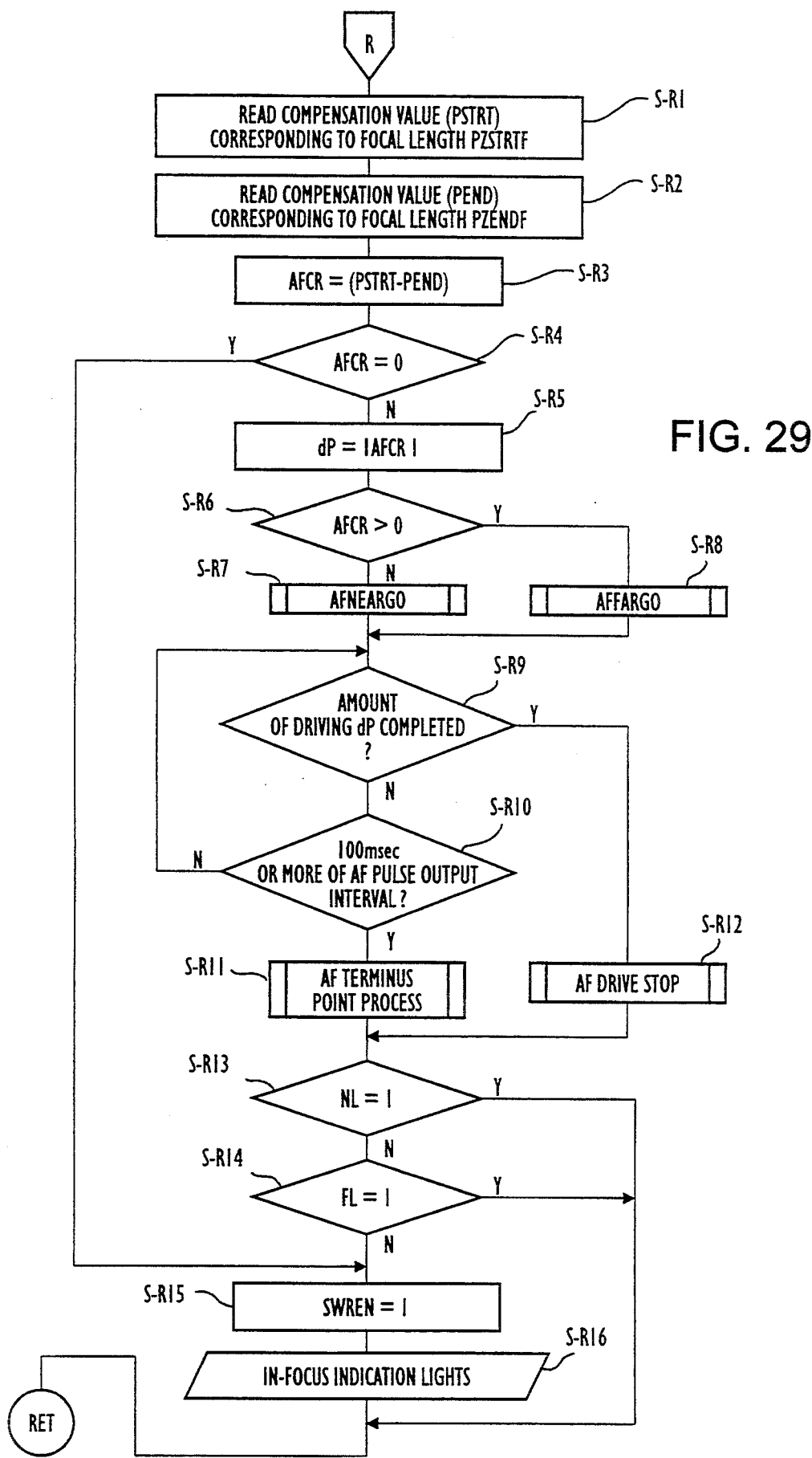

When the process advances from S-PD8 or S-PD15 and S-PD16 to S-PD17, it determines whether the flag AF for representing whether the autofocus state takes place or not has been set to 1 (autofocus state) or not in S-PD17. When the autofocus state takes place, the determined condition is YES and the process advances to S-PD18. The process determines whether the in-focus priority/release priority selection switch SWF S/C has been placed in the in-focus priority position (AFS) or not in S-PD18. When the in-focus priority mode takes place, the determined condition is YES and the process advances to S-PD19. The process determines whether the flag AFCORR for representing whether to compensate the focus position of the lens or not has been set to 1 or not in S-PD19. When the determined condition is YES, the process advances to S-PD20. The process stores the focus length PZENDF at which the zooming lens group is stopped in S-PD20 and advances to R as shown in FIG. 29 or to S2 as shown in FIG. 14. When the determined condition in S-P17 to S-P19 is NO, the process advances to a step following the power zoom drive check process.

The process reads the compensation value PSTRT corresponding to the focal length PZSTART at which the zooming less group is driven from the lens ROM 43 in S-R1 and advances to S-R2. The process reads the compensation value PEND corresponding to the focal length PZENDF at which the zooming lens group is stopped from the lens ROM 43 in S-R2 and advances to S-R3. The compensation value is the amount of deviation of the focal length caused by the zooming lens group being driven when a variable focal lens is used as the photographic lens. In other words, the amount of deviation (compensation value) is as listed in Table 2.

TABLE 2

| Focal Length | Compensation Pulse (Compensation Value n) |
|---|---|
| 70 | $n_1$ |
| 79 | $n_2$ |
| 89 | $n_3$ |
| 101 | $n_4$ |
| 114 | $n_5$ |
| 129 | $n_6$ |
| 146 | $n_7$ |
| 165 | $n_8$ |
| 165 | $n_9$ |
| 186 | $n_{10}$ |
| 210 | $n_{11}$ |

The compensation pulses (compensation value n) can be changed by lens designing. In addition, the compensation pulses are also changed depending on which of $n_1$ to $n_{11}$ the standard value 0 is based. When the process advances from S-R2 to S-R4, it computes AFCR which is a result of subtraction where the compensation value PEND is subtracted from the compensation value PSTRT so as to observe how much the compensation value PSTRT at which the zooming lens group is driven is deviated from the compensation value PEND at which the zooming lens group is stopped. The process advances to S-R4. The process determines whether the result of the subtraction is 0 or not in S-R4. When the result is 0, since the subject is focused, the determined condition is YES and the process advances to S-R15. When the result is not 0, since the subject is not focused, the process advances to S-R5. The process sets the flag SWREN for representing whether the release operation is permitted or not to 1 in S-R15. The process advances to S-R16. The process turns on the in-focus indication in S-R16 and advances to a step following the power zoom drive check process.

When the process determined that the result of the subtraction is not 0 in S-R4 and it advanced to S-R5, the process replaces the result of the subtraction, AFCR, with the amount of driving of the focusing lens group, dp, in S-R5. In this case, since the amount of driving is an absolute value, assuming that dp=|AFCR| the process advances to S-R6. The process determines whether the result of the subtraction, AFCR, is positive or negative. When the result is positive, the determined condition is YES and the process advances to S-R8. When the result is negative, the process advances to S-R7. The process AFNEARGO shown in FIG. 36 drives the focusing lens group on the near side in S-R7. The process AFFARGO shown in FIG. 35 drives the focusing lens group on the far terminus side in S-R8 and then advances to S-R9.

The process determines whether the focusing lens group has been driven for the amount of driving, dp, in S-R9. When the focusing lens group has not been driven, the determined condition is NO and the process advances to S-R10. When the determined result is YES, the process advances to S-R12. The process determines whether the interval of pulses being output from the AF pulser 48 is 100 msec or more or not in S-R10. When the pulse interval is less than 100 msec, the determined condition is NO and the process returns back to S-R9 so as to enter a loop. When the process determined that the pulse interval exceeds 100 msec in S-R10, the process advances to S-R11. The terminus point process shown in FIG. 23 takes place in S-R11. The AF drive stop process shown in FIG. 22 takes place in S-R12 and then the process advances to S-R13.

The process determines whether the flag NL for representing whether the near ternminus of the focusing lens group is being detected or not has been set to 1 or not in S-R13. When the determined condition is the process advances to S-R14. The process determines whether the flag NL for representing whether the near terminus of the focusing lens group is being detected or not has been set to 1 or not in S-R14. When the determined condition is NO, the process advances to S-R15. The process sets the flag SWREN for representing whether the release operation is permitted or not to 1 in S-R15 and then advances to S-16. The process turns on the in-focus indication in S-16 and advances to a step following the power zoom drive check process. When the determined condition in S-R13 and S-R14 is YES, the processes in S-R15 and S-R16 take place. After that, the process advances to a step following the power zoom drive check process.

Lens Sheltering Check

The process determines whether the main switch, namely the lock switch SWLOCK has been turned on or not in S-LC1 shown in FIG. 82. When the switch-has been turned on, the determined condition is YES and the process advances to a step following the power zoom drive check. When the determined condition is NO, the process prohibits the timer interrupt in S-LC2 and then advances to S-LC3. The process AFSTOP shown in FIG. 41 takes place in S-LC3 so as to stop the focusing lens group and then advances to S-LC4. The process ZOOMSTOP shown in FIG. 42 takes place in S-LC4 so as to stop the zooming lens group and then advances to S-LC5. The process determines whether the AF mode switch (switch SWAF A/M) has been turned on or not in S-LC5. When the switch has been turned on, namely the AF mode takes place, the determined condition is YES and the process advances to S-LC6. When the determined condition is NO (manual), the process advances to S-LC14. The process determines whether the focusing lens group is of a shelter type or not in accordance with the information stored in the lens ROM 43 in S-LC6. When the focusing lens group is of the shelter type, the determined condition is YES and the process advances to S-LC8. When the determined condition is NO, the process advances to S-LC14.

The process determines whether the power zoom switch SWPZ has been turned on or not in S-LC14. When the switch has been turned on, the determined condition is YES and the process advances to S-LC15. The process determines whether the zooming lens group is of the shelter type or not in accordance with the information stored in the lens ROM 43 in S-LC15. When the zooming lens group is of the shelter type, the determined condition is YES and the process advances to S-LC11. When the process determined that the power zoom switch SWPZ has been turned off in S-LC14 or that the zooming lens group is not the shelter type in S-LC15, the determined condition is NO and the process advances from V to S-U18. The process cancels the power hole and ends in S-U18.

When the process advances from S-LC6 to S-LC7, it drives the focusing lens group in a direction where it can be retreated in S-LC7 and advanced to S-LC8. The process sees the flag AFGO for representing whether the focusing lens group is being driven or not to 1 in S-LC8 and then advances to S-LC9. The process determines whether the power zoom switch SWPZ has been turned on or not in S-LC9. When the switch has been turned on, the determined condition is YES and the process advances to S-LC10. The process determines whether the zooming lens group is of the shelter type or not in accordance with the information stored in the lens ROM 43 in S-LC10. When the zooming lens is of the shelter type, the determined condition is YES and the process advances to S-LC11. The process drives the zooming lens group in a direction where it is retreated in S-LC11 and then advances to S-LC12. The process sets the flag PZGO for representing whether the zooming lens group is being driven or not to 1 in S-LC12 and then advances to S-LC13.

Figure 33:
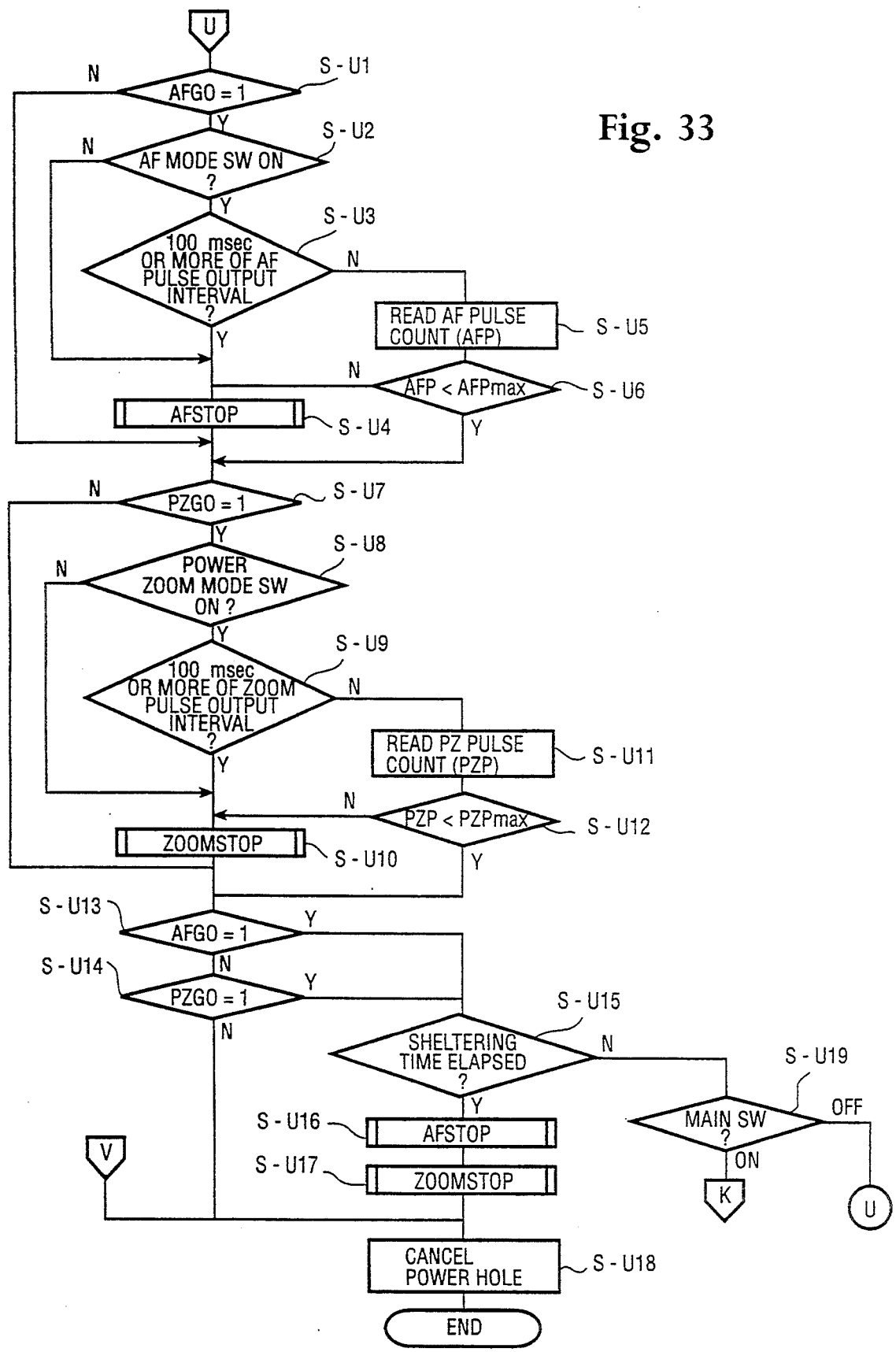

When the process determined that power zoom switch SWPZ has been turned off in S-LC9 or that the zooming lens group is not of the shelter type in S-LC10, the determined condition is NO and the process advances to S-LC13. When the process advances from S-LC12 or S-LC9 and S-LC10 to S-LC13, the process activates the timer of maximum sheltering time of the lens which has been stored in the lens ROM 43 and then advances to U shown in FIG. 33.

The process determines whether the flag AFGO for representing whether the focusing lens group is being driven or not has been set to 1 (drive state) or not in S-U1. When the focusing lens group is not being driven, the determined condition is NO and the process advances to S-U7. When the focusing lens group is being driven, the determined condition is YES and the process advances to S-U2. The process determines whether the AF mode switch (switch SWAF A/M) has been turned on or not in S-U2. When the switch has been turned on and the AF mode takes place, the determined condition is YES and the process advances to S-U3. When the determined condition is NO (manual mode), the process advances to S-U4. The process determined whether the interval of pulses being output from the AF pulser is 100 msec or more or not in S-U3. When the pulse interval is less than 100 msec, the determined condition is NO and the process advances to S-U5. When the pulse interval is 100 msec or more, the determined condition is YES and the process advances to S-U4.

When the process advances from S-U3 to S-U5, it counts the pulse count value AFP which is the number of pulses being output from the AF pulser and then advances to S-U6. The process determines whether the pulse count value AFP is larger than the maximum value of driving the focusing lens group, AFPmax, or not. When the pulse count value AFP is smaller than the AFPmax, the determined condition is YES and the process advances to S-U7. When the AFP is larger than AFPmax, the determined condition is NO and the process advances to S-U4. The process AFSTOP shown in FIG. 41 takes place in S-U4 so as to stop the focusing lens group and then advances to S-U7. Because if the pulses which are output from the AF pulser 48 are continuously output even if they exceed AFPmax, the battery power would be remarkably consumed, thus it is necessary to stop the focusing lens group.

The process determines whether the flag PZGO for representing whether the zooming lens group is being driven or not has been set to 1 (drive state) or not in S-U7. When the zooming lens group is not being driven, the determined condition is NO and the process advances to S-U13. When the zooming lens group is being driven, the determined condition is YES and the process advances to S-U8. The process determines whether the zooming switch SWPZ has been turned on or riot in S-U8. When the switch has been turned on, the determined condition is YES and the process advances to S-U9. When the determined condition is NO, the process advances to S-U10. The process determines whether the interval of pulses being output from the PZ pulser 49 is 100 msec or more or not in S-U9. When the pulse interval is less than 100 msec, the determined condition is NO and the process advances to S-U11. When the interval exceeds 100 msec, the process advances to S-U10.

When the process advances from S-U9 to S-U11, it counts the pulse count value PZP of pulses being output from the PZ pulser and then advances to S-U12. The process determines whether the pulse count value PZP is larger than the maximum value for driving the zooming lens group, PZPmax, or not in S-U12. When the PZP is smaller than PZPmax, the determined condition is YES and the process advances to S-U13. When the PZP is larger than the PZPmax, the determined condition is NO and the process advances to S-U10. The process ZOOMST shown in FIG. 42 takes place in S-U10 so as to stop the zooming lens group and then advances to S-U13. Because if the pulses which are output from the PZ pulser 49 are continuously output even if they exceed $PZP_{max}$, the battery power would be remarkably consumed, thus it is necessary to stop the focusing lens group.

The process determines whether the flag AFGO for representing whether the focusing lens group is being driven or not has been set to 1 or not in S-U13. When the focusing lens group is not being driven, the determined condition is NO and the process advances to S-U14. The process determines whether the flag PZGO for representing whether the zooming lens group is being driven or not has been see to 1 or not in S-U14. When the zooming lens group is not being driven, the determined condition is NO and the process advances to S-U18. The process cancels the power hole and ends in S-U18.

When the process determined that the focusing lens group is being driven in S-U13 or that the zooming lens group is being driven in S-U14, the determined condition is YES and the process advances to S-U15. The process determines whether the sheltering time has elapsed or not in S-U15. When the sheltering time has not elapsed, the determined condition is NO and the process advances to S-U19. The process determines whether the main switch, namely lock switch SWLOCK has been turned on or not in S-U19. When the switch has been turned off, the determined condition is NO and the process advances to S-U1 so as to enter a loop. When the switch has been turned on, the determined condition is YES and the process advances to K shown in FIG. 30.

Figure 41:
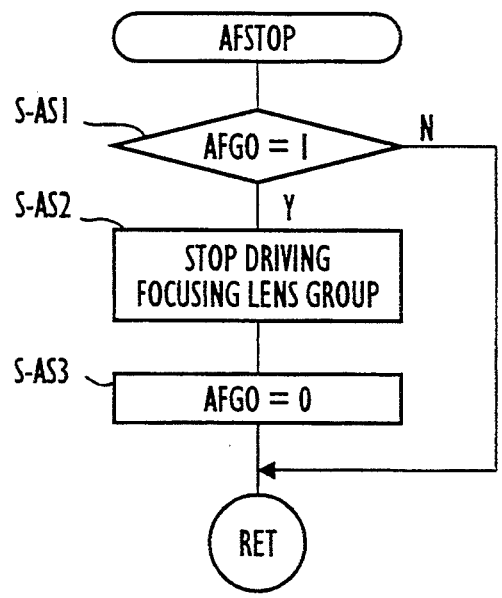

On the other hand, when the process advances from S-U15 to S-U16, the process AFSTOP shown in FIG. 41 takes place in S-U16 so as to stop the focusing lens group and then advances to S-U17. The process ZOOMSTOP shown in FIG. 42 takes place in S-U17 so as to stop the zooming lens group and then advances to S-U18. The process cancels the power hold and ends in S-U18.

In the above embodiment, as an example, the zoom position is detected by the zoom code plate. However, it is obvious that modification and variation of the present invention is possible. For example, as shown in FIG. 43, a reflection plate 64 for detecting a position which moves in a peripheral direction is mounted on the outer surface of a cam ring 29 and a reflection type photo detector 65 is on an opposite side of the reflection plate 64. The photo detector 65 is composed of a light emission element which emits light to the reflection plate 64 and a light reception element which receives the light reflected from the reflection plate. In addition, as the reflection plate 64, as shown in FIG. 44 (A), a concentration changing type reflection plate whose concentrations change from one side to other side can be used. As shown in FIG. 44 (B), a bar code plate type reflection plate can be also used.

As shown in FIGS. 45 and 46, it is also possible to detect a zoom position by a change of an electrostatic capacity of a variable capacity type zoom position detection means comprising an electrode plate 66 fixed to the base of a cam ring 26 and an electrode plate 67 mounted on a fixing frame 27 on opposite side of the electrode plate 66.

As shown in FIG. 47, a zoom position can be detected by a change of a variable resistor of a variable resistor type zoom position detection means comprising a resistor plate 68 which is fixed on the base of a cam ring 29 in the peripheral direction and a brush 69 which elastically touches the resistor plate 68.

FIG. 48 conceptually shows the relationship between the power zoom mechanism and pulser. In the first embodiment, the zoom code plate and PZ pulser are commonly used. However, it is possible to provide another zoom code plate along with such a pulser. On the other hand, another pulser substituted for the zoom code plate can be used along with the PZ pulser.

In FIG. 48, a gear 70 is provided on the base of a cam ring 29. The gear 70 is linked with a PZ motor through a speed reduction gear mechanism 71. The speed reduction gear mechanism 71 comprises a gear 72 which is engaged to the gear 70, a pinion 73 which is engaged with the gear 72, an idle shaft 74 with which the pinion 73 is engaged, and a gear 75 fixed to the idle shaft 74. A transparent type PZ pulser 49 is provided between the idle shaft 74 and a barrel not shown. The PZ pulser 49 comprises a slit plate 76 fixed to the idle shaft 74 and a photo detector 77 positioned on a peripheral side of the slit plate 78. As shown in FIG. 49, the peripheral portion of the slit plate 76 has many slits 76a in same pitches which radiate in the radius directions. The photo detector 77 is positioned in the manner that the peripheral portion of the slit plate 76 is surrounded by a light emission element 77a and a light reception element 77b. The PZ motor M2 and the speed reduction gear mechanism 71 are not limited to the positions shown in the diagram. The positions can be changed considering other parts.

It is also possible to use a reflection type of the PZ pulpier 49 besides the transparent type. FIGS. 50 and 51 show an example of a reflection type pulser. In this example, a reflection plate 78 is fixed to the idle shaft 74. Many reflection planes 78a which extend in the radius directions of the reflection plate 78 are provided thereon in same pitches. A reflection type photo detector 79 which function like the photo detector 52 is on an opposite side of the reflection plate 78.

FIGS. 52 and 53 show another example of a reflection type pulser. In this example, a multiple side reflector 80 whose peripheral portion reflects light is fixed to the idle shaft 74. On a peripheral plane of the multiple side reflector 80, a reflection type photo reflector 81 which functions like the photo detecter 82 is positioned.

The means for selecting the image magnification constant value desired by the camera operator can be set in a number of ways. Numerous embodiments, not discussed herein, can be designed that accomplish the desired task of selecting a desired magnfication value. The following embodiments are illustrative only and do not limit the scope of the invention. For example, a plurality of switches can be provided on the camera body, the camera lens, or both to select one of a plurality of present magnification values. A second type of magnification value setting means can comprise an up-/down switch that selects a particular magnification value. Alternatively, a single pushbutton switch can be employed that cycles through a predetermined number of magnification values, Instead of limiting the magnification values to a limited number of settings, the magnification setting means can be designed to allow the selection of one magnification value from an infinite number of magnification values, Furthermore, a range of magnification values can be provided from which a magnification value is selected. Such a range can be based upon the type of lens attached to the camera body.

While the present embodiment of the invention describes prohibiting the release of the shutter until an image returns to an allowed range during an image magnification constant operation, other procedures can be developed without departing from the scope and intent of the present invention. For instance, a software program can be written such that when a subject leaves an area wherein an image magnification constant operation can be performed, the image magnification constant operation is terminated, while the automatic focus operation of the camera continues to operate so that a phothograph can be taken. Alternatively, the camera can be programmed to give either a visual, audible or visual and audibel indication when the object to be photographed is no longer within the range of the camera s lens for the image magnification constant operation to correctly operate. Alternatively, the camera can be programmed such that when the object to be photographed leaves the image magnification constant range, the shutter release on the camera is inhibited until the object re-enters the range of the camera lens in which the image magnification constant operation can function. Furthermore, the auto-focus operation can be programmed to continue operating during this time so that the camera is prepared to take a photograph as soon as the object to be photographed returns to the range in which the image magnification constant operation is functional.

Various other procedures and variations of the above described procedures are possible by preparing an appropriate software program that is executed by the camera microprocessor. It is even possible to create a software program embodying more than one procedure so that the camera body can choose a procedure based uopn the lens and/or situation that exists at the time a picture is take.

Figure 15A:
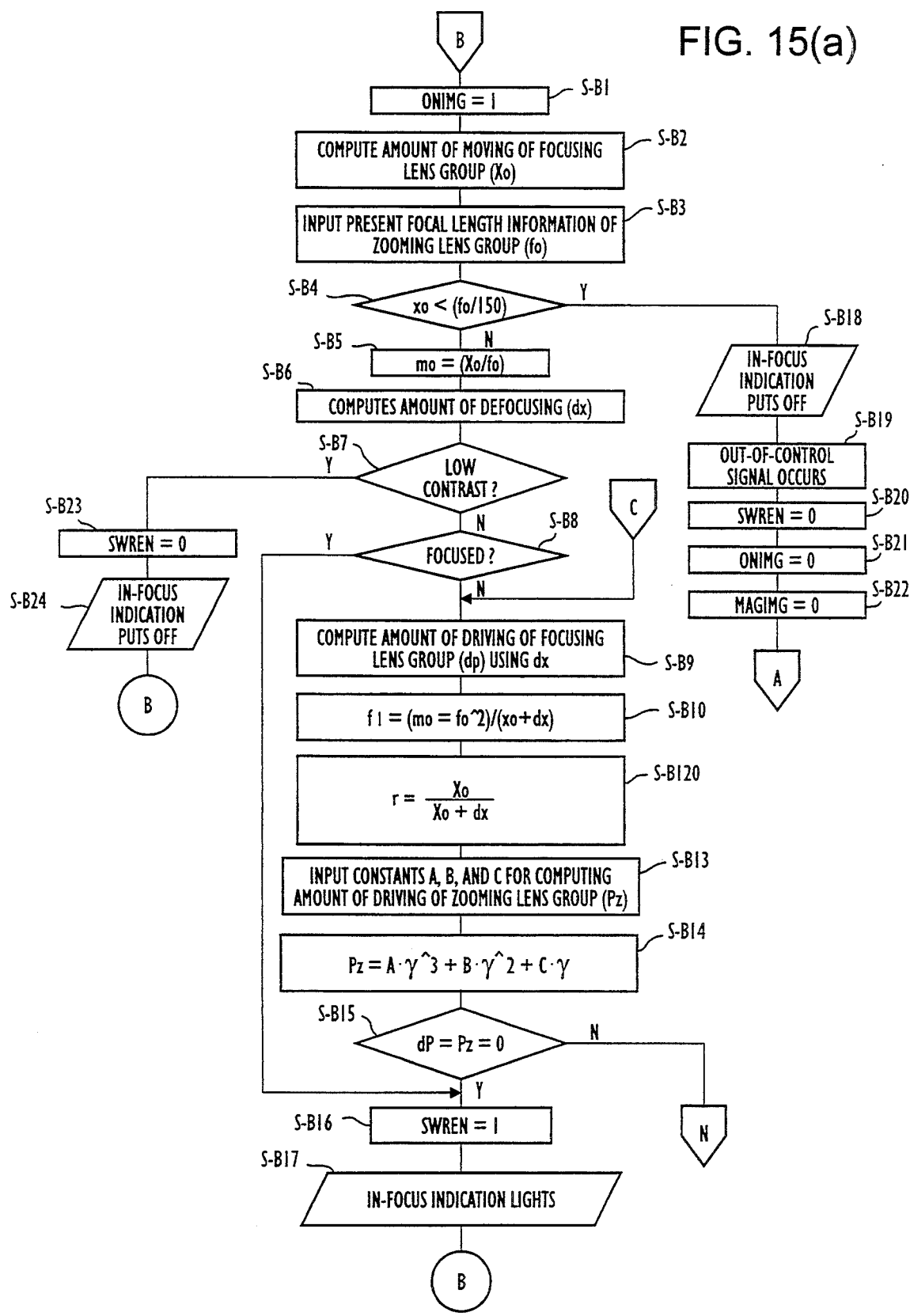
Figure 17A:
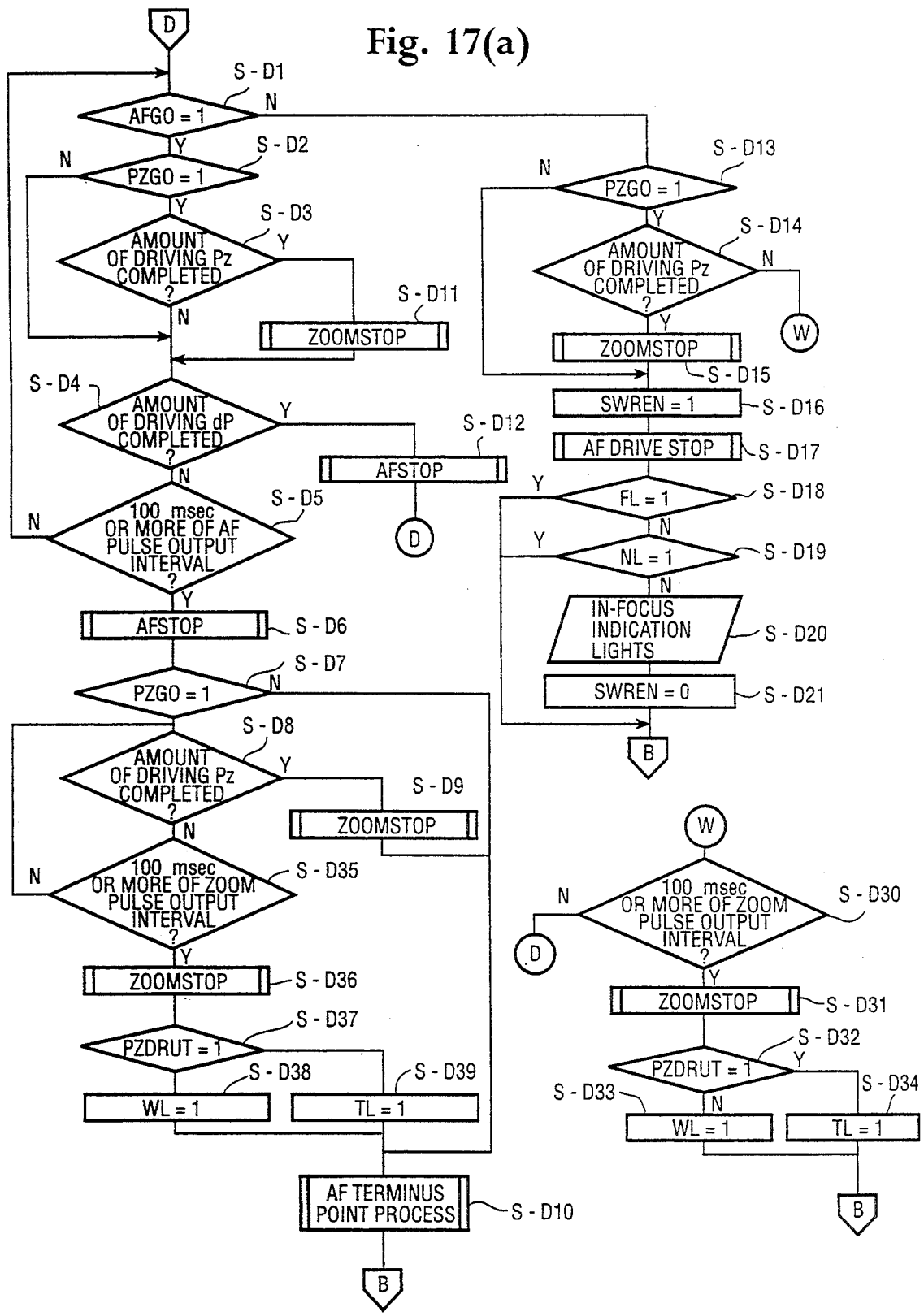

FIGS. 15(a) and 17(a) show a modified embodiment of the invention. In this modification, when a subject is moved out of a range where the image magnification can be controlled, the image magnification control can be temporarity stopped, and then the subject is moved into the allowable range of the image magnification control, the image magnification control is resumed.

More particularly, as illusrated in FIG. 15(a), after the step S-B10 is executed as in FIG. 15, a control image magnification $$r = \frac{X_0}{X_0 + dX} \text{ is computed at S-B120.}$$

Thereafter, the processing returns to S-B1 via S-B13 through S-B17. The determined condition at S-D19 is NO as in FIG. 17, the process goes to S-D30.

When the process advances to S-D30, it determines whether the interval of pulses being output from the PZ pulser 49 is 100 msec or more or not. When the determined condition is NO (less than 100 mscc), the process advances to S-D1 so as to enter a loop until the determined condition becomes YES. When the determined condition is YES, the process advances to S-D31. The process stops driving the zooming lens group shown in FIG. 40 in S-D31 and then advances to S-D32. The process determines whether the direction of the zooming lens group being driven is tele or not in S-D32. When the determined condition is YES, the process advances to S-D33. When the determined condition is NO, the process advances to S-D34. The process sets the flag TL for representing whether the tele terminus of the zooming lens group is being detected or not to 1 in S-D33 and then returns back to B shown in FIG.

15(a). The process sets the flag WL for representing whether the wide terminus of the zooming lens group is being detected or not to 1 and then returns back to B shown in FIG. 15(a).

Moreover, as in FIG. 17, the process determines whether the zooming lens group has been driven for Pz in S-D8. When the determined condition is YES, the process advances to S-D9. When the determined condition is NO, the process advances to S-D35. The process determines whether the interval of pulses being output from the PZ pulser is 100 msec or more or not in S-D35. When the determined condition is NO, the process returns back to S-D8 so as to enter a loop until the zooming lens group has been driven for Pz. When the determined condition is YES, the process advances to S-D36.

When the process advances to S-D36, it stops driving the zooming lens group in S-D36. After that, the process advances to S-D37. The process determines whether the direction of the zooming lens group being driven is tele or not in S-D37. When the determined condition is YES, the process advances to S-D38. When the determined condition is NO, the process advances to S-D39. THe process sets the flag TL for representing whether the tele terminus of the zooming lens group is being detected or not to 1 in S-D38. The process sets the flag WL for representing whether the wide terminus of the zooming lens group is being detected or not to 1 in S-D39. After that, the process advances to S-D10. The terminus point process takes place in S-D10 and the returns back to B shown in FIG. 15(a).

Figure 3A:
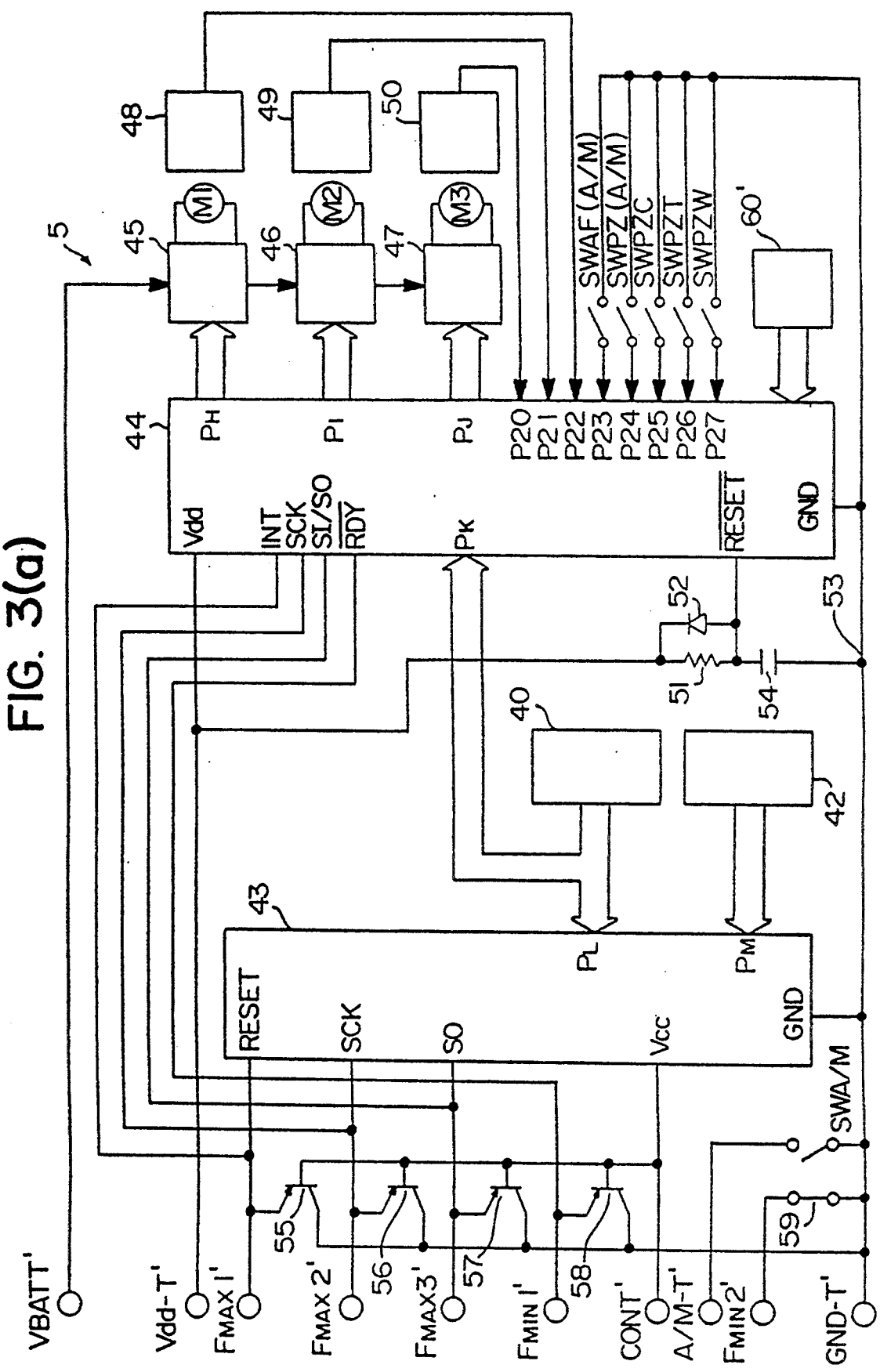
FIG. 3(a) is a modification of FIG. 3.
Figure 15B:
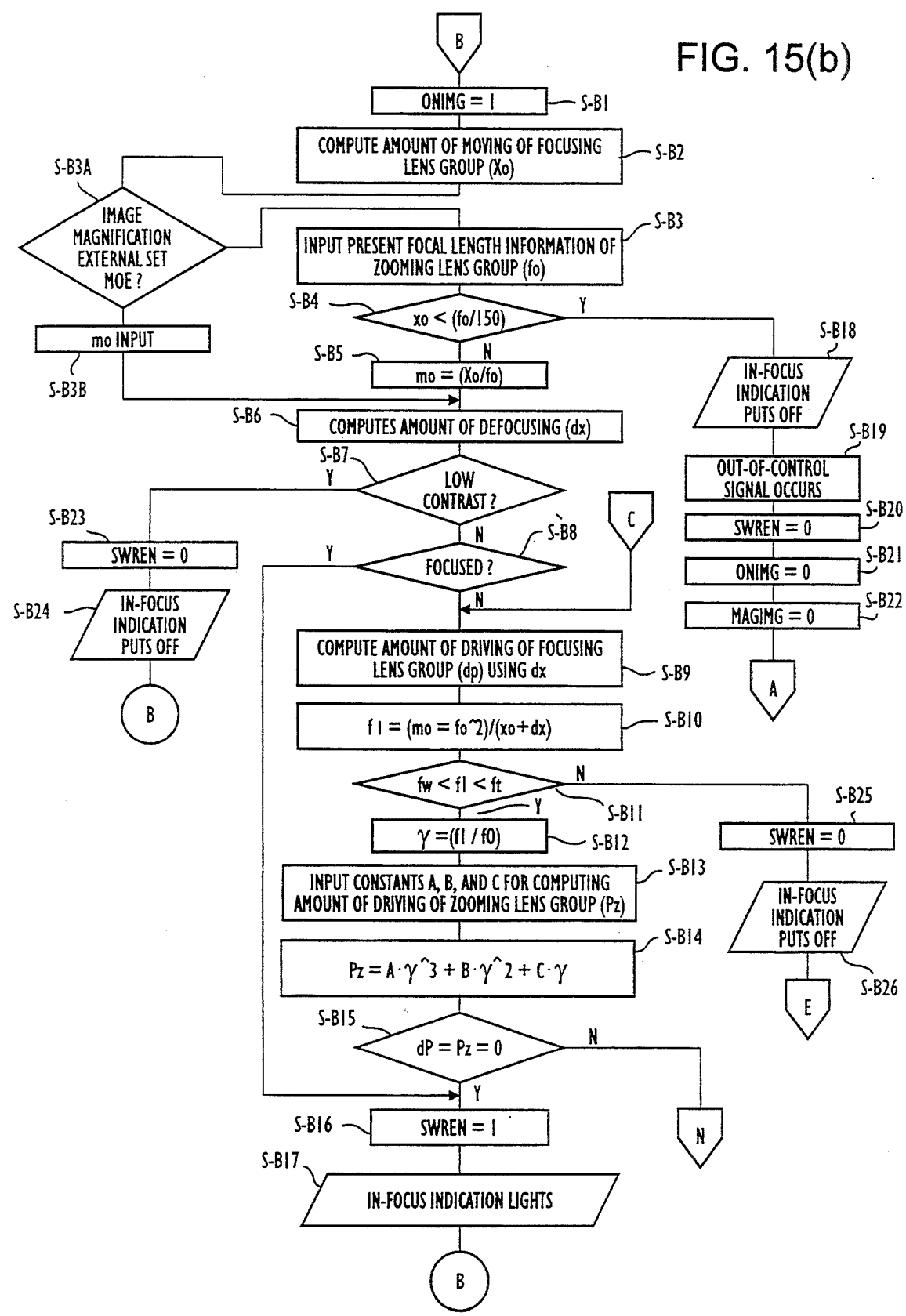

FIGS. 3(a), 14(a) and 15(b) show another modified embodiment of the invention. In this modification, the image magnification can externally be set.

More particulaly, as illustrated in FIG. 3(a), employed, is an image magnification external setting switch SWIMG which is connected to the terminal P28 of the lens CPU 44. By turning on the switch, a desired image magnification can be input from an image magnification external setting circuit 60'. The desired magnification being input from the image magnification external setting circuit 60' can be gradually or stepwise input. The switches SWPZC and SWIMG can be also provided on the body.

In this connection, as illustrated in FIG. 14(a), after the step S5 is executed, it is determined whether the external image magnification setting mode works at S5' before advancing to S6. If the answer is YES, the process goes to S25 instead to S6.

Further, steos S-B3, S-B3A is executed. In steps S-B3A, the process determines at S-B3A whether the switch SWIMG as the image magnification external setting means has been turned on. When the switch has been turned on, the determined condition is YES and the process advances to S-D3B. When the switch has not been turned on, the determined condition is NO and the process advances to S-B4. In S-B3B, the process inputs the desired image magnification being set by the switch SWIMG and then advances to S-B6.

What is claimed is:

1. A lens focusing system for a camera, said system comprising:
   a focusing lens group comprising at least one focusing lens, said focusing lens group being movable between a near extremity and a far extremity;
   automatic focusing means for automatically positioning said focusing lens group in an in-focus condition;
   manual focusing means for manually positioning said focusing lens group; and
   means for changing a focusing mode of said camera, so that, in an automatic focusing mode, focusing is carried out by said automatic focusing means, and, in a manual focusing mode, focusing is carried out by said manual focusing means;
   said automatic focusing means comprising means for automatically positioning said focusing lens group at a predetermined position whenever the focusing mode of said camera is changed from manual focusing to automatic focusing.

2. The system according to claim 1, further comprising means for producing pulses as said focusing lens group is moved, and means for decrementing or incrementing a position value in accordance with said pulses, the position value being indicative of the position of said focusing lens group.

3. The system according to claim 1, wherein said automatic positioning means positions said focusing lens group at said far extremity.

4. The system according to claim 3, wherein said far extremity corresponds to an infinity position of said focusing lens group.

5. The system according to claim 2, further comprising means for setting said position value to a predetermined value in association with a change in focusing mode from manual to automatic.

6. The system according to claim 5, wherein said predetermined value is zero.

7. The system according to claim 5, wherein said setting means set said position value to said predetermined value upon positioning of said focusing lens group at one of the extremities of said focusing lens group.

8. The system according to claim 7, wherein said predetermined value is zero.

9. The system according to claim 1, wherein said predetermined position is one of said far extremity and said near extremity.

* * * * *